United States Patent
Innes et al.

(10) Patent No.: US 11,528,541 B2
(45) Date of Patent: Dec. 13, 2022

(54) OPTICAL NETWORKING WITH HYBRID OPTICAL VORTICES

(71) Applicant: AT&T Intellectual Property I, L.P., Atlanta, GA (US)

(72) Inventors: Timothy Innes, Atlanta, GA (US); Oliver Elliott, Atlanta, GA (US); Samuel Scruggs, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/492,824

(22) Filed: Oct. 4, 2021

(65) Prior Publication Data

US 2022/0030338 A1 Jan. 27, 2022

Related U.S. Application Data

(63) Continuation of application No. 17/079,948, filed on Oct. 26, 2020, now Pat. No. 11,140,465, which is a
(Continued)

(51) Int. Cl.
*H04B 10/25* (2013.01)
*H04Q 11/00* (2006.01)
*H04B 10/70* (2013.01)

(52) U.S. Cl.
CPC ......... *H04Q 11/0066* (2013.01); *H04B 10/25* (2013.01); *H04B 10/70* (2013.01);
(Continued)

(58) Field of Classification Search
None
See application file for complete search history.

(56) References Cited

U.S. PATENT DOCUMENTS

| 5,091,980 A | 2/1992 | Ogawa et al. |
| 5,764,765 A | 6/1998 | Phoenix et al. |

(Continued)

FOREIGN PATENT DOCUMENTS

| JP | 2005268958 | 9/2005 |
| JP | 2006203559 | 8/2006 |

(Continued)

OTHER PUBLICATIONS

Siroki et al: "Single-electron induced surface plasmons on a topological nanoparticle", Nature Communications, Aug. 2016, pp. 1-6 (Year: 2016).*

(Continued)

*Primary Examiner* — Li Liu
(74) *Attorney, Agent, or Firm* — Hartman & Citrin LLC

(57) ABSTRACT

Concepts and technologies directed to optical networking with hybrid optical vortices are disclosed herein. Embodiments can include a system that is configured to perform operations for optical networking with hybrid optical vortices. The system can include a hybrid optical switch that can communicatively couple with another network device via one or more nanofiber communication paths. The operations can include receiving, from a first nanofiber communication path, a hybrid optical vortex that carries an internet protocol packet. The operations also can include decoupling the hybrid optical vortex to extract an optical vortex that encapsulates the internet protocol packet. The operations also can include switching the internet protocol packet to a subsequent communication path based on the optical vortex that encapsulates the internet protocol packet.

20 Claims, 9 Drawing Sheets

Related U.S. Application Data continuation of application No. 16/707,082, filed on Dec. 9, 2019, now Pat. No. 10,820,072, which is a continuation of application No. 16/105,110, filed on Aug. 20, 2018, now Pat. No. 10,506,312.

(52) U.S. Cl.
CPC ............... *H04Q 2011/009* (2013.01); *H04Q 2011/0086* (2013.01)

(56) References Cited

U.S. PATENT DOCUMENTS

| | | | |
|---|---|---|---|
| 7,747,019 | B2 | 6/2010 | Kuang |
| 8,270,841 | B2 | 9/2012 | Nishioka et al. |
| 8,483,391 | B2 | 7/2013 | Townsend |
| 8,639,932 | B2 | 1/2014 | Wiseman et al. |
| 8,676,063 | B2 | 3/2014 | Arahira |
| 8,885,828 | B2 | 11/2014 | Wiseman et al. |
| 9,086,523 | B2 * | 7/2015 | Howe ............... H01L 51/0048 |
| 9,397,293 | B2 | 7/2016 | Tahan et al. |
| 9,509,507 | B1 | 11/2016 | Hunt et al. |
| 9,768,909 | B2 | 9/2017 | Huang et al. |
| 9,787,409 | B1 | 10/2017 | Ladd |
| 9,859,981 | B2 | 1/2018 | Ashrafi et al. |
| 10,186,351 | B1 * | 1/2019 | Hunt .................. H01B 17/005 |
| 2002/0179939 | A1 * | 12/2002 | Ivanov .................. B82Y 10/00 257/E39.015 |
| 2003/0002674 | A1 | 1/2003 | Nambu et al. |
| 2008/0316576 | A1 | 12/2008 | Molenkamp et al. |
| 2010/0258784 | A1 | 10/2010 | Lukin et al. |
| 2014/0346354 | A1 * | 11/2014 | Verbeeck ............. H01J 37/263 250/397 |
| 2015/0124319 | A1 * | 5/2015 | Vance ................. G02B 27/288 359/484.09 |
| 2015/0349910 | A1 * | 12/2015 | Huang .................. H04J 14/04 398/44 |
| 2016/0041411 | A1 * | 2/2016 | Ashrafi ................ G02F 1/0121 250/492.2 |
| 2016/0082617 | A1 * | 3/2016 | Howe .................... B28B 1/001 425/135 |
| 2016/0380765 | A1 | 12/2016 | Hughes et al. |
| 2017/0261835 | A1 | 9/2017 | Koehl et al. |
| 2017/0346627 | A1 | 11/2017 | Alleaume |
| 2018/0287262 | A1 * | 10/2018 | Path ....................... H01Q 13/02 |
| 2018/0306716 | A1 * | 10/2018 | Ashrafi ................. G01N 21/59 |

FOREIGN PATENT DOCUMENTS

| | | |
|---|---|---|
| KR | 100979953 | 9/2010 |
| WO | WO 2014/169321 | 10/2014 |
| WO | WO 2016/061114 | 4/2016 |
| WO | WO 2017/096183 | 6/2017 |

OTHER PUBLICATIONS

Dynes et al., "Ultra-high bandwidth quantum secured data transmission," Scientific Reports, Oct. 13, 2016.

Schell et al., "Highly Efficient Coupling of Nanolight Emitters to a Ultra-Wide Tunable Nanofibre Cavity," Scientific Reports, May 6, 2015.

Faraon et al., "Integrated quantum optical networks based on quantum dots and photonic crystals," New Journal of Physics 13, May 31, 2011.

Javadi et al., "Spin-photon interface and spin-controlled photon switching in a nanobeam waveguide," Cornell University Library, arXiv:1709.06369, Sep. 19, 2017.

Galeon, "'Twisted Light' Could Create an Ultra-Fast Internet and Make Fiber Optics Obsolete," Futurism, futurism.com, Oct. 30, 2017.

University of Vienna, "New records set up with 'Screws of Light,'" ScienceDaily, sciencedaily.com, Nov. 16, 2016.

Bell, Lee, "Physicists discover new form of light that could power quantum computers," Wired, wired.co.uk, Aug. 9, 2016.

Eillis et al., "Communication networks beyond the capacity crunch," Philosophical Transactions A, Mar. 6, 2016.

Krenn et al., "Twisted light transmission over 143 km," Proceedings of the National Academy of Sciences, Nov. 29, 2016.

Siroki et al., "Single-electron induced surface plasmons on a topological nanoparticle," Nature Communications 7, Article No. 12375 (2016), Aug. 5, 2016.

Goyal et al., "Teleporting photonic quidits using multimode quantum scissors," Scientific Reports 3, 3548, Dec. 19, 2013.

University of Calgary, "New approach enhances quantum-based secure communication," ScienceDaily, sciencedaily.com, Sep. 4, 2013.

Campbell et al., "Generation of high-order optical vortices using directly machines spiral phase mirrors," Applied Optics vol. 51, Issue 7, pp. 873-876 (2012).

U.S. Notice of Allowance dated Jul. 25, 2019 in U.S. Appl. No. 16/105,110.

U.S. Notice of Allowance dated Jun. 12, 2020 in U.S. Appl. No. 16/707,082.

Frawley, et al., "Higher order mode propagation in an optical nanofiber," Optics Communications, vol. 285, Issue 23, Oct. 15, 2012, pp. 4648-4654 (Year: 2012).

U.S. Notice of Allowance dated May 28, 2021 in U.S. Appl. No. 17/079,948.

\* cited by examiner

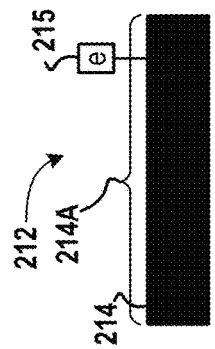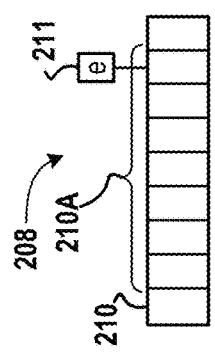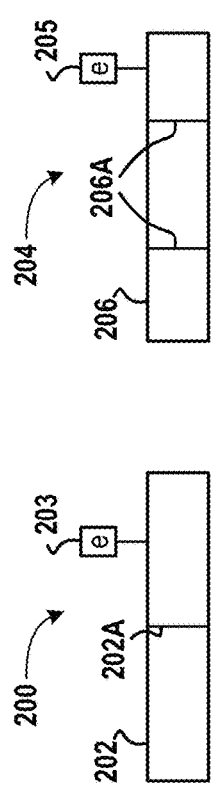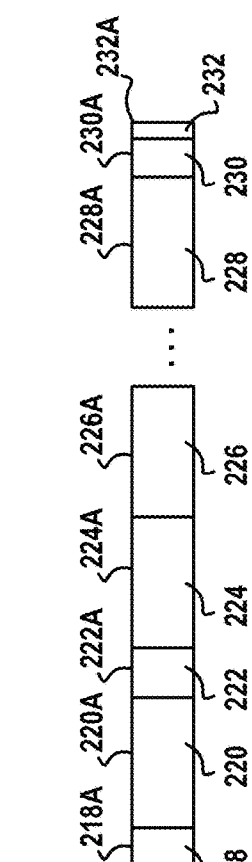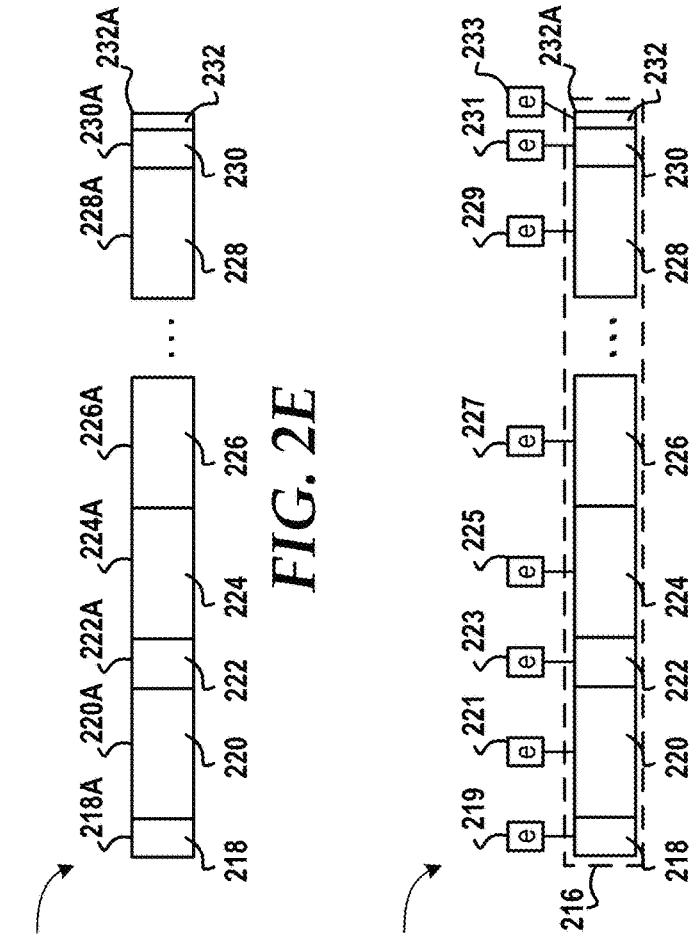

OPTICAL NETWORKING WITH HYBRID OPTICAL VORTICES

CROSS-REFERENCE TO RELATED APPLICATIONS

This application is a continuation of U.S. patent application Ser. No. 17/079,948 entitled "Optical Networking With Hybrid Optical Vortices," filed Oct. 26, 2020, now U.S. Pat. No. 11,140,465, which is incorporated herein by reference in its entirety, and which is a continuation of U.S. patent application Ser. No. 16/707,082 entitled "Optical Networking With Hybrid Optical Vortices," filed Dec. 9, 2019, now U.S. Pat. No. 10,820,072, which is incorporated herein by reference in its entirety, and which is a continuation of U.S. patent application Ser. No. 16/105,110 entitled "Optical Networking With Hybrid Optical Vortices," filed Aug. 20, 2018, now U.S. Pat. No. 10,506,312, which is incorporated herein by reference in its entirety.

BACKGROUND

In conventional optical networking, conventional optical fiber cables typically provide glass fiber and/or plastic threads as a medium by which light travels down the optical fiber cables. However, conventional optical networking typically relies on conventional optical fibers that are relatively thick in size due to glass fiber and/or plastic threads that have a diameter greater than one or two hundred micrometers, which in turn can act as a limiting factor to the amount of data traffic that can flow down a single conventional optical fiber cable. Moreover, communication providers may be limited in the distance with which each segment of conventional optical fiber can span due to physical geography, optical signal strength, and optical signal quality. Although light can be less susceptible to optical interference when traveling in a linear path, communication providers may not be able to always install straight (linear) segments of conventional optical fiber cables. Therefore, communication providers may be forced to curve the conventional optical fiber cable and/or install an optical node to continue communicative coupling. When conventional optical fiber cables are installed with curved portions, the light traveling along the conventional fiber cable must reflect off the sides of the conventional optical fiber, and the point where the light reflects can be referred to as a reflection point. At each reflection point within a conventional optical fiber, there is a risk of power loss of the optical signal which can reduce the distance the light can travel along the conventional optical fiber. Additionally, each reflection point can also introduce a risk of optical interference, which can produce a loss of optical signal quality.

In conventional optical networking, a conventional optical node may use a conversion from an optical signal, to an electrical signal, and back to an optical signal in order to provide routing and switching in the conventional optical networking. For example, a conventional switch may convert an incoming optical signal into an electrical signal, process the electrical signal, and generate another optical signal in order to propagate optical communication to the next hop. However, this conversion from optical to electrical to optical can decrease processing speed, increase network latency, and increase the possibility of communication errors. Additionally, conventional optical networking uses the polarization of light to carry one bit of information per photon. As a result, conventional optical networking may lack the ability to handle data transfer rates at terabit per second speeds while also achieving and/or maintaining low network latency for network communication.

SUMMARY

The present disclosure is directed to optical networking with hybrid optical vortices, according to various embodiments. As used herein, the phrase "hybrid optical vortex" (and/or in the plurality "hybrid optical vortices") refers to an optical vortex that is coupled to an electron that traces a topologically protected surface defined by a topological insulator material ("topological insulator") from a nanofiber optical thread of a nanofiber communication path. The optical vortex has a photon that is configured with a non-zero topological charge so as to provide a "twisted photon." The twisted photon (i.e., optical vortex) is coupled to the electron in a topologically protected surface state provided by a topological insulator material such that when the twisted photon is bound to the electron, the twisted photon follows a topologically protected path traveled by the electron along the nanofiber optical thread. The path that the hybrid optical vortex traces is along a topologically protected surface of the topological insulator material that can be provided by the nanofiber optical thread of the nanofiber communication path. As used herein, the phrase "optical vortex" refers to a twisted photon, where "twisted photon" refers to a photon that is configured with a non-zero internal Orbital Angular Momentum ("OAM") that provides a helical mode such that the photon has a wavefront that is shaped as a helix (e.g., visually similar to a corkscrew) with a visually dark void (i.e., a phase singularity that causes an intensity null along the center of the wavefront, which may lay at the beam center) at a center axis of the wavefront, such as a nanofiber optical thread axis of a nanofiber optical thread. An optical vortex can be configured so as to visually appear as a corkscrew of light, or "twisted light," with visual darkness at the center of the corkscrew.

An optical vortex has a topological charge, where the topological charge corresponds with a non-zero helical mode of the twisted photon. The topological charge defines an amount of twists of the photon (i.e., distinct and intertwined helices) per wavelength and a direction of twist (i.e., positive or negative) about the center axis of the optical vortex. The direction of twist may be referred to as polarity, such as a positive polarity or negative polarity. The topological charge of an optical vortex is a non-zero integer that can be positive or negative (thereby indicating direction of twist), where a higher absolute value of the integer corresponding to the topological charge indicates a greater amount of twists per wavelength, thereby demonstrating that a twisted photon spins faster around the center axis of travel based on the degree of its topological charge. In some embodiments, an optical vortex may be referred to as "twisted light," a "twisted photon," and/or a photon having a non-zero internal OAM mode. It is understood that because a hybrid optical vortex includes an optical vortex coupled to an electron, the hybrid optical vortex has the topological charge corresponding to the twisted photon of optical vortex therein. Thus, the twisted photon that is bound to the electron of the hybrid optical vortex will follow a topologically insulated surface path of a nanofiber optical thread while twisting about a central axis, such as an optical thread axis of the nanofiber optical thread, where the nanofiber optical thread can be included in a nanofiber communication path.

According to one aspect of the concepts and technologies disclosed herein, a system is disclosed. In some embodiments, the system can include a processor and a memory. In some embodiments, the processor and the memory can be provided by a hybrid optical switch. The memory can store computer-executable instructions that, when executed by the processor, cause the system to perform operations. In some embodiments, the operations can include receiving, from a first nanofiber communication path, a hybrid optical vortex that carries an internet protocol packet. The first nanofiber communication path can include a plurality of nanofiber optical threads, where each of the plurality of nanofiber optical threads includes a topological insulator material. The hybrid optical vortex can include an electron that is coupled to the optical vortex that encapsulates the internet protocol packet. The operations can include decoupling the hybrid optical vortex to extract an optical vortex that encapsulates the internet protocol packet. The operation of decoupling the hybrid optical vortex can decouple the optical vortex from the electron of the hybrid optical vortex. The operations also can include switching the internet protocol packet to a subsequent communication path based on the optical vortex that encapsulates the internet protocol packet. The subsequent communication path can correspond with a second nanofiber communication path. In some embodiments, the operations can further include transferring the internet protocol packet of the optical vortex to a second optical vortex and a third optical vortex, where each of the second optical vortex and the third optical vortex comprise the internet protocol packet. In some embodiments, the operations can further include placing the second optical vortex in an optical holding track. In some embodiments, the operations can further include determining whether the internet protocol packet corresponds with a second nanofiber communication path. In some embodiments, the operation of determining whether the internet protocol packet corresponds with a second nanofiber communication path can occur in response to transferring the internet protocol packet of the optical vortex to one or more of a second optical vortex, a third optical vortex, and/or a fourth optical vortex. In some embodiments, the operations can include determining that the internet protocol packet should be switched to the second nanofiber communication path. In some embodiments, switching the internet protocol packet to the subsequent communication path can include providing a second optical vortex that carries the internet protocol packet to an electron coupler that can create a second hybrid optical vortex, where the electron coupler can be coupled to the second nanofiber communication path.

According to another aspect of the concepts and technologies disclosed herein, a method is disclosed, according to an embodiment. The method can include receiving, by a system that is optically coupled with a first nanofiber communication path, a hybrid optical vortex that carries an internet protocol packet from the first nanofiber communication path. In some embodiments, the system can be a hybrid optical switch that executes a processor. In some embodiments, a nanofiber communication path, such as the first nanofiber communication path, can include a plurality of nanofiber optical threads, where each of the plurality of nanofiber optical threads can include a topological insulator material. The hybrid optical vortex can include an electron that is coupled to the optical vortex that encapsulates the internet protocol packet. The method can also include decoupling, by the system, the hybrid optical vortex to extract an optical vortex that encapsulates the internet protocol packet. The system can decouple the optical vortex from the electron of the hybrid optical vortex. In some embodiments, decoupling can be provided by a quantum scissor of the system. The method also can include switching, by the system, the internet protocol packet to a subsequent communication path based on the optical vortex that encapsulates the internet protocol packet. In some embodiments, the subsequent communication path can correspond with a second nanofiber communication path. In some embodiments, the method also can include transferring, by the system, the internet protocol packet of the optical vortex to a second optical vortex and a third optical vortex, wherein each of the second optical vortex and the third optical vortex comprises the internet protocol packet. In some embodiments, the method also can include placing, by the system, the second optical vortex in an optical holding track. In some embodiments, the method also can include determining whether the internet protocol packet corresponds with a second nanofiber communication path. In some embodiments, the operation of determining whether the internet protocol packet corresponds with a second nanofiber communication path can occur in response to transferring the internet protocol packet of the optical vortex to one or more of a second optical vortex, a third optical vortex, and/or a fourth optical vortex. In some embodiments, the method can include determining that the internet protocol packet should be switched to the second nanofiber communication path. In some embodiments, switching the internet protocol packet to the subsequent communication path can include providing a second optical vortex that carries the internet protocol packet to an electron coupler that can create a second hybrid optical vortex, where the electron coupler can be coupled to the second nanofiber communication path.

According to yet another aspect, a computer storage medium is disclosed. The computer storage medium can have computer-executable instructions stored thereon. When the computer-executable instructions are executed by a processor of a system, the system can perform operations. In some embodiments, the system can include a hybrid optical switch. In some embodiments, the operations can include receiving, from a first nanofiber communication path, a hybrid optical vortex that carries an internet protocol packet. The first nanofiber communication path can include a plurality of nanofiber optical threads, where each of the plurality of nanofiber optical threads comprises a topological insulator material. The hybrid optical vortex can include an electron that is coupled to the optical vortex that encapsulates the internet protocol packet. The operations also can include decoupling the hybrid optical vortex to extract an optical vortex that encapsulates the internet protocol packet. In some embodiments, the operations can include switching the internet protocol packet to a subsequent communication path based on the optical vortex that encapsulates the internet protocol packet. In some embodiments, the subsequent communication path can correspond with a second nanofiber communication path. In some embodiments, the operations can further include transferring the internet protocol packet of the optical vortex to a second optical vortex and a third optical vortex, where each of the second optical vortex and the third optical vortex comprise the internet protocol packet. In some embodiments, the operations can further include placing the second optical vortex in an optical holding track. In some embodiments, the operations can further include determining whether the internet protocol packet corresponds with a second nanofiber communication path. In some embodiments, the operation of determining whether the internet protocol packet corresponds with a second nanofiber communication path can occur in response to transferring the internet protocol packet of the optical vortex to one or more of a second optical vortex, a third optical vortex, and/or a fourth optical vortex. In some embodiments, the operations can include determining that the internet protocol packet should be switched to the second nanofiber communication path. In some embodiments, switching the internet protocol packet to the subsequent communication path can include providing a second optical vortex that carries the internet protocol packet to an electron coupler that can create a second hybrid optical vortex, where the electron coupler can be coupled to the second nanofiber communication path.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A is a block diagram illustrating aspects of a hybrid optical vortex according to an illustrative embodiment.

FIG. 2B is a block diagram illustrating aspects of a hybrid optical vortex according to another illustrative embodiment.

FIG. 2C is a block diagram illustrating aspects of a hybrid optical vortex according to yet another illustrative embodiment.

FIG. 2D is a block diagram illustrating aspects of a hybrid optical vortex according to yet another illustrative embodiment.

FIG. 2E is a block diagram illustrating aspects of an optical vortex package according to an illustrative embodiment.

FIG. 2F is a block diagram illustrating aspects of a hybrid optical vortex package according to an illustrative embodiment.

FIG. 2G is a block diagram illustrating aspects of an optical vortex protocol map according to an illustrative embodiment.

DETAILED DESCRIPTION

Figure 1:
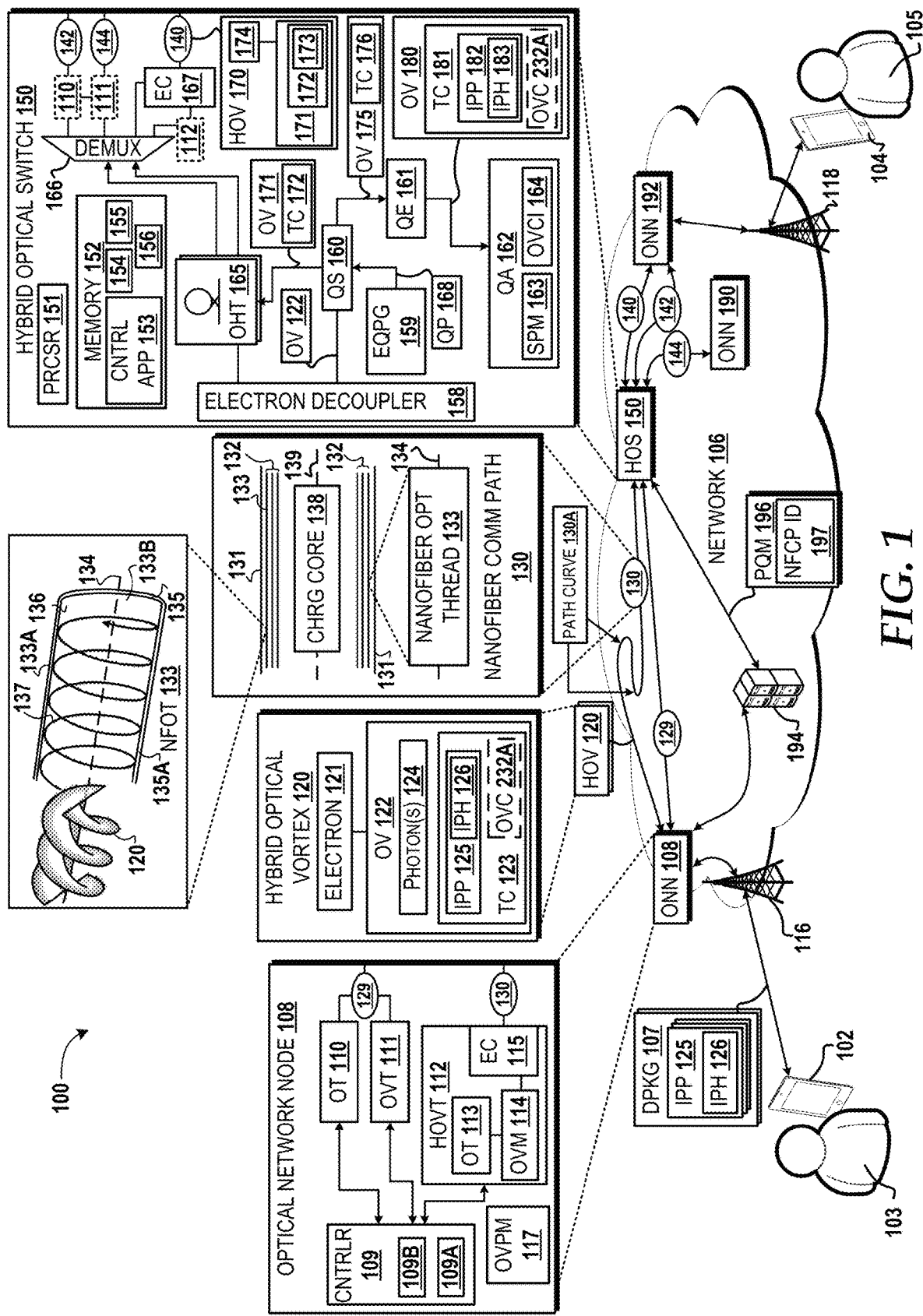
FIG. 1 is a block diagram illustrating an example operating environment that supports optical networking with hybrid optical vortices, according to an illustrative embodiment.

The following detailed description is directed to optical networking with hybrid optical vortices. Embodiments of the present disclosure provide a nanofiber communication path that can facilitate optical communication in various installation configurations, thereby enabling the installation of curved or otherwise non-linear portions of communication paths within the optical network with a reduced risk of optical signal degradation and/or optical signal interference compared to conventional fiber optic cables. Embodiments of the present disclosure can generate a hybrid optical vortex that includes an electron coupled with an optical vortex (i.e., a twisted photon with an internal OAM having a non-zero helical mode and an integer topological charge), and the hybrid optical vortex can be sent along a nanofiber optical thread of the nanofiber communication path. Unlike conventional optical communication that is limited to one bit per photon, embodiments of the present disclosure provide a system that can handle a hybrid optical vortex that can carry more than one bit per photon (i.e., a plurality of bits per photon) over a nanofiber optical thread of a nanofiber communication path, where the nanofiber communication path can handle data transfer rates measured in terabits per second (e.g., 100 terabits per second or more).

The nanofiber optical thread can include and be configured with a topological insulator material so as to define a topologically protected surface path along the nanofiber communication path by which the hybrid optical vortex can travel, thereby enabling optical communication around curved portions of the nanofiber communication path with a reduced likelihood of incurring optical signal interference and/or optical signal degradation when compared to conventional single mode and/or multi-mode fiber optic cables that rely on optical reflection to facilitate optical communication around curved portions of the conventional fiber optic cable. Embodiments of the present disclosure also include an optical vortex protocol by which data packets (e.g., internet protocol (IP) packets) can be encoded or otherwise encapsulated using a topological charge of one or more optical vortices (and/or hybrid optical vortices) for optical communication as discussed herein. Embodiments of the present disclosure can enable optical communication routing and quality of service control while maintaining the optical communication in an optical format, thereby avoiding the need to convert an optical signal into an electrical signal for analysis, routing, and/or switching. Embodiments of the present disclosure can enable optical communication path quality monitoring and optical communication switching while maintaining one or more data packets within one or more optical vortices. As such, embodiments of the present disclosure can facilitate and maintain optical communication with data transfer rates at terabit per second speeds while also achieving and/or maintaining low network latency. These and other aspects of the concepts and technologies disclosed herein will be illustrated and described in more detail below.

While some of the subject matter described herein may occasionally be presented in the general context of computer executable instructions, such as program modules, that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for optical networking with hybrid optical vortices will be described, according to an illustrative embodiment. The operating environment 100 shown in FIG. 1 includes a user 103 associated with a user equipment ("UE") 102, a user 105 associated a UE 104, a network 106, a network access point 116, a network access point 118, an optical network node 108, a hybrid optical switch 150, an optical network node 190, an optical network node 192, and a network quality monitor computer system 194. Briefly, it should be understood that the network 106 can include almost any type of computer network as well as communications network. In various embodiments, the network 106 can include one or more of a radio access network, an evolved packet core network, a core network, an IP-based network, a transport network, an optical transport network, a circuit switched network, a mobile Wide Area Network, a combination thereof, or the like. It is understood that the network can communicate with one or more UEs (e.g., any of the UEs 102 and 104) via one or more network access points (e.g., the network access points 116, 118) that can establish, provide, and maintain wireless and/or wired communication links. It should be understood that the examples provided are for illustration purposes only, and therefore should not be construed as limiting in any way.

In various embodiments, a network access point of the network 106 (e.g., the network access points 116, 118), can be communicatively coupled to network elements within the network 106 and computing devices outside of the network 106, such as any of the optical network node 108, the hybrid optical switch 150, the optical network node 192, and/or the network quality monitor computer system 194. Although only two access points are shown (e.g., the network access points, 116, 118), the network 106 can support multiple access points configured the same as or similar to the network access points 116, 118. The network access points 116, 118 can provide wired and/or wireless communicative coupling and can include, but should not be limited to, one or more of a base transceiver station, a wireless router, a femtocell, an eNodeB, a NodeB, a gNodeB (i.e., an access point that incorporates New Radio access technology, such as LTE Advanced and other 5G technology), a multi-standard metro cell node, a customer premise edge node (e.g., an optical network terminal), and/or other network nodes or combinations thereof that are capable of providing communication to and/or from the network 106. As illustrated in FIG. 1, the network access points 116, 118 are configured in the form of a wireless tower that is communicatively coupled to the network 106, however it is understood that this may not be the case in all embodiments. It should be understood that the examples provided are for illustration purposes only, and therefore should not be construed as limiting in any way.

In various embodiments, the network 106 can be operated, in whole or in part, by a communication service provider that enables various network services to be offered to customers, such as one or more of the users 103 and/or 105, via a customer's user equipment ("UE"), such as any of the UEs 102 and 104, respectively. The network 106 can host and/or be in communication with various network elements that can individually and/or collectively host one or more instances of network services. For example, in some embodiments, the network 106 can use the optical network nodes 108, 190, 192 and/or the hybrid optical switch 150 to provide or otherwise facilitate network services that include, but should not be limited to, communication services, on-demand video content services, video-sharing services, optical services, internet back-bone services, transport services, voice-over-internet-protocol services, voice services, compute services, analysis services, storage services, routing services, switching services, relay services, virtualized services, combinations thereof, and/or other virtualized or non-virtualized network services. It should be understood that the term "service" should be construed as one or more executing applications or any other computer-executable instructions that can provide a set of communication and/or network functions and operations on behalf of one or more network elements of the network 106, such as but not limited to the optical network nodes 108, 190, 192 and/or the hybrid optical switch 150, and therefore the term "service" is not used, and shall not be construed or interpreted, to invoke or pertain to any abstract idea or any judicial exception. The network services can be used by a service provider, by third parties, and/or by customers via user equipment, servers, and/or other virtualized and/or non-virtualized computing systems. Further discussion of embodiments of the network 106 is provided with respect to FIG. 6. It should be understood that the examples provided are for illustration purposes only, and therefore should not be construed as limiting in any way.

In various embodiments, users (e.g., the users 103, 105) can communicate with each other and/or obtain information through their UEs (e.g., the UEs 102, 104) via the network 106. Embodiments of a UE (e.g., any of the UEs 102 and/or 104) can include, but should not be limited to, a mobile communications device, a desktop computer, a laptop computer, a tablet, a smart wearable device (e.g., smart-glasses, a smart watch, a fitness device), a smart home appliance (e.g., a smart refrigerator, a smart thermostat), a smart television, a smart dongle, a vehicle head unit, in-vehicle entertainment, and/or any other computing systems that can send and/or receive communications with the network 106. It is understood that zero, one, or more than one instances of the UEs 102 and 104 can be present within various embodiments of the operating environment 100. Further discussion of an embodiment of a UE capable of implementing aspects of the operating environment 100 is provided below with respect to FIG. 5. It should be understood that the examples provided are for illustration purposes only, and therefore should not be construed as limiting in any way.

As technology becomes more prevalent in modern society, the amount of information being conveyed via data packets over one or more networks continues to increase. In some instances, the network 106 may experience requests for information from hundreds, thousands, or even millions of UEs, which collectively can correspond with information transfer amounting to terabytes (and/or terabits) of data. Embodiments of the present disclosure provide optical networking that can facilitate data transfer that is measured in integers of terabits per second (Tb/sec), such as multiples of tens or hundreds of Tb/sec, via a nanofiber communication path, such as the nanofiber communication paths 130 and 140. In some embodiments, the network 106 can communicatively couple one or more network nodes to a certain point within the network 106 that may have conventionally experienced bottlenecks or areas of network congestion. For example, in an embodiment, the optical network node 108 can communicatively couple with the hybrid optical switch 150 via one or more communication paths. A communication path can either correspond with a nanofiber communication path (e.g., the nanofiber communication path 130) or a non-nanofiber communication path (e.g., the non-nanofiber communication path 129). As such, in some embodiments, a nanofiber communication path (e.g., the nanofiber communication path 130) can be reserved for use for communicating data that is latency sensitive and/or exceeds a certain data throughput requirement that can be defined by the communication provider of the network 106, such as data packages that correspond with quality of service policies and data file sizes in excess of N gigabytes or terabytes (e.g., 100 gigabytes or 100 terabytes, etc.). In some embodiments, use of a nanofiber communication path may not be reserved for certain data or data conditions (e.g., latency sensitivity, priority, data file size, etc.), but can support any data carried via one or more hybrid optical vortex.

In some embodiments, the UE 102 can send (or request that another computing system send) a data package 107 to another computing device, such as the UE 104 or any other computer system. The data package 107 may be transformed and routed across the network 106 via one or more instances of network elements, such as the optical network nodes 108, 190, 192, and/or the hybrid optical switch 150. In various embodiments, an optical network node (e.g., any of the optical network nodes 108, 192) can provide communicative coupling between one or more network elements within the network 106. In an embodiment, the optical network node 108 can include a controller 109, an optical transceiver 110, an optical vortex transceiver 111, and a hybrid optical vortex transceiver 112. The controller 109 can include a processor 109A and a memory 109B that can store computer readable instructions that configure the processor 109A and the optical network node 108 to perform operations. The computer readable instructions of the controller 109 can take the form of an application, routine, or any other instruction that, when executed, configures and causes an optical network node (e.g., any of the optical network nodes 108, 190, 192) to perform one or more operations discussed herein. For example, in an embodiment, the optical network node 108 can receive the data package 107 from the UE 102 via the network access point 116. The controller 109 can analyze the data package 107 so as to determine how the data package 107 should be handled and which communication path should be employed in sending the data package 107 via the network 106.

The data package 107 can include information that can be configured as one or more data packets, such as an Internet Protocol packet ("IP packet") 125. In some embodiments, the data package 107 can include a plurality of data packets. The data package 107 can include a header, such as the IP header 126 associated with the IP packet 125. In some embodiments, the data package 107 may be sent to the optical network node 108 for routing and/or transfer within the network 106. In some embodiments, the IP header 126 can provide a latency priority identifier so as to indicate a quality of service level for the data package 107. The IP header 126 can include a destination address, such as an IP address that corresponds with a destination computing device, such as the UE 104. In some embodiments, the IP header 126 can trigger the optical network node 108 to use a nanofiber communication path (e.g., the nanofiber communication path 130) based on the destination address, the latency priority identifier, a package size, or a combination thereof. The data package 107 also can have a package size that indicates a file size or other quantitative metric (e.g., a bitrate) indicating an amount of data that corresponds with the data package 107 for a specified instance. In some embodiments, the data package 107 may correspond with a streaming session such that the entire size of the data package 107 cannot be determined in one instance because the communication session is ongoing. For example, the data package 107 may indicate a package size corresponding with 400 terabytes and/or corresponding with a streaming session that provides at least "8K" image resolution (i.e., a streaming image resolution quality that represents at least 7680×4320 pixels or the equivalent of approximately 30+Megapixels). In an embodiment, the data package 107 may indicate that the data packets should be transmitted across the network 106 so as to conform to a latency of no more than 20 milliseconds and/or provide a streaming session of at least 8K resolution at 60 frames per second. In some embodiments, the optical network node 108 can determine that the data package 107 and/or one or more data packets thereof, such as the IP packet 125, should be transmitted across the network 106 at terabit per second data rates, such as via the nanofiber communication path 130, based on the package size and/or latency priority indicator. In some embodiments, when the nanofiber communication path 130 is used, wavelength for an optical vortex color corresponding with a high priority may be used to generate an optical vortex of a hybrid optical vortex.

In some embodiments, the optical network node 108 can transmit information via a non-nanofiber communication path, such as the non-nanofiber communication path 129, via the optical transceiver 110 and/or the optical vortex transceiver 111. The optical transceiver 110 can transmit and/or receive data via beams and/or pulses of photons along a solid transparent optical fiber cable, such as the non-nanofiber communication path 129. The photons produced by the optical transceiver 110 do not have internal OAM and therefore do not have a helical mode (i.e., photons have zero topological charge and thus no twists). Put differently, the optical transceiver 110 does not create an optical vortex (i.e., a twisted photon) and photons emitted from the optical transceiver 110 do not have twists. As such, the data transfer rate along the non-nanofiber communication path 129 using the optical transceiver 110 is less than that of the nanofiber communication path. In some embodiments, the non-nanofiber communication path 129 can include a single mode and/or multi-mode fiber optic cable. It is understood that the phrase "non-nanofiber communication path" refers to any electrical wire cable and/or any optical fiber cable that does include a topological insulator material configured to support hybrid optical vortices, such as discussed herein. For illustration purposes only, the operating environment 100 can include one or more non-nanofiber communication paths, such as the non-nanofiber communication paths 129, 142, and 144 shown in FIG. 1. It should be understood that the examples provided are for illustration purposes only, and therefore should not be construed as limiting in any way.

In some embodiments, an optical network node (e.g., the optical network nodes 108, 190, and/or 192) can include an optical vortex transceiver, such as the optical vortex transceiver 111. The optical vortex transceiver 111 can be configured to generate an optical vortex (i.e., a twisted photon having a non-zero topological charge) using a single photon, an optical transceiver, and an optical vortex modulator. In some embodiments, the optical vortex transceiver 111 can generate and provide a single photon for transmission and modulation at a time. For example, the optical vortex transceiver 111 can include an optical transceiver that is positioned to transmit and/or receive photons through an optical vortex modulator such that when transmitting photons, the optical vortex modulator can configure the photon to twist and have a non-zero topological charge, where the amount of twists for a certain photon may be modulated by the optical vortex modulator. If the optical vortex transceiver 111 is receiving an optical vortex, then the optical vortex modulator may, in some embodiments, be configured to untwist the twisted photon such that the topological charge of the photon is a zero value (i.e., a zero helical mode thereby indicating that no twist is present). Examples of an optical vortex modulator can include, such as but not limited to a spiral phase mirror, a spiral phase plate, a computer-generated hologram, a spatial light modulator, a deformable mirror, a "q-plate" that includes a birefringent liquid crystal plate, or any other device or circuitry that can (dynamically) adjust the topological charge of a photon so as to provide a twist and/or remove a twist from the photon. In some embodiments, the optical vortex transceiver 111 can provide an optical vortex along the non-nanofiber communication path 129, which can be a multi-mode optical fiber cable.

In various embodiments, the optical network node 108 can include one or more instances of the hybrid optical vortex transceiver 112. The hybrid optical vortex transceiver 112 can include an optical transceiver 113 that can communicate and/or otherwise interact with an optical vortex modulator 114. The optical transceiver 113 can include circuitry to generate at least one single photon at a time. The optical transceiver 113 can include an optical transmitter, such as a laser driver, a pump pulse laser, a light emitting diode transmitter, or the like. The optical vortex modulator 114 can include at least one of the embodiments of the optical vortex modulator discussed above with respect to the optical vortex transceiver 111. In various embodiments, the controller 109 may be communicatively coupled to the optical vortex modulator 114 such that when a single photon is emitted by the optical transceiver 113 and passes through the optical vortex modulator 114, the optical vortex modulator 114 can configure and transform the single photon into a twisted photon having a topological charge that is non-zero. In some embodiments, the optical vortex modulator 114 can be dynamically adjustable by the controller 109 such that different photons can be assigned different topological charges, thereby enabling each photon to have a specific number of twists that can be the same and/or different from each other. For example, in some embodiments, the optical vortex modulator 114 can configure a single photon (that can be the first in a sequence of photons) with a first topological charge, and subsequent single photons (that can be a part of the sequence) with the same or different topological charges than the first topological charge of the first photon. It should be understood that the examples provided are for illustration purposes only, and therefore should not be construed as limiting in any way.

In various embodiments, after at least one photon (e.g., a photon 124) is emitted from the optical transceiver 113, the optical vortex modulator 114 configures the photon 124 so as to create an optical vortex, such as the optical vortex 122. The optical transceiver 113 can create a plurality of optical vortices in a sequence so as to create an optical vortex package, which will be discussed in further detail with respect to FIGS. 2A-2G. The optical vortex 122 can include the photon 124 that is configured to have a topological charge 123, and thus in some embodiments the optical vortex 122 can be referred to as a "twisted photon." The hybrid optical vortex transceiver 112 can generate photons (e.g., the photon 124) with a specific wavelength. In some embodiments, the wavelength of a photon corresponding to an optical vortex (e.g., the optical vortex 122) can be associated with the visible light spectrum that ranges from approximately 390 nanometers (nm) to approximately 700 nanometers as understood by one of ordinary skill in the technology. In some embodiments, the wavelength of a twisted photon within an instance of a hybrid optical vortex can correspond with a specific color, where the specific color may be referred to as an "optical vortex color." Examples of instances of an optical vortex color and corresponding wavelengths can include, but should not be limited to, red (e.g., corresponding to wavelengths 635-700 nm), orange (e.g., corresponding to wavelengths 590-635 nm), yellow (e.g., corresponding to wavelengths 560-590 nm), green (e.g., corresponding to wavelengths 520-560 nm), cyan (e.g., corresponding to wavelengths 490-520 nm), blue (e.g., corresponding to wavelengths 450-490 nm), or violet (e.g., corresponding to wavelengths 400-450 nm), as understood by one of ordinary skill in the technology. Further discussion of optical vortex colors and corresponding wavelengths are provided below with respect to an optical vortex protocol map, which described with respect to FIGS. 2A-2G below.

In some embodiments, a plurality of optical vortices can be generated by the hybrid optical vortex transceiver 112, where each of the plurality of optical vortices can each have a twisted photon (i.e., optical vortex) that is configured with a topological charge that has specific value, which can vary based on the data that is being represented by the topological charge. Each instance of an optical vortex (and thus each instance of a hybrid optical vortex) can have a polarity which is indicated by a positive or negative value for a topological charge. For example, the topological charge 123 can be a positive or a negative non-zero integer value that corresponds with the amount of twists that the twisted photon 124 provides per wavelength. In an embodiment, a positive value of a topological charge (e.g., the topological charge 123) can correspond with a positive polarity (e.g., twisting in a right-handed direction about an axis) and a negative value of a topological charge (e.g., the topological charge 123) can correspond with a negative polarity (e.g., twisting in a left-handed direction about an axis). In some embodiments, the hybrid optical vortex transceiver 112 can create an optical vortex that has a topological charge value within a preconfigured range, where the preconfigured range corresponds with a positive and/or negative integer value that can be dynamically provided by the optical vortex modulator 114. In some embodiments, the preconfigured range of the topological charge can be, for example without limitation, negative "65,535" (i.e., 65,535 twists per wavelength in a negative spin direction according to a coordinate system that can be applied to the operating environment 100) to positive "65,535" (i.e., 65,535 twists per wavelength in a positive spin direction according to a coordinate system that can be applied to the operating environment 100). In some embodiments, the range of twists (i.e., the topological charge values) from 1 to 65,535 (or another upper-end topological charge value) can correspond with an optical signal protocol that is discussed with respect to FIGS. 2A-2G. In an embodiment, a negative topological charge value (e.g., negative polarity) corresponds with a photon twist that rotates in a counter clockwise direction about an optical thread axis from the optical network node 108 to the hybrid optical switch 150, and a positive topological charge value (e.g., positive polarity) corresponds with a photon twist that rotates in a clockwise direction. In some embodiments, the topological charge 123 of the twisted photon 124 can have a positive or negative value with an integer that can be as low as "1" (i.e., one twist per wavelength) and as high as "90,000" (90,000 twists per wavelength). It is understood that a topological charge value of zero ("0") would indicate no twists per wavelength, and therefore the photon would not be configured as an optical vortex. It should be understood that the examples provided are for illustration purposes only, and therefore should not be construed as limiting in any way.

In various embodiments, an optical vortex, such as the optical vortex 122, can be configured to encapsulate and/or encode information using a topological charge of the optical vortex. For example, the number of twists of the photon 124 (which indicates the topological charge 123 of the optical vortex 122) can correspond with a binary string that conforms to an optical vortex protocol, which will be discussed in further detail with respect to FIGS. 2A-2G. In an embodiment, each optical vortex that is generated by the optical vortex transceiver 111 and/or the hybrid optical vortex transceiver 112 can encode an optical vortex with information from at least one data packet by adjusting and/or providing an amount of topological charge via an optical vortex modulator, such as the optical vortex modulator 114. For example, the controller 109 of the optical network node 108 can receive the data package 107 and analyze the IP packet 125 therein to determine which communication path the data package 107 should be sent and how one or more IP packets should be encoded (i.e., how many twists an optical vortex should have that carries and encapsulates the data packet, such as the IP packet 125). In some embodiments, the IP packet 125 can include the IP header 126 that has a destination network address (e.g., an IP address, a media access control address, or any other type of network address) corresponding with a final and/or intermediate destination network device, such as for example, an IP address corresponding to the UE 104, the hybrid optical switch 150, or any other network addressable device. The controller 109 can determine that the data package 107 and/or one or more IP packets included therein (e.g., the IP packet 125) should be sent to the destination network address of the UE 104 by way of the hybrid optical switch 150 via the nanofiber communication path 130, according to an embodiment. The controller 109 can determine a topological charge (that is, number of twists) that should be used to encode and represent information from one or more data packets, such as an instance of the IP packet 125. In some embodiments, the topological charge representing a data packet can be based on the controller 109 determining a binary string that represents the data packet (e.g., a unique binary string that is generated based on information that is to be carried by the optical vortex and/or hybrid optical vortex, such as information from an instance of the IP packet 125 or a checksum). As such, each instance of the IP packet 125 can correspond with a unique binary string, which is discussed in further detail with respect to FIG. 2G. The controller 109 can then map the unique binary string for the IP packet 125 to a topological charge value indicated on an optical vortex protocol map 117, thereby enabling determination of an amount of twists that should be imparted, imposed, or otherwise provided by the optical vortex modulator 114 to the photon 124 to create the optical vortex 122 having the topological charge 123. By this, the IP packet 125 can be encapsulated within the optical vortex 122 via the topological charge 123 of the optical vortex 122.

In various embodiments, the hybrid optical vortex transceiver 112 can include an electron coupler 115 that is configured to transform an optical vortex (e.g., the optical vortex 122) into a hybrid optical vortex (e.g., a hybrid optical vortex 120). The optical vortex 122 can be directed by the hybrid optical vortex transceiver 112 onto the electron coupler 115 such that the single photon 124 of the optical vortex 122 is electrodynamically influenced by a single electron 121 thereby coupling the electron 121 and the photon 124 of the optical vortex 122 so as to create the hybrid optical vortex 120. The electron 121 can become coupled to the optical vortex 122 so as to create the hybrid optical vortex 120 because the electron coupler 115 can include a transition connector that comprises a topological insulator material ("topological insulator") that is configured to connect and provide a topologically protected surface transition from the hybrid optical vortex transceiver 112 to a nanofiber optical thread 133 of the nanofiber communication path 130. The electron 121 can be a "surface electron," that is an electron from a topologically protected surface of a topological insulator material, such as from the electron coupler 115 and/or the nanofiber optical thread 133 of the nanofiber communication path 130. A topological insulator material, such as a topological insulator material 135 of the nanofiber optical thread 133 of the nanofiber communication path 130, refers to a material that, within its interior structure, behaves as an insulator, but at its surface, provides conducting surface states that are symmetry-protected through particle number conservation and time-reversal symmetry, thereby providing topologically protected surface states that cannot be localized (i.e., are gapless) and cannot be removed by defects along the material surface or by non-magnetic impurities, which is in contrast to conventional, ordinary insulator materials which do not have topologically protected surface states and thus may cause absorption, reflection, and/or refraction from their surface. Examples of a topological insulator material (e.g., the topological insulator material 135 of the nanofiber optical thread 133 of the nanofiber communication path 130) can include, but should not be limited to, bismuth selenide ($Bi_2Se_3$), bismuth-antimony ($Bi_{1-x}Sb_x$) (where "x" denotes any integer yielding a non-zero subscript value), or antimony telluride ($Sb_2Te_3$). When the photon 124 of the optical vortex 122 is coupled to the electron 121 (thereby creating the hybrid optical vortex 120), the electron 121 can provide and act as a screening layer for the photon 124 of the optical vortex 122 (i.e., for the twisted photon) by suppressing absorption of the optical vortex 122 into a topologically protected surface (e.g., the topologically protected surface 136 of the nanofiber optical thread 133 of the nanofiber communication path 130). This means that the optical vortex 122 of the hybrid optical vortex 120 can move with the electron 121 along a topological protected surface of a topological insulator (e.g., a topographically protected surface 136 of a topological insulator material 135 of the nanofiber optical thread 133) without being absorbed into and/or reflected by the nanofiber optical thread 133 of the nanofiber communication path 130. This can enable the hybrid optical vortex 120 to navigate a curved section (i.e., non-linear segment) of an installed portion of optical fiber cable (e.g., the path curve 130A of the nanofiber communication path 130) without yielding a loss in signal power and/or decrease in optical signal quality. The topological insulator material 135 can be configured to form one or more instances of the nanofiber optical thread 133 so as to provide the topological protected surface 136 that supports one or more instances of a hybrid optical vortex (e.g., the hybrid optical vortex 120). It should be understood that the examples provided are for illustration purposes only, and therefore should not be construed as limiting in any way.

In various embodiments, the nanofiber communication path 130 can be configured without internal and/or external temperature regulation and/or imposed thermal alteration (e.g., inclusion of a thermal insulator and/or a heat exchanger such as a cryogenic coolant layer), thereby enabling operation at an ambient temperature of the surrounding environment. This can occur because the topologically protected surface 136 of the nanofiber optical thread 133 can maintain a time reversal symmetry surface state without the presence of a thermodynamic heat exchanger, thereby allowing operation of the nanofiber communication path 130 at various temperatures of the operating environment 100. In various embodiments, instances of a nanofiber communication path (e.g., the nanofiber communication path 130) are not temperature sensitive, and therefore can operate and provide support for hybrid optical vortices when internal temperatures are above or below zero degrees Celsius. As such, the nanofiber communication path 130 may not include thermal regulation components, such as heat-exchanger devices and/or materials. For example, the nanofiber communication path 130, in an embodiment, does not include, incorporate, and/or rely on the use of cooling tubes or cryogenic layers that could provide a thermodynamic heat exchange so as to maintain a relatively cold operating temperature, such as below zero degrees Celsius. By this, the cross-sectional size of the nanofiber communication path 130 (e.g., diameter, width, height, etc.) can be used to include nanofiber optical threads (e.g., one or more of the nanofiber optical thread 133), thereby increasing throughput data rate capacity, which in turn can reduce network latency for the network 106.

In various embodiments, the operating environment 100 can include one or more instances of a nanofiber communication path, such as the nanofiber communication paths 130 and 140. In some embodiments, the nanofiber communication paths 130 and 140 can be configured substantially similar to each other. The nanofiber communication path 130 can optically couple the hybrid optical switch 150 with one or more optical network nodes, such as the optical network nodes 108, 192, and/or 190. In various embodiments, the nanofiber communication path 130 can include a plurality of nanofiber optical threads 132, such as shown in FIG. 1 as two or more instances of the nanofiber optical thread 133. The nanofiber communication path 130 can be configured with an elongated linear and/or non-linear cylindrical shape that extends along a communication path axis 139. In some embodiments, the nanofiber communication path 130 can include a charge core thread 138 that can be centered about, and extend along, the communication path axis 139. The charge core thread 138 can provide a power wire that provides and propagates a polarity (positive or negative) such that electrons of one or more hybrid optical vortices can be provided in a particular axial direction along the nanofiber communication path 130. The nanofiber communication path 130 can include a sheath 131 that axially surrounds the plurality of nanofiber optical threads 132. In various embodiments, the sheath 131 can be configured to be flexible so as to allow for non-linear curved segments within the nanofiber communication path 130, such as a path curve 130A shown in FIG. 1. The plurality of nanofiber optical threads 132 can be radially located within the nanofiber communication path 130 so as to be between the charge core thread 138 and the sheath 131. In some embodiments, each of the plurality of nanofiber optical threads 132 may be separated by a flexible fill material (i.e., a flexible, electrically non-conductive insulating material that is not a topological insulator material). The flexible fill material can be adjacent an outer surface 133A of the nanofiber optical thread 133 so that one instance the nanofiber optical thread 133 within the plurality of nanofiber optical threads 132 does not touch another instance of the nanofiber optical thread 133 within the plurality nanofiber optical threads 132. It should be understood that the examples provided are for illustration purposes only, and therefore should not be construed as limiting in any way.

In various embodiments, an instance of a nanofiber optical thread, such as the nanofiber optical thread 133, can extend along an optical thread axis 134, where the optical thread axis 134 can be radially separated from the communication path axis 139 and can axially extend substantially parallel to the communication path axis 139. The nanofiber optical thread 133 can be configured from a topological insulator material, such as the topological insulator material 135. The nanofiber optical thread 133 can be configured such that at least one side of the topological insulator material 135 provides a topologically protected surface 136. For example, in some embodiments, the nanofiber optical thread 133 can be configured to provide a hollow cylindrical shape (e.g., a pipe or tube shape) that extends along the optical thread axis 134. In this embodiment, an inner surface 133B of the nanofiber optical thread 133 can face the optical thread axis 134 and provide the topologically protected surface 136. The topologically protected surface 136 of the nanofiber optical thread 133 can provide a topologically protected surface path 137 by which the hybrid optical vortex 120 can travel along the inner surface 133B using the electron 121 that moves along the topologically protected surface 136 in an axial direction based on the polarity of the charge core thread 138 (e.g., in a direction from the optical network node 108 that generated the hybrid optical vortex 120 to the hybrid optical switch 150 that can receive the hybrid optical vortex 120). In some embodiments, the nanofiber optical thread 133 can be configured such that the topologically protected surface path 137 forms a helix along one or more portions of the topologically protected surface 136 formed by the inner surface 133B of the nanofiber optical thread 133. Thus, the electron 121 of the hybrid optical vortex 120 can trace the topologically protected surface 136 along whatever shape of the topologically protected surface path 137 that is provided by the nanofiber optical thread 133. By this, the nanofiber communication path 130 can enable the hybrid optical vortex 120 to navigate twists, turns, curves, and any other non-linear segment, thereby mitigating optical signal loss and maintaining optical signal quality by reducing reflection and refraction along the nanofiber optical thread 133, which is in contrast to conventional single mode and/or multi-mode optical fiber cables that use reflection and/or refraction to navigate photons around curved or any other non-linear path. It should be understood that the examples provided are for illustration purposes only, and therefore should not be construed as limiting in any way.

In an embodiment, an instance of the nanofiber optical thread 133 can be configured such that the walls of the nanofiber optical thread are discontinuous (i.e., not in a hollow pipe shape), but instead are configured to provide an alpha-helix ribbon shape that extends along the optical thread axis 134. When the topological insulator material 135 of the nanofiber optical thread 133 is formed to provide an alpha helix, the topologically protected surface 136 corresponds with the inner surface that points towards the optical thread axis 134 and provides an instance of the topologically protected surface path 137 that is configured in an alpha helix shape. It should be understood that the examples provided are for illustration purposes only, and therefore should not be construed as limiting in any way.

In various embodiments, instances of the nanofiber optical thread 133 can collectively provide the plurality of nanofiber optical threads 132 of the nanofiber communication path 130. It is understood that the nanofiber optical thread 133 can be configured to extend various lengths (i.e., extending along the optical thread axis 134), where the length of the nanofiber optical thread 133 can vary depending on application within the network 106. The nanofiber communication path 130 can be configured to provide orders of magnitude for more data throughput (e.g., 20,000 times more throughput that can provide for 100 Terabit per second transfer rates) than conventional fiber optic cables due to the plurality of nanofiber optical thread 132 being up to thousands of times thinner than conventional optical fiber cables. For example, the nanofiber optical thread 133 can have a wall thickness ("topological insulator thickness") that is a defined thickness of the topological insulator material 135 measured in nanometers, such as shown in FIG. 1 as a topological insulator thickness 135A of the topological insulator material 135. In some embodiments, the topological insulator thickness 135A can be at least 10 nanometers thick, up to 5,000 nanometers thick, or any thickness therebetween. It is understood that the topological insulator thickness 135A is measured as the distance between an inner surface 133B and an outer surface 133A of the nanofiber optical thread 133. The inner surface 133B of the nanofiber optical thread 133 can be radially measured from the optical thread axis 134, which corresponds with the center of the nanofiber optical thread 133 when viewed as a cross-section. In some embodiments, the inner radius of the nanofiber optical thread 133 (i.e., from the optical thread axis 134 to the inner surface 133B) can be at least 10 nanometers, as much as 25,000 nanometers, or any thickness therebetween. In some embodiments, the outer radius provided by the outer surface 133A of the nanofiber optical thread 133 (i.e., from the optical thread axis 134 to the outer surface 133A) can be at least 10 nanometers, as much as 25,000 nanometers, or any thickness therebetween. It is understood that the outer radius provided by the outer surface 133A is larger than the inner radius provided by the inner surface 133B of the nanofiber optical thread 133. It is also understood that the nanofiber optical thread 133 can be configured to use the topological insulator material 135 to provide the topologically protected surface 136, which corresponds with the inner surface 133B of the nanofiber optical thread 133. As such, the topologically protected surface 136 of the nanofiber optical thread 133 can provide the topologically protected surface path 137 by which the hybrid optical vortex 120 traces so as to navigate along the nanofiber communication path 130 without reflection and/or refraction due to the electron 121 suppressing absorption of the photon 124 within the nanofiber optical thread 133. It is understood that the topologically protected surface path 137 can correspond with any portion of the topologically protected surface 136 of the nanofiber optical thread 133, and therefore should not be construed as being limited to the specific shape shown in the embodiment of FIG. 1. It should be understood that the examples provided are for illustration purposes only, and therefore should not be construed as limiting in any way.

In an embodiment, two instances of the nanofiber optical thread 133 can concentrically share the same optical thread axis 134 such that a first, larger instance of the nanofiber optical thread 133 is concentrically located around a second, smaller instance of the nanofiber optical thread 133, with each extending along the same optical thread axis 134. Thus, the outer radius of the second smaller instance of the nanofiber optical thread 133 is smaller than the inner radius of the first, larger instance of the nanofiber optical thread 133. In this embodiment, a first hybrid optical vortex can be provided along a topologically protected surface (e.g., an inner wall) of the first, larger instance of the nanofiber optical thread 133, while a second hybrid optical vortex can be provided within the second, smaller instance of the nanofiber optical thread 133. In some embodiments, multiple concentric instances of the nanofiber optical thread 133 can surround each other, where each instance is smaller and/or larger than an adjacent instance of the nanofiber optical thread 133. The outer surface of the largest instance of the nanofiber optical thread 133 within the set of concentric nanofiber optical threads may be wrapped with a sheath and/or a film that is electrically non-conductive. By this, the data package 107 can be segmented into multiple instances of data packets (e.g., the IP packet 125), and each data packet can be encapsulated in a hybrid optical vortex and sent along a different instance of nanofiber optical thread 133 within the set of concentric nanofiber optical threads, thereby allowing two or more instances of data packets (or all of the data packets of a data package) to arrive at a destination (e.g., the hybrid optical switch 150) at the same time. The data package 107 (which may be encapsulated in a hybrid optical vortex package discussed below) can be reassembled starting from the inner-most nanofiber optical thread to the outer-most nanofiber optical thread, or vice-versa. In some embodiments, a nanofiber communication path can include one or a plurality of sets of concentric nanofiber optical threads. It should be understood that the examples provided are for illustration purposes only, and therefore should not be construed as limiting in any way.

As illustrated in FIG. 1, the operating environment 100 can include an embodiment of an instance of the nanofiber communication path 130 that can have a cylindrical configuration, however it is understood that this may not necessarily be the case for all embodiments. Some embodiments of a nanofiber communication path may be configured in various shapes, while still providing one or more nanofiber optical threads. For example, in some embodiments, the sheath 131 of the nanofiber communication path 130 can be configured in an elongated rectangular shape such that the nanofiber communication path 130 can lay flat on the ground when installed, thereby enabling multiple nanofiber communication paths to be bundled together in a linear stack. The nanofiber communication path 130 can include any combination of shapes of nanofiber optical threads. It should be understood that the examples provided are for illustration purposes only, and therefore should not be construed as limiting in any way.

In some embodiments, a plurality of instances of the hybrid optical vortex 120 can be sent sequentially along one instance of the nanofiber optical thread 133 of the nanofiber communication path 130, and/or sent in parallel over multiple instances of the nanofiber optical thread 133 of the nanofiber communication path 130. The plurality of instances of the hybrid optical vortex 120 can conform to an optical vortex protocol, which can be defined in the optical vortex protocol map 117 that is stored and utilized by one or more nodes of the network 106 (e.g., any of the hybrid optical switch 150 and/or the optical network nodes 108, 190, 192). In some embodiments, each instance of the hybrid optical vortex 120 (with each instance having the same and/or different topological charge) can correspond with a separate data packet (e.g., one or more of the IP packets 125 of the data package 107). Further discussion of multiple instances of the hybrid optical vortex 120 sent as a hybrid optical vortex package will be discussed with respect to FIGS. 2A-2G. It should be understood that the examples provided are for illustration purposes only, and therefore should not be construed as limiting in any way.

As shown in FIG. 1, the operating environment 100 can include two or more instances of a nanofiber communication path within a network, such as the nanofiber communication paths 130 and 140 within the network 106. In some embodiments, one instance of a nanofiber communication path (and/or one or more non-nanofiber communication paths) may be discussed or referred to according to a number (e.g., first, second, third, etc.) and/or a relative function and/or position (e.g., incoming/prior nanofiber communication path or an outgoing/subsequent nanofiber communication path). For example, in an embodiment, the nanofiber communication paths 130, 140 may be referred to as a first nanofiber communication path and a second nanofiber communication path, respectively. As another example, from the viewpoint of the hybrid optical switch 150, the nanofiber communication path 130 and/or the optical communication path 129 may be considered a prior and/or incoming communication path, and the nanofiber communication path 140 and/or the optical communication paths 142, 144 may be considered a subsequent and/or outgoing communication path. It is understood that the use of such terms should not be construed as indicating an order, preference, hierarchy, relative importance, or be limiting in any way. Moreover, any numbering convention used in the claims (e.g., first, second, third, fourth, etc.) with regard to any recitation in the claims are provided for clarification purposes only, and should not be interpreted as indicating an order, preference, hierarchy, and/or relative importance unless indicated as such in the claims.

In various embodiments, the network 106 can include one or more instances of the hybrid optical switch 150. The hybrid optical switch 150 can be communicatively coupled to one or more network devices via a non-nanofiber optical communication path (e.g., one or more of the optical communication paths 129, 142, 144) and/or a nanofiber communication (e.g., the nanofiber communication paths 130, 140). The hybrid optical switch 150 can include a processor 151 and a memory 152. The processor 151 can include one or more hardware components that perform computations to process data, and/or to execute computer-executable instructions of one or more application programs, operating systems, and/or other software, to provide, at least in part, any services and performance of one or more operations and functions described herein. The processor 151 can include one or more instances of compute resources, such as but not limited to central processing units ("CPUs") configured with one or more processing cores, one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processor 151 can include one or more system-on-chip ("SoC") components along with one or more other hardware components, including, for example, one or more of memory resources of the memory 152. In some embodiments, the memory 152 can include volatile and/or non-volatile memory implemented in any method or technology for storage of information such as computer-readable instructions, data structures, program modules, or other data disclosed herein. It is understood that, use of the term "memory" and "computer storage medium" in the claims do not include, and shall not be construed to include, a wave or a signal per se and/or communication media.

In some embodiments, the processor 151 can include one or more instances of hardware components that can in accordance with an ARM architecture that is available for license from ARM HOLDINGS of Cambridge, United Kingdom, an architecture available from INTEL CORPORATION of Mountain View, Calif., an architecture available from QUALCOMM of San Diego, Calif., an architecture available from NVIDIA of Santa Clara, Calif., an architecture available from HUMMINGBIRD, an architecture from SAMSUNG of Seoul, South Korea, an architecture from AMD of Santa Clara, Calif., an architecture from TEXAS INSTRUMENTS of Dallas, Tex., a customized version of any of the above architectures, a proprietary architecture, or any other compute resources. It should be understood that the examples provided are for illustration purposes only, and therefore should not be construed as limiting in any way.

In various embodiments, the memory 152 can include a hybrid optical vortex control application ("control app") 153 that can include computer readable instructions that configure a processor, such as the processor 151, to perform operations discussed herein, including but not limited to, the handling, analysis, routing, and switching of optical communications via the hybrid optical switch 150. In some embodiments, an instance of the control app 153 may be installed on one or more network devices in the network 106 (e.g., such as any of the hybrid optical switch 150 and/or the optical network nodes 108, 190, and/or 192) and provide computer-executable and/or computer-readable instructions so as to configure the network device to perform operations discussed herein, such as any of the recitations and operations discussed with respect to FIG. 1, FIGS. 2A-2G, and/or FIGS. 3A-3E. In some embodiments, the control app 153 can instruct, command, and/or control operations and/or analysis performed by one or more components within one or more network devices, such as but not limited to an electron decoupler 158, a quantum scissor 160, an optical holding track 165, a quantum analyzer 162, a quantum entangler 161, a demultiplexer 166, an electron coupler 167, the processor 151, the controller 109, the optical transceiver 110, the optical vortex transceiver 111, the hybrid optical vortex transceiver 112, the optical transceiver 113, the optical vortex modulator 114, the electron coupler 115, or any other component that may be used in optical networking using optical vortices and/or hybrid optical vortices via the network 106. It should be understood that the examples provided are for illustration purposes only, and therefore should not be construed as limiting in any way.

The memory 152 can store an instance of the optical vortex protocol map 117 that can be used by the hybrid optical switch 150 for operations discussed herein, such as but not limited to verifying communication path integrity, determining a topological charge for generation of an optical vortex and/or a hybrid optical vortex, and handling data packets carried by one or more instances of a hybrid optical vortex and/or an optical vortex through analysis of a wavelength, optical vortex color, and/or topological charge value provided by a topological charge for the one or more instances of the hybrid optical vortex and/or the optical vortex. Further discussion of the optical vortex protocol map 117 is provided below and with respect to FIG. 2G.

The memory 152 can store one or more instances of a communication path type identifier 154, where each instance of the communication path type identifier 154 can include a string of characters and/or numbers that correspond with and identify a type of communicative coupling and an identification for a particular communication path with the network device (e.g., the hybrid optical switch 150). For example, an instance of the communication path type identifier 154 can indicate a nanofiber communication path type that corresponds with a nanofiber communication path (e.g., the nanofiber communication paths 130, 140) based on the nanofiber communication path having a topological insulator material (e.g., the topological insulator material 135) that is configured to provide a topologically protected surface that defines a topologically protected surface path to support a hybrid optical vortex (e.g., via a nanofiber optical thread). In the embodiment of the operating environment 100 shown in FIG. 1, the nanofiber communication paths 130 and 140 can each be associated with an instance of the communication path type identifiers 154 that represent a nanofiber communication path type and may provide unique path identifiers for the nanofiber communication paths 130, 140 so as to indicate that each of the nanofiber communication paths 130, 140 can support optical networking using a hybrid optical vortex, such as based on the nanofiber communication path having an nanofiber optical thread that includes a topological insulator material.

Another instance of the communication path type identifier 154 can correspond with a non-nanofiber communication path type that can indicate any other electrical and/or optical communication path that does not include a topological insulator material configured to support a hybrid optical vortex (e.g., any of the non-nanofiber communication paths 129, 142, and/or 144). As discussed herein, any communication path that does not support (i.e., enable or otherwise facilitate the traversal and communicative coupling) optical networking via hybrid optical vortices (e.g., any of the non-nanofiber communication paths 129, 142, and/or 144) may be referred to as a "non-nanofiber communication path." A non-nanofiber communication path (e.g., any of the non-nanofiber communication paths 129, 142, 144) does not provide a continuous, topologically protected surface between network devices (e.g., the optical network node 108 and the hybrid optical switch 150) for hybrid optical vortices to travel along a topologically protected surface path, which is in contrast to a nanofiber communication path (e.g., the nanofiber communication path 130) that provides a continuous, topologically protected surface defining a topologically protected surface path (e.g., the inner surface 133B of the nanofiber optical thread 133 that defines the topologically protected surface path 137 by which hybrid optical vortices can be supported and may not be absorbed or reflected). An instance of the communication path type identifier 154 that corresponds with a non-nanofiber communication path (e.g., any of the non-nanofiber communication paths 129, 142, and 144) can indicate that the non-nanofiber communication path does not provide support to carry a hybrid optical vortex because the non-nanofiber communication path does not include a topological insulator material that is configured to define a topologically protected surface path to and/or from a network device (e.g., the hybrid optical switch 150). The communication path type identifier 154 corresponding with a non-nanofiber communication path (e.g., any of the non-nanofiber communication paths 129, 142, and 144) can indicate a unique non-nanofiber path identifier and can indicate if the non-nanofiber communication path supports optical networking (e.g., using an optical vortex but not a hybrid optical vortex) via a single mode and/or multi-mode fiber optic cable, and/or if the non-nanofiber communication path supports electrical networking (e.g., using electrical signals to carry data packets via a wire cable, such as a Cat5 cable, Cath cable, Cat7 cable, or the like). It is understood that non-nanofiber communication paths (e.g., any of the non-nanofiber communication paths 129, 142, and 144) can include a fiber optic cable and/or an electrical cable that does not have a topological insulator material (e.g., fiber optic cables and/or wire cables that do not include a topological insulator material) configured to support and carry a hybrid optical vortex between network devices (e.g., between the optical network node 108 and the hybrid optical switch 150).

In some embodiments, each of the instances of the communication path type identifiers 154 can indicate a throughput data rate (e.g., Tb/sec) and/or a latency indication (e.g., measured in nanoseconds and/or milliseconds) between network device hops (e.g., between the optical network node 108 and the hybrid optical switch 150) if a particular communication path is employed to carry one or more data packets (e.g., the IP packet 125). The instances of the communication path type identifiers 154 that correspond with a nanofiber communication path (e.g., the nanofiber communication paths 130, 140) can indicate that the nanofiber communication paths have higher (or the highest) throughput data rate and lower (or the lowest) latency indication compared to the non-nanofiber communication paths. In some embodiments, the nanofiber communication path types indicated by an instance of the communication path type identifier 154 may be associated with an optical vortex color, such as discussed below with respect to FIG. 2G. As such, the nanofiber communication paths 130, 140 may be configured to carry high priority information using hybrid optical vortices, which may be defined and configured according to an optical vortex protocol in an optical vortex protocol map discussed below. In some embodiments, an optical vortex color may be reserved for data packets with high-priority when the optical vortex color of an optical vortex corresponds with a communication path type identifier 154 associated with a nanofiber communication path (e.g., the nanofiber communication path 140), and as such, a subsequent communication path can be determined to correspond with a second nanofiber communication path (e.g., the nanofiber communication path 140) if the optical vortex has an optical vortex color that corresponds to a communication path type identifier 154 for the nanofiber communication path. In some embodiments, instances of the communication path type identifier 154 for non-nanofiber communication paths (e.g., the non-nanofiber communication paths 129, 142, 144) may be associated with another optical vortex color that is different than the optical vortex color used to indicate that a subsequent path should be an instance of a nanofiber communication path. As such, the non-nanofiber communication paths may be designated for use with normal or low priority optical routing without the use of hybrid optical vortices. It is understood that the communication path type identifiers 154 can be stored and used by one or more network devices within the network 106 (e.g., any of the optical network nodes 108, 190, 192 and the hybrid optical switch 150). It should be understood that the examples provided are for illustration purposes only, and therefore should not be construed as limiting in any way.

The memory 152 can store a validation checksum 155 that can be used by a network node (e.g., any of the optical network nodes 108, 190, 192 and/or the hybrid optical switch 150) to determine whether a nanofiber communication path (e.g., the nanofiber communication path 130) is functional and operating as expected. The validation checksum 155 can, in some embodiments, take the form of a token, data file, key, data structure, or any other computer readable instruction that provides one or more values corresponding to a topological charge that is expected ("optical vortex checksum") to be present at the last optical vortex within a sequence of hybrid optical vortices that correspond with the same data package (e.g., the data package 107). The control app 153 can compare the value indicated by the validation checksum 155 to an optical vortex checksum (e.g., an optical vortex checksum 232A) that is represented by a topological charge of the last hybrid optical vortex in a sequence, which will be discussed in further detail below with respect to FIGS. 2A-2G. If the control app 153 determines the optical vortex checksum 232A matches the value of the validation checksum 155, then the nanofiber communication path 130 is determined to be functional and operating as expected. If the control app 153 determines the optical vortex checksum 232A does not match the value of the validation checksum 155, then the nanofiber communication path 130 is determined to have an error, and one or more nanofiber optical threads are not functioning and/or operating as expected. It should be understood that the examples provided are for illustration purposes only, and therefore should not be construed as limiting in any way.

The memory 152 can store a routing map 156 that can be used by a network node (e.g., any of the optical network nodes 108, 190, 192 and/or the hybrid optical switch 150) to determine a network address of a next network hop and route one or more hybrid optical vortex and/or optical vortex that carries data packets to the next network hop by switching a data packet carried in a hybrid optical vortex from one communication path to another, such as from the nanofiber communication path 130 to the nanofiber communication path 140. The routing map 156 can include a routing table that has a plurality of network addresses (e.g., IP addresses or other addresses) corresponding to communicatively coupled network nodes (e.g., any of the optical network nodes 108, 190, 192 that are communicatively coupled to the hybrid optical switch 150). In some embodiments, the network address for the next network hop (e.g., the optical network node 192) can be included in the IP header 126 which can be encoded in the topological charge 123 of the hybrid optical vortex 120. The control app 153 can determine the value provided by the topological charge 123 (i.e., number of photon twists) of the optical vortex 122 of the hybrid optical vortex 120, where the value provided by the topological charge 123, in some embodiments, can be translated from a topological charge value 242 into a binary string 240 using the optical vortex protocol map 117, as illustrated by FIG. 2G, where the binary string 240 can provide a network address (e.g., an IP address for the next hop and/or the destination user equipment, such as the optical network node 192 and/or the UE 104) from the IP header 126 of the IP packet 125 carried by the hybrid optical vortex 120. Further discussion of use of the optical vortex protocol map 117 will be provided with respect to FIG. 2G.

In some embodiments, the control app 153 can switch and route the incoming IP packet 125 encapsulated by a hybrid optical vortex from a first nanofiber communication path to a second nanofiber communication path (e.g., from the nanofiber communication path 130 to the nanofiber communication path 140) while preserving the information from the IP packet 125 within one or more instances of an optical vortex during handling by the hybrid optical switch 150, where the second nanofiber communication path (e.g., the nanofiber communication path 140) can carry one or more instances of data packets (e.g., the IP packet 125) to the next hop and/or to the destination user equipment in an instance of a hybrid optical vortex. It should be understood that the examples provided are for illustration purposes only, and therefore should not be construed as limiting in any way.

In some embodiments, the hybrid optical switch 150 can switch one or more data packets carried by an instance of the hybrid optical vortex 120 from a first nanofiber communication path to a second nanofiber communication path (e.g., from the nanofiber communication path 130 to the nanofiber communication path 140) while preserving and maintaining the value of the topological charge 123 of the optical vortex 122 from the hybrid optical vortex 120. For example, in an embodiment, the hybrid optical switch 150 can receive the hybrid optical vortex 120 at an electron decoupler, such as the electron decoupler 158. The electron decoupler 158 can be included in any network device that provides optical communication using hybrid optical vortices, such as the hybrid optical switch 150 that is communicatively coupled to the optical network nodes 108, 192 via the nanofiber communication paths 130, 140, respectively. The electron decoupler 158 can include a topological insulator transition connector that includes a portion of a topological insulator material that is adjacent to a topologically unprotected surface (i.e., a surface of an optical fiber that is not topologically protected) that does not provide a topologically protected surface state. By this, when an instance of the hybrid optical vortex 120 passes from the nanofiber optical thread 133 of the nanofiber communication path 130 to the electron decoupler 158, the hybrid optical vortex 120 is disassembled because the electron 121 separates or otherwise decouples from the optical vortex 122 that was included in the hybrid optical vortex 120. The electron decoupler 158 can include an optical receiver that is optically connected to the topological insulator material transition so as to maintain the optical vortex 122 and preserve the topological charge 123 that is used to encode and/or encapsulate a data packet (e.g., the IP packet 125). In various embodiments, when the optical vortex 122 is decoupled from the electron 121, the control app 153 can switch the optical vortex 122 to another communication path (e.g., the nanofiber communication path 140) without converting the optical vortex 122 into an electrical signal and/or can perform analysis on the optical vortex 122 while maintaining at least one instance of an optical vortex that has the same topological charge as the topological charge 123 of the optical vortex 122.

In an embodiment, the control app 153 can send the optical vortex 122 directly from the electron decoupler 158 to an optical holding track, such as the optical holding track 165, such that the optical vortex 122 bypasses the quantum scissor 160. In various embodiments, the optical holding track 165 can preserve an instance of an optical vortex (e.g., the optical vortex 122 and/or an optical vortex 171 discussed below) in an optical vortex state until the optical vortex is released and directed to a subsequent communication path, such as the nanofiber communication path 140 or the non-nanofiber communication path 144. The optical holding track 165 can include a multi-mode fiber optic cable that is configured in a circular shape and can include an optical gate that can accept new optical vortices into the optical holding track 165 and/or release optical vortices for routing and switching. In some embodiments, an optical vortex can be maintained within the optical holding track 165 until the controller app 153 sends a command to release that optical vortex and send that optical vortex to a subsequent communication path, such as the nanofiber communication path 140. In some embodiments, the optical holding track 165 is optically coupled with a demultiplexer ("demux"), such as the demultiplexer 166, that can be optically coupled with one or more communications paths, such as the non-nanofiber communication paths 142, 144 and/or the nanofiber communication path 140. The control app 153 can instruct the demultiplexer 166 to route an optical vortex (e.g., the optical vortex 122 or the optical vortex 171) to a subsequent communication path, such as the nanofiber communication path 140 and/or to a non-nanofiber communication path (e.g., the non-nanofiber communication paths 142, 144). In some embodiments, the demultiplexer 166 can direct an optical vortex to an electron coupler, such as the electron coupler 167, to generate a hybrid optical vortex that is sent along the nanofiber communication path 140. For example, the demultiplexer 166 can direct an optical vortex to the electron coupler 167 that attaches, entangles, or otherwise couples a single electron to the optical vortex so as to create an instance of a hybrid optical vortex that is sent along the nanofiber communication path 140. The electron coupler 167 can be configured to be substantially similar to the electron coupler 115 discussed with respect to the hybrid optical vortex transceiver 112. It should be understood that the examples provided are for illustration purposes only, and therefore should not be construed as limiting in any way.

In various embodiments, the control app 153 may seek to analyze information provided by the optical vortex 122. However, it is understood that when an instance of an optical vortex is read or otherwise analyzed, the photon of that optical vortex will no longer be usable (i.e., may be absorbed within a material and/or cause a transfer of energy so as to no longer be usable) as a result of reading or otherwise analyzing the information encoded and/or encapsulated by the optical vortex. As such, embodiments of the concepts and technologies discussed herein can enable creation of two or more instances (e.g., copies and/or replicas) of an optical vortex (e.g., via use of a quantum scissor) so that at least one instance of an optical vortex can be used for reading and analysis while at least one other instance of the optical vortex can preserve an instance of data via a topological charge (where the at least one other instance of the optical vortex may be held in an optical holding track) so as to maintain and preserve continuous optical communication (e.g., switching, routing, repeating, etc.) without conversion of the data from an optical form into to an electrical signal and then back to an optical form. By maintaining and preserving at least one instance of an optical vortex that carries and encapsulates a data packet, embodiments of the present disclosure can increase information processing speed and reduce network latency so as to enable data transfer rates of terabits per second.

For example, in an embodiment, the control app 153 can analyze information (e.g., the IP packet 125) encoded in the optical vortex 122 (which may be referred to as a first optical vortex) while maintaining the information in an optical state (i.e., without converting the optical vortex into an electrical signal). For example, the control app 153 can send the optical vortex 122 from the electron decoupler 158 to a quantum scissor 160. The quantum scissor 160 is configured to receive the optical vortex 122 that has a data packet (e.g., the IP packet 125) encoded and encapsulated in the topological charge 123, and transfer the data packet (e.g., the IP packet 125) to one or more optical vortices, such as the optical vortex 171 (which may be referred to as a second optical vortex) and an optical vortex 175 (which may be referred to as a third optical vortex). To maintain the IP packet 125 in an optical state (i.e., within at least one instance of an optical vortex) and also analyze the IP packet 125 while in an optical vortex without completely destroying the encoded information (or otherwise subsequently rendering the optical vortex unusable), the IP packet 125 from the first optical vortex can be transferred to each of two or more new optical vortices, such as the second optical vortex and third optical vortex, by imparting the topological charge of the first optical vortex to the topological charges of the second and third optical vortices. For example, the quantum scissor 160 can receive an entangled quantum pair of photons ("quantum pair") 168 that can be generated by an entangled quantum pair generator 159 and provided to the quantum scissor 160. The quantum pair 168 can include two photons in an entangled state. In an embodiment, the quantum scissor 160 can include two beam splitters and two photodetectors. Each photon of the quantum pair 168 can be sent to the quantum scissor 160, where one photon of the quantum pair 168 can be sent to each beam splitter. The optical vortex 122 can be directed through the two beam splitters of the quantum scissor 160 such that the topological charge 123 of the optical vortex 122 is transcribed, transferred, or otherwise imparted to each photon of the quantum pair 168 (i.e., each photon that makes up the second optical vortex and third optical vortex). By this, the quantum scissor 160 can generate a second optical vortex (e.g., the optical vortex 171) and a third optical vortex (e.g., the optical vortex 175), where the topological charge 123 of the optical vortex 122 is imparted or otherwise transferred to the second optical vortex with the same (identical) topological charge value and the same (identical) polarity (i.e., the same twist direction that is either a positive, right-handed twist or a negative, left-handed twist about the optical thread axis 134 as the optical vortex 122), and the topological charge 123 of the optical vortex 122 is imparted or otherwise transferred to the third optical vortex with the same topological charge value and an opposite polarity (i.e., the opposite twist direction about the optical thread axis 134 as the optical vortex 122). For example, if the topological charge 123 of the optical vortex 122 has a value of "4" (representing four twists per wavelength) and spins with a positive polarity (right-handed twist) along the optical thread axis 134, then the optical vortex 171 would have a topological charge 172 with the same value of "4" and the same positive polarity (right-handed twist), while the optical vortex 175 would have a topological charge 176 with the same value of "4" and the opposite polarity, which in this example would be a negative polarity (left-handed twist). Because the topological charge 123 represents information from a data packet in encapsulated and/or encoded form (e.g., the IP packet 125), the data packet (e.g., IP packet 125) is copied, imparted, transcribed, or otherwise transferred to each of the two optical vortices generated by the quantum scissor 160. As such, in the embodiment shown in FIG. 1, the optical vortex 171 can include the IP packet 125 that is encoded via the topological charge 172, and the optical vortex 175 can include the IP packet 125 that is encoded via the topological charge 176 but with an opposite polarity compared to the incoming optical vortex 122. In response to the quantum scissor 160 transferring all information from an incoming optical vortex (e.g., the optical vortex 122) to two or more optical vortices (e.g., the optical vortex 171 and the optical vortex 175), the photon of the incoming optical vortex will be annihilated or otherwise destroyed (e.g., the photon 124 of the optical vortex 122), which in turn removes that optical vortex from the system (e.g., the optical vortex 122 being removed from the hybrid optical switch 150).

In various embodiments, the optical vortex 171 can leave the quantum scissor 160 and be placed in the optical holding track 165 until the control app 153 authorizes the release of the optical vortex 171 from the optical holding track 165 to another communication path, such as the nanofiber communication path 140. The control app 153 can authorize release of the optical vortex 171 based on analysis of information that was included in the optical vortex 122, where that information is now also included in the optical vortex 171 and the optical vortex 175 via the topological charges 172 and 176, respectively. Because the third optical vortex (e.g., the optical vortex 175) created by the quantum scissor 160 has a polarity that is opposite the incoming optical vortex to the quantum scissor 160 (e.g., the optical vortex 122), information encoded by the topological charge 176 may appear negative, inverse, and/or backwards (compared to the information encoded by the topological charge 123) if analysis were to be performed in this state. As such, the control app 153 may provide instructions to switch or flip the polarity of the optical vortex 175 by routing the optical vortex 175 to a quantum entangler, such as the quantum entangler 161. A network device, such as the hybrid optical switch 150, can include one or more instances of the quantum entangler 161 based on how many instances of optical vortices the hybrid optical switch 150 is handling. It should be understood that the examples provided are for illustration purposes only, and therefore should not be construed as limiting in any way.

In various embodiments, the quantum entangler 161 can include a beam splitter and a photodetector that accepts the optical vortex from the quantum scissor 160 (e.g., the optical vortex 175). The quantum entangler 161 can generate and provide a single photon that is directed at the photon of the optical vortex 175. By this, the topological charge 176 of the optical vortex 175—and therefore the information carried therein, such as the IP packet 125—is imparted, transcribed, or otherwise transferred to the photon from the quantum entangler 161 so as to create a fourth optical vortex (e.g., an optical vortex 180) with the same topological charge as the third optical vortex (e.g., the optical vortex 175), but with the opposite polarity as the third optical vortex (i.e., the same polarity as the second optical vortex, such as the optical vortex 171). For example, the quantum entangler 161 can impart or otherwise transfer the topological charge 176 of the optical vortex 175 to the topological charge of the optical vortex 180, where the optical vortex 180 has the opposite polarity as the optical vortex 175, which means that the optical vortex 171 and the optical vortex 180 have the same topological charge values and the same polarity (i.e., twist direction). By this, the topological charge 172 and the polarity (direction of twist) of the optical vortex 171 are the same (identical) as a topological charge 181 and the polarity (direction of twist) of the optical vortex 180. Because the topological charges 172, 181 are the same, then each of the optical vortices 171, 180 includes the same information encoded therein via the topological charges 172, 181. For example, in an embodiment, the optical vortex 122 of the hybrid optical vortex 120 may have carried the IP packet 125 or the optical vortex checksum 232A encoded in the topological charge 123. Because the optical vortex 180 is configured with the topological charge 181 that is the same as the topological charge 123 of the optical vortex 122 and has the same polarity of the optical vortex 122, the information carried by the optical vortex 180 can include the same information that was carried by the optical vortex 122. Therefore, in an embodiment, if the optical vortex 122 carried the IP packet 125 and the IP header 126 via the topological charge 123, then the optical vortex 180 would carry an IP packet 182 and an IP header 183, which are copies (replicas) of the IP packet 125 and the IP header 126, respectively. In this example, this would mean that the second optical vortex from the quantum scissor 160 (e.g., the optical vortex 171) would also include a replica or copy of the IP packet 125 and the IP header 126, which are shown in FIG. 1 by an IP packet 173 that is represented by the topological charge 172 of the optical vortex 171. By way of another example, if the optical vortex 122 had the topological charge 123 configured to represent the optical vortex checksum 232A, then the optical vortex 171 and the optical vortex 180 would have the same topological charge value (e.g., the topological charges 172, 181) and polarity as the optical vortex 122. When the optical vortex 175 imparts or otherwise transfers the topological charge value of the topological charge 176 to the topological charge 181 of the optical vortex 180, the photon of the optical vortex 175 may be annihilated or otherwise destroyed, and thus the optical vortex 175 is removed from the hybrid optical switch 150. In various embodiments, the control app 153 can preserve the optical vortex 171 within the optical holding track 165 while operations are performed to create the optical vortex 180 that will be used for analysis, such as by the quantum analyzer 162.

In various embodiments, the optical vortex from the quantum entangler 161 (e.g., the optical vortex 180) can be analyzed by the quantum analyzer 162 in order to determine where to switch and/or route the optical vortex 171 that is being held in the optical holding track 165. The quantum analyzer 162 can determine where to switch and/or route the optical vortex 171 based on the information encoded within the topological charge 181 of the optical vortex 180. For example, the IP header 183 can provide a destination network address and/or next network hop address (e.g., an IP address) that is represented in the value of the topological charge 181. The quantum analyzer 162 can include circuitry to perform analysis and/or be communicatively coupled to the processor 151 and be controlled by the control app 153. The quantum analyzer 162 can include a photodetector that detects the optical vortex 180 and the control app 153 can instruct the quantum analyzer 162 to determine and report the value of the topological charge 181 and/or a wavelength of the optical vortex 180. In some embodiments, the quantum analyzer 162 can include a spiral phase mirror 163 that is an embodiment of an optical vortex modulator configured to determine the number of twists of the optical vortex 180, and thereby determine the topological charge 181 of the optical vortex 180. The quantum analyzer 162 can provide the value of the topological charge 181 and/or the wavelength corresponding to the optical vortex 180. The control app 153 and/or the quantum analyzer 162 can use an instance of the optical vortex protocol map 117 to translate the value of the topological charge 181 from a number of twists into binary, which the control app 153 can interpret and determine the information being conveyed, such as but not limited to, a network address from the IP header 183 of the IP packet 182 and/or the optical vortex checksum 232A. In an embodiment where the topological charge 181 represents the IP packet 182 that identifies a network address (e.g., within the IP header 183), then the control app 153 can determine which type of communication path should be used based on the IP header 183 that provided the network address. In some embodiments, the control app 153 can use the routing map 156 to determine that the network address from the IP header 183 corresponds with a next network hop that supports optical communication via hybrid optical vortices (e.g., the optical network node 192 that supports optical communication via the nanofiber communication path 140 using one or more hybrid optical vortices). In some embodiments, the information conveyed by the topological charge 181 may identify a network latency indicator that informs the control app 153 that the corresponding data packet should be provided to the next network device with a higher priority than other packets. Therefore, because the optical vortex 171 includes the same information encoded in the topological charge 172 as the information included in the topological charge 181 of the optical vortex 180, the control app 153 can switch and route the optical vortex 171 (currently within the optical holding track 165) based on the information encapsulated and/or encoded in the optical vortex 180 (e.g., the IP header 183 of the IP packet 182 or, in an embodiment, the optical vortex checksum 232A when the optical vortex 180 corresponds to the last optical vortex providing a checksum for line integrity). As shown in FIG. 1, the optical vortex 171 can include the topological charge 172 that represents an IP packet, such as the IP packet 173, which can include an IP header that is the same as the IP header 183 and the IP header 126, where the values of the topological charges 172, 181, and 123 are all the same with identical polarity. In some embodiments, in response to (and based on) the network address being determined from the IP header 183 and/or determining (based on analysis of the topological charge 181 of the optical vortex 180) that the optical vortex 171 should be treated with priority, the control app 153 can determine that the network address and/or priority indication corresponds with a communication path type identifier for a subsequent (or second) nanofiber communication path (e.g., the nanofiber communication path). As such, the control app 153 can authorize and/or command the release of the optical vortex 171 (i.e., the second optical vortex) from the optical holding track 165 in order to switch, route, handle, relay, or otherwise provide the information encapsulated and carried in the optical vortex 171 (e.g., the IP packet 173 encapsulated by the topological charge 172 of the optical vortex 171 that provides a copy of the information that was received from the first nanofiber communication path via the hybrid optical vortex 120) to a subsequent network hop (e.g., the optical network node 192) through the use of second hybrid optical vortex. The control app 153 can use the optical vortex 171 to create a second hybrid optical vortex (e.g., the hybrid optical vortex 170) by providing the optical vortex 171 to an electron coupler 167 (which may include the optical vortex 171 being handled and/or routed through the demultiplexer 166) such that a single electron (e.g., the electron 174) is coupled to the optical vortex 171 (e.g., through quantum electrodynamics) so as to yield the second hybrid optical vortex (e.g., a hybrid optical vortex 170) that is sent along the subsequent (second) nanofiber communication path, such as the nanofiber communication path 140. In some embodiments, multiple instances of the hybrid optical vortex 170 may be created to form a second hybrid optical vortex package that replicates and/or duplicates a data package (e.g., the data package 107) carried by one or more hybrid optical vortices of a "first" hybrid optical vortex package that was received via a first nanofiber communication path (e.g., the nanofiber communication path 130). Further discussion of an embodiment of a hybrid optical vortex package is discussed in further detail below with respect to FIG. 2F.

In some embodiments, the quantum analyzer 162 can include an optical vortex checksum interpreter 164 that can be a set of computer executable instructions that are configured to determine the integrity of the nanofiber communication path 130 based on the optical vortex checksum 232A that is included in the last optical vortex within a sequence of optical vortices, which will be discussed in further detail with respect to FIGS. 2A-2G. For example, in an embodiment where the optical vortex 180 is the last optical vortex within a sequence of optical vortices that all correspond to the same data package (e.g., the data package 107), the control app 153 and/or the optical vortex checksum interpreter 164 can compare the topological charge 181 (which in an embodiment represents the optical vortex checksum 232A) with the validation checksum 155 that provides an expected value, such as by converting the value of the topological charge 181 into binary using the optical vortex protocol map 117 and comparing the resultant binary with the validation checksum 155. In some embodiments, the validation checksum 155 may also indicate an expected wavelength. When the value(s) of the validation checksum 155 matches the wavelength and/or the value of the topological charge 181 (that in this embodiment would represent the optical vortex checksum 232A), then the optical vortex checksum interpreter 164 can provide an approval message and/or authorization message to the control app 153 to indicate that the nanofiber communication path 130 is functional and operating as expected without a fault.

In an embodiment, the control app 153 and/or the quantum analyzer 162 may detect an error and/or fault within the nanofiber communication path 130 based on the optical vortex checksum 232A (which may be encoded in a topological charge, such as the topological charge 181) not matching the validation checksum 155, thereby indicating that one or more nanofiber optical threads (e.g., the nanofiber optical thread 133) may not be operating properly (e.g., due to degradation of the topological insulator material 135). When the control app 153 and/or the quantum analyzer 162 detects an error and/or fault with the line integrity of the nanofiber communication path 130, the control app 153 can generate a path quality message 196 based on the optical vortex checksum 232A not matching the validation checksum 155. The control app 153 can determine a nanofiber communication path identifier 197 corresponding to the nanofiber communication path 130 that is associated with the error and/or fault. In some embodiments, the nanofiber communication path identifier 197 can identify one or more instances of the nanofiber optical thread 133 that is associated with the error and/or fault based on those one or more instances of nanofiber optical thread 133 carrying the hybrid optical vortex 120 that was processed and found to be carrying the optical vortex checksum 232A that does not match. The nanofiber communication path identifier 197 can be included in the path quality message 196 and the path quality message 196 can be sent to the network quality monitor computer system 194. In some embodiments, the network quality monitor computer system 194 can generate an alert and/or inform a network administrator of the error experienced by the nanofiber communication path 130 and provide the nanofiber communication path identifier 197. In some embodiments, the path quality message 196 can be included in a history of error events. In some embodiments, when an error and/or fault is detected with the nanofiber communication path 130, the control app 153 may dump, remove, or otherwise not preserve the optical vortex 171 within the optical holding track 165. The control app 153 may command the optical network node 108 to resend one or more data packets associated with the data package 107. For example, in some embodiments, the control app 153 can include the validation checksum 155 within the path quality message 196 and instruct the network quality monitor computer system 194 to reset the optical vortex checksum being used (e.g., the optical vortex checksum 232A) by the optical network node 108 that is communicatively coupled to the hybrid optical switch 150 via the nanofiber communication path 130 experiencing the error and/or fault. By this, the network quality monitor computer system 194 can send the validation checksum 155 to the optical network node 108, which uses the validation checksum 155 as the checksum value to send in future instances of hybrid optical vortices from the hybrid optical vortex transceiver 112. Thus, in an embodiment, the hybrid optical switch 150 can instruct the optical network node 108 to resend one or more data packets via one or more instances of hybrid optical vortices, where the final hybrid optical vortex carries the validation checksum 155 received from the network quality monitor computer system 194. The hybrid optical switch 150 can perform operations discussed above to ensure that the resent information is valid based on the validation checksum 155. It should be understood that the examples provided are for illustration purposes only, and therefore should not be construed as limiting in any way.

In various embodiments, after the control app 153 and/or the quantum analyzer 162 determines that the nanofiber communication path 130 is operating as expected and/or determines which type of communication path to use, such as the nanofiber communication path 140 based at least on the routing map 156, then the control app 153 can release the plurality of optical vortex 171 from the optical holding track 165. The optical vortex 171 can be routed to the demultiplexer 166 that, in turn, can direct the optical vortex 171 to the appropriate type of communication path, such as the nanofiber communication path 140. For example, if the control app 153 determines that the optical vortex 171 should be sent to the optical network node 192 in order to reach the UE 104, then the nanofiber communication path 140 can be used. The hybrid optical switch 150 can include an electron coupler, such as the electron coupler 167, that can be configured substantially similar to the electron coupler 115 of the hybrid optical vortex transceiver 112. The optical vortex 171 includes information (e.g., the IP packet 173 that can have an IP header that is identical to the IP header 126) encoded and represented by the topological charge 172, and therefore can be directed to the electron coupler 167 to generate another hybrid optical vortex, such as the hybrid optical vortex 170. The electron coupler 167 can couple a single electron 174 to the optical vortex 171 so as to create the hybrid optical vortex 170 that has the same value of topological charge and the same polarity (e.g., twist direction) as the hybrid optical vortex 120 that was received by the hybrid optical switch 150. By maintaining an instance of the data packet from the hybrid optical vortex 120 in optical form (e.g., by using the quantum scissor 160 to transfer the topological charge 123 representing the IP packet 125 to the topological charge 172 of the optical vortex 171), the hybrid optical switch 150 can increase throughput and provide terabit(s) per second transfer speeds, thereby reducing network latency compared to conventional optical networking. The hybrid optical vortex 170 can be carried along the nanofiber communication path 140 to the optical network node 192, which in turn may decouple the optical vortex 171 for forwarding to the network access point 118 or forward the hybrid optical vortex 170 to the network access point 118. In an embodiment, the optical network node 192 or the network access point 118 can decouple the optical vortex 171 from the hybrid optical vortex 170 and extract the encoded data represented by the topological charge 172 (e.g., the IP packet 173), which in turn can be sent to the UE 104 and presented to the user 105. It is understood that, in some embodiments, the network access points 116, 118 can be configured as photonic end nodes, which support optical communication via optical vortices and/or hybrid optical vortices. As such, embodiments of the hybrid optical switch 150 and/or the optical network node 108 can be included within the network access points 116, 118 and/or within any other edge node that is the first, or among the first, network devices that communicate with user equipment, such as the UEs 102, 104. It should be understood that the examples provided are for illustration purposes only, and therefore should not be construed as limiting in any way.

FIG. 1 illustrates a certain number of instances of elements within the operating environment 100, such as the UE 102, the user 103, the UE 104, the user 105, the network 106, the data package 107, the optical network node 108, the controller 109, the processor 109A, the memory 109B, the optical transceiver 110, the optical vortex transceiver 111, the hybrid optical vortex transceiver 112, the optical transceiver 113, the optical vortex modulator 114, the electron coupler 115, the optical vortex protocol map 117, the network access point 116, the network access point 118, the hybrid optical vortex 120, the electron 121, the optical vortex 122, the topological charge 123, the photon 124, the IP packet 125, the IP header 126, the optical vortex checksum 232A, the non-nanofiber communication path 129, the nanofiber communication path 130, the sheath 131, the plurality of nanofiber optical threads 132, the nanofiber optical thread 133, the optical thread axis 134, the topological insulator material 135, the topologically protected surface 136, the topologically protected surface path 137, the charge core thread 138, the communication path axis 139, the non-nanofiber communication path 142, the non-nanofiber communication path 144, the hybrid optical switch 150, the processor 151, the memory 152, the control app 153, the communication path type identifier 154, the validation checksum 155, the routing map 156, the electron decoupler 158, the entangled quantum pair generator 159, the quantum scissor 160, the quantum pair 168, the quantum analyzer 162, the spiral phase mirror 163, the optical vortex checksum interpreter 164, the optical holding track 165, the demultiplexer 166, the electron coupler 167, the hybrid optical vortex 170, the optical vortex 171, the topological charge 172, the IP packet 173, the electron 174, the optical vortex 175, the topological charge 176, the optical vortex 180, the topological charge 181, the IP packet 182, the IP header 183, the optical network node 190, the optical network node 192, the network quality monitor computer system 194, the path quality message 196, and the nanofiber communication path identifier 197. It should be understood, however, that some implementations of the operating environment 100 can include zero, one, or more than one instance of any of these elements of the operating environment 100 shown in FIG. 1. As such, the illustrated embodiment of the operating environment 100 should be understood as being illustrative and should not be construed as being limiting in any way.

Turning now to FIGS. 2A-2G, aspects of various embodiments of a hybrid optical vortex will be discussed. In FIG. 2A, a hybrid optical vortex 200 is provided according to an embodiment. The hybrid optical vortex 200 can include an optical vortex 202 having a photon that is twisted according to a topological charge 202A. The hybrid optical vortex 200 can include a single electron 203 that is coupled to the optical vortex 202. The topological charge 202A can correspond with one of the topological charge values 242 indicated in the optical vortex protocol map 117 shown in FIG. 2G. For example, in an embodiment, the topological charge 202A can have a value of "1" that indicates one twist per wavelength. The optical vortex protocol map 117 can indicate an instance of a binary string 240 that corresponds with one of the topological charge values 242. The binary string 240 can include a defined number of bits, such as for example, fifteen bits according to an embodiment. For example, in an embodiment, when the topological charge 202A has a topological charge value of "1," the corresponding binary string can be "000000000000001" based on the optical vortex protocol map 117. It should be understood that the examples provided are for illustration purposes only, and therefore should not be construed as limiting in any way.

In FIG. 2B, a hybrid optical vortex 204 is provided according to an embodiment. The hybrid optical vortex 204 can include an optical vortex 206 having a photon that is twisted according to a topological charge 206A. The hybrid optical vortex 204 can include a single electron 205 that is coupled to the optical vortex 206. The topological charge 206A can correspond with one of the topological charge values 242 indicated in the optical vortex protocol map 117 shown in FIG. 2G. For example, in an embodiment, the topological charge 206A can have a value of "2" that indicates two twists per wavelength. In an embodiment, when the topological charge 206A has a topological charge value of "2," the corresponding binary string can be "000000000000010" based on the optical vortex protocol map 117. It should be understood that the examples provided are for illustration purposes only, and therefore should not be construed as limiting in any way.

In FIG. 2C, a hybrid optical vortex 208 is provided according to an embodiment. The hybrid optical vortex 208 can include an optical vortex 210 having a photon that is twisted according to a topological charge 210A. The hybrid optical vortex 208 can include a single electron 211 that is coupled to the optical vortex 210. The topological charge 210A can correspond with one of the topological charge values 242 indicated in the optical vortex protocol map 117 shown in FIG. 2G. For example, in an embodiment, the topological charge 210A can have a value of "8" that indicates eight twists per wavelength. In an embodiment, when the topological charge 210A has a topological charge value of "8," the corresponding binary string can be "000000000000100" based on the optical vortex protocol map 117. It should be understood that the examples provided are for illustration purposes only, and therefore should not be construed as limiting in any way.

In FIG. 2D, a hybrid optical vortex 212 is provided according to an embodiment. The hybrid optical vortex 212 can include an optical vortex 214 having a photon that is twisted according to a topological charge 214A. The hybrid optical vortex 212 can include a single electron 215 that is coupled to the optical vortex 214. The topological charge 214A can correspond with one of the topological charge values 242 indicated in the optical vortex protocol map 117 shown in FIG. 2G. For example, in an embodiment, the topological charge 214A can have a value of "65,535" that indicates 65,535 twists per wavelength. In an embodiment, when the topological charge 214A has a topological charge value of "65,535," the corresponding binary string can be "111111111111111" based on the optical vortex protocol map 117. As shown and discussed herein, an instance of the binary string 240 may have a bit length of fifteen bits, however it is understood that this is an example used for illustration purposes only and therefore may not necessarily be the case for every embodiment. It should be understood that the examples provided are for illustration purposes only, and therefore should not be construed as limiting in any way.

It is understood that an instance of the hybrid optical vortex 120 (and/or the hybrid optical vortex 170) discussed in FIG. 1 can be configured substantially similar to any of the hybrid optical vortices 200, 204, 208, 212 or any hybrid optical vortex with a particular topological charge value 242 with a corresponding binary string 240. It is understood that a network address (e.g., a network address in the form of an IP address included in the IP header 126 that can provide an address corresponding with a destination and/or next network hop) can correspond with a particular instance of a binary string 240, which the binary string 240 in turn can be used to translate and convert to and/or from one of the topological charge values 242. It should be understood that the examples provided are for illustration purposes only, and therefore should not be construed as limiting in any way.

In FIG. 2E, an instance of an optical vortex package 216 is provided according to an embodiment. In various embodiments, when a network device (e.g., the optical network node 108) receives one or more data packets that are included within a data package (e.g., one or more instances of the IP packet 125 of the data package 107), the data packets can be packaged into a sequence of optical vortices that can collectively provide the optical vortex package 216 that represents some and/or all of the data package 107 by encoding and/or encapsulating the information from each data packet as a topological charge within each instance of an optical vortex within the optical vortex package 216. For example, the data package 107 can include a plurality of data packet instances, such as one or more of the IP packet 125. In an embodiment, an instance of the IP packet 125 can include an IP header 126 that includes a network address of a destination for the data package 107 (e.g., an IP address). The optical vortex package 216 is generated to encode and/or encapsulate one or more instances of the data packets from the data package (e.g., one or more instances of the IP packet 125 of the data package 107) by configuring topological charges as each optical vortex for the optical vortex package 216 is generated. In an embodiment, the optical vortex package 216 can include a plurality of optical vortices that are generated in a sequence to represent at least a portion and/or all information from the data packets of a data package (e.g., one or more instances of the IP packet 125 of the data package 107), and therefore each optical vortex of the plurality of optical vortices of the optical vortex package 216 correspond to the same data package (e.g., the data package 107). The optical vortex package 216 can be created by a network device (e.g., any of the optical network nodes 108, 190, 192 and/or the hybrid optical switch 150) that can provide optical networking via optical vortices over non-nanofiber communication paths (e.g., the non-nanofiber communication paths 129, 142, and 144). In some embodiments, the optical vortex package 216 can be used to create a hybrid optical vortex package (e.g., the hybrid optical vortex package 234) via a network device (e.g., any of the optical network nodes 108, 190, 192 and/or the hybrid optical switch 150) that can provide hybrid optical vortices over nanofiber optical threads of a nanofiber communication path (e.g., nanofiber optical threads from the nanofiber communication paths 130, 140). For example, instances of optical vortices that are included within the optical vortex package 216 can be generated by the optical vortex transceivers 111, 113 and the hybrid optical vortices within the hybrid optical vortex package 234 can be created by the hybrid optical vortex transceiver 112. In some embodiments, a photonic end node, such as a customer premise edge equipment, can be configured similar to the optical network node 108 and/or the hybrid optical switch 150, and therefore provide one or more operations discussed herein. It should be understood that the examples provided are for illustration purposes only, and therefore should not be construed as limiting in any way.

In various embodiments, the optical vortex package 216 can include instances of optical vortices that are arranged in a sequence, where the sequence may conform to an optical vortex protocol defined in the optical vortex protocol map 117. For example, in an embodiment, the optical vortex protocol may indicate that each instance of an optical vortex within the optical vortex package 216 should be configured to represent and/or provide one of an "optical vortex package control packet," an "optical vortex package data packet," and/or an "optical vortex checksum packet" so that the hybrid optical switch 150 (or other network device) can switch, route, and/or otherwise handle data while maintaining the data packet in an optical vortex form (i.e., as an instance of one or more optical vortices and/or one or more hybrid optical vortices), thereby allowing the hybrid optical switch 150 to provide analysis and routing without conversion of the data packet to an electrical signal. In some embodiments, every instance of an optical vortex package 216 can include one or more instance of an optical vortex that represents the optical vortex package control packet, the optical vortex package data packet, or the optical vortex checksum packet. The optical vortex protocol map 117 can define the topological charge value(s) associated with one or more of the optical vortex package control packet, the optical vortex data packet, and/or the optical vortex checksum packet. As such, it is understood that various embodiments of optical vortices discussed herein (e.g., the optical vortices 122, 171, 175, 180, 202, 206, 210, 214, or any other optical vortex that may conform to the optical vortex protocol map 117) may provide and represent one of the optical vortex package control packet, the optical vortex data packet, or the optical vortex checksum packet within an instance of the optical vortex package 216.

Within the optical vortex package 216, instances of the optical vortex package control packet can have different types that each have a topological charge with a different value that is used by a network device (e.g., any of the optical network nodes 108, 190, 192 and/or the hybrid optical switch 150) to indicate a start of the optical vortex package 216, the end of header information, or the end of optical vortex package data packets. For example, an instance of the optical vortex package control packet can include one or more of an optical vortex package start packet 218, an optical vortex package header end packet 222, or an optical vortex package end packet 230. It should be understood that the examples provided are for illustration purposes only, and therefore should not be construed as limiting in any way.

The optical vortex package start packet 218 can be represented by an optical vortex that includes a start topological charge 218A that is a topological charge having a topological charge value that indicates the start of a sequence of optical vortices that encode and encapsulate data packets (e.g., one or more instances of the IP packet 125) and where all optical vortices of the sequence correspond with the optical vortex package 216 that is associated with a data package (e.g., the data package 107). In an embodiment, the topological charge value of the start topological charge 218A for the optical vortex package start packet 218 can be defined by the optical vortex protocol map 117. In various embodiments, the topological charge value assigned to the start topological charge 218A for the optical vortex package start packet 218 can be the same for each instance of the optical vortex package 216. This can enable a network device (e.g., the hybrid optical switch 150) to detect when a new instance of the optical vortex package 216 begins.

The optical vortex package header end packet 222 can be represented by an optical vortex that includes a header end topological charge 222A that is a topological charge having a topological charge value that indicates the end of one or more instances of an optical vortex that provides an optical vortex package header packet (e.g., an optical vortex package header data packet 220 discussed below) that provides header information, such as a network address for routing and switching. In various embodiments, the topological charge value assigned to the header end topological charge 222A can be the same for each instance of the optical vortex package 216 so that a network device (e.g., the hybrid optical switch 150) can determine when header information ends, and where the remaining data packets for a data package begin. In the embodiment shown in FIG. 2E, the optical vortex providing the optical vortex package header end packet 222 can be generated and arranged after the optical vortex package header data packet 220 (which can be an embodiment of the optical vortex 122 that can be configured to carry the IP header 126 via the topological charge 220A). Additionally, the optical vortex representing the optical vortex package header end packet 222 can be located (within the sequence of optical vortices for the optical vortex package 216) before one or more instances of optical vortices configured as optical vortex data packets that carry the remainder of data packets of the data package 107 (e.g., one or more optical vortices that provide the optical vortex package data packets 224, 226, and 228 which are discussed in further detail below). It should be understood that the examples provided are for illustration purposes only, and therefore should not be construed as limiting in any way.

The optical vortex package end packet 230 can include an optical vortex with an end topological charge 230A that is a topological charge having a topological charge value that indicates the end of the sequence of optical vortices (e.g., the optical vortices for the optical vortex package data packets 224, 226, and 228) that encode and encapsulate one or more instances of the data packets in a data package (e.g., the one or more IP packet 125 included in the data package 107). In various embodiments, the topological charge value assigned to the end topological charge 230A can be the same for each instance of the optical vortex package 216. In some embodiments, each optical vortex that represents a vortex package control packet (e.g., the optical vortices for the optical vortex package control packets 218, 222, and 230) can have a wavelength that corresponds with the same optical vortex color, such as one or more optical vortex colors 250 discussed below with respect to FIG. 2G. In some embodiments, the optical vortex color is assigned to the vortex control packets (e.g., wavelengths of the optical vortices corresponding to an optical vortex color 250 for the optical vortex package control packets, such as the optical vortex package start packet 218, the optical vortex package header end packet 222, and the optical vortex package end packet 230). In some embodiments, the instance of the optical vortex color 250 that is associated with optical vortex package control packets 218, 222, 230 can instruct a network device (e.g., the optical network nodes 108, 190, 192 and/or the hybrid optical switch 150) to distinguish the optical vortex package 216 from other instances of data being handled by that network device, and therefore can trigger analysis and routing while maintaining one or more instances of the optical vortex package 216 in optical form (i.e., while maintaining at least one instance of the optical vortex package 216 as one or more instances of an optical vortex without conversion to an electrical signal). It should be understood that the examples provided are for illustration purposes only, and therefore should not be construed as limiting in any way.

The optical vortex package 216 also can include one or more instances of optical vortex package data packets. For example, an optical vortex package data packet refers to an instance of an optical vortex that is created based on one or more of the data packets from a data package (e.g., one or more instances of the IP packet 125 from the data package 107). In an embodiment, an optical vortex package data packet can include header information and be referred to as an optical vortex package header data packet 220. An optical vortex for the optical vortex package header data packet 220 can be created and arranged, within the sequence of optical vortices for the optical vortex package 216, between the optical vortex package start packet 218 and the optical vortex that is configured to represent the optical vortex package header end packet 222. For example, in an embodiment, an instance of the optical vortex 122 can be created based on the IP header 126 that is included in an instance of the IP packet 125 that, in turn, corresponds with the data package 107. In an embodiment, the optical network node 108 can create an instance of the optical vortex 122 based on the IP header 126, where the topological charge 123 has a topological charge value that represents the information included in the IP header 126, such as a network address (e.g., an IP address) and/or any other routing information for the hybrid optical switch 150. As discussed below with respect to FIG. 2G, a topological charge value for a topological charge of an optical vortex can correspond with a binary string, such as defined in an instance of the optical vortex protocol map 117. Therefore, in various embodiments, the optical vortex which provides the optical vortex package header data packet 220 can have a topological charge 220A that has a topological charge value that represents header information (e.g., the IP header 126), which can be used be used by a network device (e.g., the hybrid optical switch 150) to determine where the data package 107 is headed based on a network address. The optical vortex package 216 can further include multiple instances of optical vortices that correspond with instances of data packets from the data package (e.g., the IP packets 125 from the data package 107). The remaining instances of the IP packets 125 that make up the data package 107 can be encoded as topological charges corresponding to one or more optical vortex package data packets, such as the optical vortex package data packets 224, 226, and 228. For example, the optical vortex package 216 can include an optical vortex that represents the optical vortex package data packet 224 and has a topological charge 224A based on an instance of an IP packet 125 from data package 107. Two or more optical vortices can be included in the optical vortex package 216 as optical vortex data packets, such as the optical vortex package data packets 226, 228 having topological charges 226A, 228A, respectively, that encode and encapsulate any other instances of the IP packets 125 from the data package 107. The optical vortices that provide the optical vortex package data packets 224, 226, and 228 can be arranged and sent after the optical vortex package header end packet 222 and before the optical vortex package end packet 230. In some embodiments, each optical vortex corresponding with a data packet from a data package (e.g., the optical vortex package header data packet 220 and the optical vortex package data packets 224, 226, 228) can have a twisted photon with a wavelength that corresponds with the same optical vortex color (e.g., blue), which can be defined by the optical vortex protocol map 117 that includes one or more of the optical vortex colors 250 discussed below with respect to FIG. 2G. The optical vortex color being used for instances of optical vortex package data packets (e.g., the optical vortex package header data packet 220 and the optical vortex package data packets 224, 226, 228) may be different and/or distinct from one or more optical vortex colors associated with the optical vortex package control packets and/or the optical vortex checksum packet. It should be understood that the examples provided are for illustration purposes only, and therefore should not be construed as limiting in any way.

The optical vortex package 216 also can include one or more instances of an optical vortex checksum packet, such as the optical vortex checksum packet 232. In an embodiment, the optical vortex checksum packet 232 can correspond with one or more instances of an optical vortex that is configured with a topological charge that has a topological charge value representing the optical vortex checksum 232A. As discussed above with respect to FIG. 1, the topological charge value that represents the optical vortex checksum 232A can be compared against the validation checksum 155 to determine whether an error and/or fault has occurred along a communication path (e.g., the nanofiber communication path 130). In an embodiment, all optical checksum packets may be configured to have a wavelength that corresponds with an optical vortex color, such as one of the optical vortex colors 250 discussed below with respect to the optical vortex protocol map 117 shown in FIG. 2G. For example, the twisted photon (i.e., optical vortex) that represents the optical vortex checksum packet 232 can have a wavelength that corresponds with an optical vortex color of red, according to an embodiment. The optical vortex checksum packet 232 can be located after the optical vortex package end packet 230, and therefore can be the last optical vortex in the sequence of optical vortices that make up the optical vortex package 216. It should be understood that the examples provided are for illustration purposes only, and therefore should not be construed as limiting in any way.

In various embodiments, instances of optical vortices for the optical vortex package 216 may be created in sequence and sent to the next network hop (e.g., from the optical network node 108 to the hybrid optical switch 150) before the remaining instances of optical vortices are created to complete the optical vortex package 216. As such, in some embodiments, a portion of the optical vortex package 216 may be generated and prepared for sending to the hybrid optical switch 150 or, in some embodiments, the entire optical vortex package 216 may be generated (i.e., all instances of optical vortices that collectively make up the optical vortex package 216) before any part of the optical vortex package 216 is provided to the hybrid optical switch 150. In some embodiments, the optical vortex package 216 (or at least a portion thereof) may be provided to the next network hop (e.g., the hybrid optical switch 150) via a non-nanofiber communication path (e.g., via the non-nanofiber communication path 129). In some embodiments, two instances of the optical vortex package 216 are created by the optical network node 108, where one instance of the optical vortex package 216 is provided along the non-nanofiber communication path (e.g., via the non-nanofiber communication path 129), and the other one of the two instances is used as the basis to generate the hybrid optical vortex package 234, where the hybrid optical vortex package 234 is provided along a nanofiber communication path (e.g., the nanofiber communication path 130). It should be understood that the examples provided are for illustration purposes only, and therefore should not be construed as limiting in any way. In some embodiments, once at least a portion of the optical vortex package 216 is generated (e.g., one or more optical vortices corresponding with an optical vortex package control packet, an optical vortex package data packet, and/or an optical vortex checksum packet) the optical network node 108 (e.g., via the hybrid optical vortex transceiver 112) uses the optical vortex package 216 to generate at least a portion of a hybrid optical vortex package, such as the hybrid optical vortex package 234 discussed with respect to FIG. 2F. It should be understood that the examples provided are for illustration purposes only, and therefore should not be construed as limiting in any way.

In FIG. 2F, an embodiment of an instance of the hybrid optical vortex package 234 is illustrated. The hybrid optical vortex package 234 can include the optical vortex package 216 and a plurality of electrons, where a single electron from the plurality of electrons is coupled to each optical vortex within the optical vortex package 216. Put differently, the hybrid optical vortex package 234 can include a plurality of hybrid optical vortices, where each hybrid optical vortex of the plurality of hybrid optical vortices corresponds with the same data package (e.g., the data package 107). In the embodiment shown in FIG. 2F, the hybrid optical vortex package 234 includes a plurality of hybrid optical vortices based on each of the plurality of optical vortices from the optical vortex package 216 being coupled to a single electron, where each single electron couples to one of the plurality of optical vortices so as to create the plurality of hybrid optical vortices. For example, the hybrid optical vortex package 234 can include an electron 219 coupled to the optical vortex representing the optical vortex package start packet 218, thereby creating a hybrid optical vortex representing the optical vortex package start packet 218, which in some embodiments may be referred to as the "first" hybrid optical vortex of the plurality of hybrid optical vortices of the hybrid optical vortex package 234. In some embodiments, an electron 221 can be coupled to the optical vortex representing the optical vortex package header data packet 220, thereby creating a hybrid optical vortex representing the optical vortex package header data packet 220, which in some embodiments may be referred to as the "second" hybrid optical vortex of the plurality of hybrid optical vortices of the hybrid optical vortex package 234. In some embodiments, an electron 223 can be coupled to the optical vortex representing the optical vortex package header end packet 222 that can carry header information, thereby creating a hybrid optical vortex representing the optical vortex package header end packet 222, which in some embodiments may be referred to as the "third" hybrid optical vortex of the plurality of hybrid optical vortices of the hybrid optical vortex package 234.

In some embodiments, an electron 225 can be coupled to the optical vortex representing the optical vortex package data packet 224, thereby creating a hybrid optical vortex representing the optical vortex package data packet 224. In some embodiments, an electron 227 can be coupled to the optical vortex representing the optical vortex package data packet 226, thereby creating a hybrid optical vortex representing the optical vortex package data packet 226. In some embodiments, an electron 229 can be coupled to the optical vortex representing the optical vortex package data packet 228, thereby creating a hybrid optical vortex representing the optical vortex package data packet 228. In some embodiments, the hybrid optical vortices corresponding to an instance of an optical vortex package data packet (e.g., the optical vortices for the optical vortex package data packets 224, 226, and 228) may be referred to as the "remaining" hybrid optical vortices of the plurality of hybrid optical vortices of the hybrid optical vortex package 234. In some embodiments, an electron 231 can be coupled to the optical vortex representing the optical vortex package end packet 230, thereby creating a hybrid optical vortex representing the optical vortex package end packet 230, which in some embodiments may be referred to as the "last" hybrid optical vortex (of the plurality of hybrid optical vortices of the hybrid optical vortex package 234) carrying a data packet from the data package (e.g., the last instance of the IP packet 125 from the data package 107). In some embodiments, an electron 233 can be coupled to the optical vortex representing the optical vortex checksum packet 232, thereby creating a hybrid optical vortex representing the optical vortex checksum packet 232, which in some embodiments may be referred to as the "checksum" hybrid optical vortex (of the plurality of hybrid optical vortices of the hybrid optical vortex package 234) corresponding to the data package (e.g., the data package 107). It should be understood that the examples provided are for illustration purposes only, and therefore should not be construed as limiting in any way.

It is understood that an instance of the hybrid optical vortex package 234 may be created or otherwise generated by a network device (e.g., any of the optical network nodes 108, 190, 192 and/or the hybrid optical switch 150) that includes a hybrid optical vortex transceiver (e.g., an instance of the hybrid optical vortex transceiver 112) and/or via the use of an instance of an electron coupler (e.g., the electron couplers 115, 167) that can facilitate creation of hybrid optical vortex instances using existing optical vortices (e.g., the electron coupler 167 using the optical vortex 171 to create the hybrid optical vortex 170). In various embodiments, a hybrid optical vortex transceiver (e.g., the hybrid optical vortex transceiver 112) may generate the hybrid optical vortex package 234 by creating one or more optical vortices for the optical vortex package 216, and then directing the optical vortices from the optical vortex package 216 to the electron coupler 115 such that individual instances of hybrid optical vortices (e.g., instances of the hybrid optical vortex 120) can be created that collectively provide the hybrid optical vortex package 234, where the order in which the hybrid optical vortices for the hybrid optical vortex package are created can be based on the sequence of optical vortices provided by the optical vortex package 216. As such, in some embodiments, one or more instance of hybrid optical vortices that correspond with the hybrid optical vortex package 234 can be provided in sequence using the nanofiber communication path 130. In some embodiments, the data package 107 may be segmented into a plurality of instances of the optical vortex package 216, where each instance of the plurality corresponds to the data package 107. In this example, the hybrid optical vortex transceiver 112 can generate a plurality of instances of the hybrid optical vortex package 234 based on the optical vortex package 216, and the plurality of instances of the hybrid optical vortex package 234 can be provided to the hybrid optical switch 150 in sequence via one instance of the nanofiber optical thread 133 of the nanofiber communication path 130 and/or in parallel via two or more instances of the nanofiber optical thread 133 from one or more instances of the nanofiber communication path 130. It should be understood that the examples provided are for illustration purposes only, and therefore should not be construed as limiting in any way.

In various embodiments, a network device (e.g., the hybrid optical switch 150) can receive at least a portion of the hybrid optical vortex package 234 via the nanofiber optical thread 133 of the nanofiber communication path 130. The first hybrid optical vortex of the hybrid optical vortex package 234 that is received by the hybrid optical switch 150 can correspond with the optical vortex package start packet 218, which the hybrid optical switch 150 can detect and distinguish between other optical vortices by decoupling the electron 219 from the first hybrid optical vortex using the electron decoupler 158 so as to extract the optical vortex that has the start topological charge 218A which encodes and encapsulates a topological charge value indicating the start of the hybrid optical vortex package 234. The hybrid optical switch 150 can detect and analyze the start topological charge 218A by performing operations discussed herein, such as through the use of components such as the quantum scissor 160, the optical holding track 165, the quantum entangler 161, the quantum analyzer 162, and any other component discussed herein. The hybrid optical switch 150 can perform continuous operations for handling the hybrid optical vortices of the hybrid optical vortex package 234 as each hybrid optical vortex arrives at the hybrid optical switch 150. It should be understood that the examples provided are for illustration purposes only, and therefore should not be construed as limiting in any way.

Turning now to FIG. 2G, an embodiment of the optical vortex protocol map 117 is illustrated. In various embodiments, instances of a hybrid optical vortex (e.g., each of the hybrid optical vortices 200, 204, 208, and 212) include a twisted photon (i.e., an optical vortex) that has a wavelength which may, in some embodiments, be measured in nanometers. In various embodiments, such as shown in FIG. 2G, the optical vortex protocol map 117 can identify instances of an optical vortex color 250 that each correspond with one or more wavelength 252. An optical network device within the operating environment 100, such as the hybrid optical switch 150, can detect and determine the wavelength for an instance of a hybrid optical vortex (e.g., any of the hybrid optical vortices 120, 200, 204, 208, and/or 212) and use the optical vortex protocol map 117 to determine a corresponding optical vortex color (e.g., red, blue, etc.) based on the wavelength identified. Examples of instances of an optical vortex color 250 and corresponding one or more wavelengths 252 can include, but should not be limited to, red (e.g., corresponding to wavelengths 635-700 nm), orange (e.g., corresponding to wavelengths 590-635 nm), yellow (e.g., corresponding to wavelengths 560-590 nm), green (e.g., corresponding to wavelengths 520-560 nm), cyan (e.g., corresponding to wavelengths 490-520 nm), blue (e.g., corresponding to wavelengths 450-490 nm), or violet (e.g., corresponding to wavelengths 400-450 nm), as understood by one of ordinary skill in the technology. It should be understood that the examples provided are for illustration purposes only, and therefore should not be construed as limiting in any way.

In some embodiments, an optical vortex can have a wavelength that corresponds with an optical vortex color associated with at least one instance of an optical vortex package control packet (e.g., any of the optical vortex package start packet 218, the optical vortex package header end packet 222, and/or the optical vortex package end packet 230), an instance of an optical vortex package data packet (e.g., any of the optical vortex package header data packet 220 and/or the optical vortex package data packets 224, 226, 228), or an instance of an optical vortex checksum packet (e.g., the optical vortex checksum packet 232). It is understood that the optical vortex package header data packet 220 can be a type of optical vortex package data packet, where the optical vortex package header data packet 220 corresponds with header information from a data packet (e.g., the IP header 216 of the IP packet 125 from the data package 107). In various embodiments, the hybrid optical switch 150 may detect whether an error exists and/or what type of communication path should be used to route one or more optical vortices based on the wavelength and/or optical vortex color associated with an optical vortex and/or hybrid optical vortex. In some embodiments, a certain optical vortex color defined in the optical vortex protocol map 117 may be selected as a "priority optical vortex color" to indicate a priority and/or act as an instruction that one or more optical vortices having wavelengths which correspond to the priority optical vortex color should be routed to the next network hop via a nanofiber communication path (e.g., the nanofiber communication paths 130, 140). For example, in some embodiments, optical vortices that carry data packets from a data package (e.g., instances of the optical vortex 122 that carry one or more of the IP packets 125 from the data package 107) can have a wavelength corresponding to, for example, green, which may in some embodiments, be defined as the priority optical vortex color. In an embodiment, the optical vortex protocol map 117 may define a non-priority optical vortex color (e.g., yellow) that, when the hybrid optical switch 150 detects a wavelength corresponding to the non-priority optical vortex color, the hybrid optical switch 150 may divert the associated optical vortices to a non-nanofiber communication path, such as any of the non-nanofiber communication paths 129, 142, and/or 144. In various embodiments, a non-nanofiber communication path does not support and/or handle a hybrid optical vortex, but may support and/or handle an optical vortex. In some embodiments, the non-priority optical vortex color may instruct the hybrid optical switch 150 to maintain the data packet in optical vortex form and use a non-nanofiber communication path to route the optical vortex (e.g., via one of the non-nanofiber communication paths 129, 142). In an embodiment, the optical vortex protocol map 117 can indicate a low priority optical vortex color (e.g., violet) which can instruct the hybrid optical switch 150 to "un-twist" the optical vortex (e.g., via an optical vortex modulator configured to reverse the topological charge and provide a topological charge value of zero) and provide the data packet in an optical and/or electric communication that does not have a topological charge and is sent via a non-nanofiber communication path. In some embodiments, the optical vortices representing an optical vortex package control packet may have wavelengths corresponding to one of the optical vortex colors 250, such as blue, while an optical vortex representing the optical vortex checksum packet 232 can have a wavelength that corresponds with yet another one of the optical vortex colors 250, such as red.

In some embodiments, if an optical vortex for a specific packet does not conform to a wavelength and/or an optical vortex color for which it is designated, then the hybrid optical switch 150 can indicate and generate an error, which can be conveyed via the path quality message 196. It is understood that, in some embodiments, certain wavelengths of an optical vortex from a hybrid optical vortex may be used to distinguish between various packets within an optical vortex package 216 and/or a hybrid optical vortex package 234. Thus, in some embodiments, the hybrid optical switch 150 may check the integrity of a nanofiber optical thread of a nanofiber communication path (e.g., one or more of the plurality of nanofiber optical threads 132 of the nanofiber communication path 130) by identifying whether a specific wavelength is used and conforms with the optical vortex protocol map 117 so as to detect and determine errors. It should be understood that the examples provided are for illustration purposes only, and therefore should not be construed as limiting in any way.

FIGS. 2A-2G illustrate a certain number of instances of elements such as the hybrid optical vortices 200, 204, 208, and 212, the optical vortex package 216, the hybrid optical vortex package 234, and the optical vortex protocol map 117. It should be understood, however, that various implementations of the operating environment 100 can include zero, one, or more than one instance of any of these elements shown in FIGS. 2A-2G. As such, the illustrated embodiment of the operating environment 100 and the elements shown in FIGS. 2A-2G should be understood as being illustrative and should not be construed as being limiting in any way.

Turning now to FIGS. 3A-3E, with continued reference to FIG. 1 and FIGS. 2A-2G, aspects of methods for optical networking with hybrid optical vortices will be described in detail, according to illustrative embodiments. It should be understood that each of the operations of the one or more methods disclosed herein (e.g., the methods 300, 310, 317, and 330 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. It is also understood that any functions and operations discussed with respect to FIG. 1 and FIGS. 2A-2G may be included within an operation of an embodiment of a method according to the concepts and technologies discussed herein. The operations have been presented in the demonstrated order for ease of description and illustration, and therefore should not be construed as limiting the various embodiments disclosed herein in any way. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like. For example, computer-readable instructions can be provided by the control app 153, the controller 109, and/or any other device or system discussed herein.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, functions, acts, or modules. These states, operations, structural devices, functions acts, and modules may be implemented in software, in firmware, in special purpose digital logic, and any combination thereof. As used herein, the phrase "cause a processor to perform operations" and variants thereof is used to refer to causing and transforming a processor of a computing system or network device, such as any network node within the network 106 (e.g., any of the optical network nodes 108, 190, 192, the hybrid optical switch 150, the network quality monitor computer system 194, and/or the network access points 116, 118) and/or any other devices within the operating environment 100 (e.g., the UEs 102, 104), to perform one or more operations and/or causing the processor to direct other components of a computing system (e.g., any of the optical network nodes 108, 190, 192, the hybrid optical switch 150, the network quality monitor computer system 194, and/or the network access points 116, 118) to perform one or more of the operations discussed herein.

For purposes of illustrating and describing the concepts of the present disclosure, the operations of methods disclosed herein are described as being performed by one or more of the optical network node 108 and/or the hybrid optical switch 150 via execution of one or more software modules (i.e., where software modules refers to computer-executable instructions configured as data that can instruct and transform a processor) such as, for example without limitation, the instructions provided by the controller 109 and/or the control app 153 that can configure at least one or more processor 109A and any other component of the optical network node 108, and/or at least one or more processor 151 and any other component of the hybrid optical switch 150. It should be understood that additional and/or alternative devices and/or network elements can, in some embodiments, provide the functionality described herein via execution of one or more modules, applications, and/or other software including, but not limited to, the other instances of hybrid optical switch 150 or the optical network nodes 190, 192. Thus, the illustrated embodiments are illustrative, and should not be viewed or construed as being limiting in any way. The methods 300, 310, 317, and 330 variously shown in FIGS. 3A-3E will be described with reference to at least one or more of the FIG. 1 and the FIGS. 2A-2E.

Figure 3A:
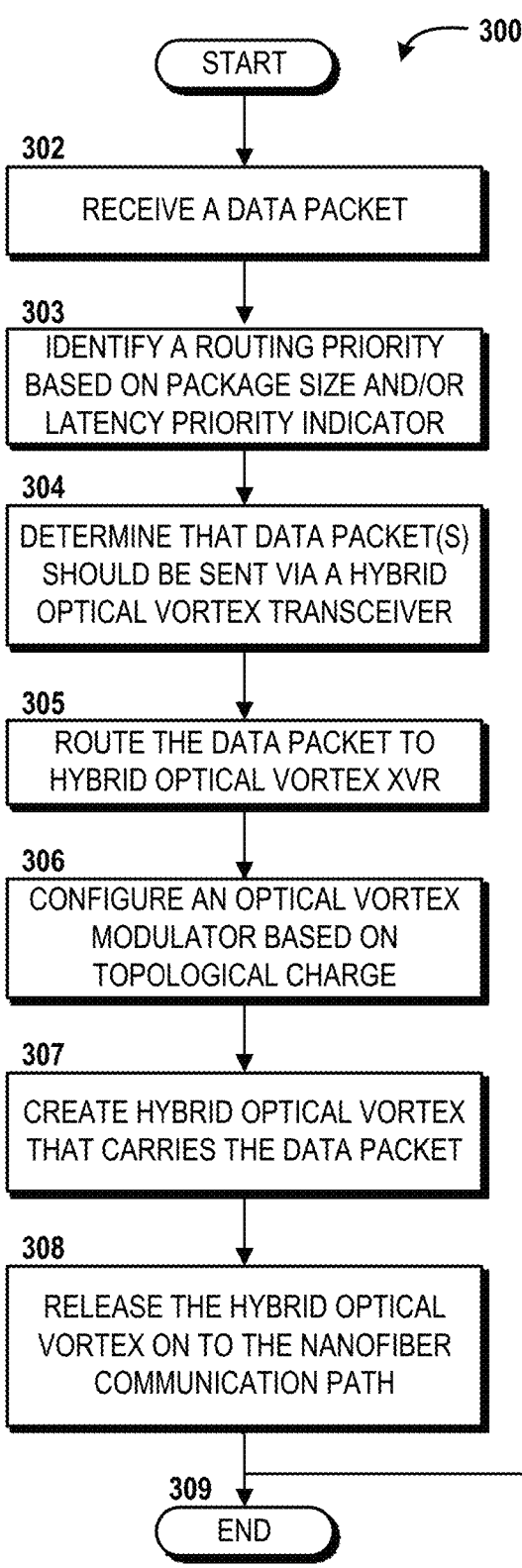
FIG. 3A is a flow diagram illustrating aspects of a method for optical networking with hybrid optical vortices, according to an illustrative embodiment.

Turning now to FIG. 3A, the method 300 for optical networking with hybrid optical vortices is disclosed, according to an illustrative embodiment. In some embodiments, one or more operations of the method 300 can be performed by the optical network node 108 that may execute an instance of the control app 153 that can configure the controller 109, including the processor 109A of the controller 109. It is understood that, in other embodiments, another network device (e.g., any of the optical network nodes 190, 192 and/or the hybrid optical switch 150) may perform one or more operations of the method 300 discussed herein. It should be understood that the examples provided are for illustration purposes only, and therefore should not be construed as limiting in any way.

In some embodiments, the method 300 can begin at operation 302, where the optical network node 108 can receive a data packet that was sent from a UE, such as an instance of the IP packet 125 that was sent from the UE 102. It is understood that the data packet that is received may be any information or data that is intended to be provided to a destination within the network 106 and/or outside the network 106, such as but not limited to the hybrid optical switch 150. The data packet (e.g., the IP packet 125) may be received via a network interface of the optical network node 108. In some embodiments, the data packet may be received using electrical and/or optical networking. It should be understood that the examples provided are for illustration purposes only, and therefore should not be construed as limiting in any way.

From operation 302, the method 300 can proceed to operation 303, where the optical network node 108 can identify a routing priority for the data packet, where the routing priority can indicate whether a hybrid optical vortex should be used to encapsulate, encode, or otherwise carry the data packet for traversal across the network 106, such as to a next network hop (e.g., the hybrid optical switch 150). For example, a routing priority may be based on a package size of the IP packet 125 (e.g., a data file size) and/or a latency priority indicator included within the IP packet 125. The latency priority indicator can indicate a maximum amount of time attributed to network latency that is acceptable for the IP packet 125. In some embodiments, the optical vortex protocol map 117 can define a latency priority threshold time (e.g., N milliseconds) which indicates a maximum amount of latency that would be incurred through use of a certain communication path, such as the nanofiber communication path 130. For example, if the latency priority indicator of the IP packet 125 indicates 20 milliseconds (which indicates the amount of time that is acceptable for the IP packet 125 to incur due to network latency while traversing a communication path) and the latency priority threshold time for the nanofiber communication path 130 defined by the optical vortex protocol map 117 indicates 10 milliseconds (which in this example indicates that the network latency that would be incurred would be no more than 10 milliseconds), then the IP packet 125 can be supported by the nanofiber communication path 130 for routing to the hybrid optical switch 150 because only 10 milliseconds of latency would be incurred using the nanofiber communication path 130, which is below the maximum allowable latency time of 20 milliseconds indicated by the latency priority indicator of the IP packet 125. Other non-nanofiber communication paths (e.g., the non-nanofiber communication paths 129, 142, 144) may have a lower data throughput compared to the nanofiber communication path 130, and therefore would cause the IP packet 125 to incur network latency beyond the allowable time indicated by the latency priority indicator of the IP packet 125, such as 20 milliseconds. It should be understood that the examples provided are for illustration purposes only, and therefore should not be construed as limiting in any way.

From operation 303, the method 300 can proceed to operation 304, where the optical network node 108 can determine that the data packet (e.g., the IP packet 125) should be sent via the hybrid optical vortex transceiver 112. This determination can be based on the optical network node 108 identifying the routing priority and/or determining that the nanofiber communication path 130 should be employed or otherwise activated for use to route and provide the IP packet 125 to the hybrid optical switch 150.

From operation 304, the method 300 can proceed to operation 305, where the optical network node 108 can route the data packet (e.g., an instance of the IP packet 125) to the hybrid optical vortex transceiver 112. In some embodiments, the optical transceiver 113 of the hybrid optical vortex transceiver 112 can generate a photon (e.g., the photon 124) that can be directed to the optical vortex modulator 114 so as to encode and encapsulate the IP packet 125 within an optical vortex (e.g., the optical vortex 122) via a topological charge (e.g., the topological charge 123).

From operation 305, the method 300 can proceed to operation 306, where the optical network node 108 can configure the optical vortex modulator 114 based on a topological charge that is determined based on the IP packet 125. For example, in some embodiments, the optical network node 108 can generate a binary string based on the IP packet 125. In some embodiments, the IP packet 125 may already be in the form of a binary string when received in operation 302. Based on the binary string corresponding to the IP packet 125, the optical network node 108 can determine a topological charge value using the optical vortex protocol map 117. The optical network node 108 can adjust, activate, or otherwise configure the optical vortex modulator 114 so as to impart the topological charge value corresponding to the IP packet 125 to the photon 124 in order to create an optical vortex having a topological charge (e.g., the topological charge 123) with the topological charge value.

From operation 306, the method 300 can proceed to operation 307, where the optical network node 108 can create a hybrid optical vortex that carries the data packet. For example, the hybrid optical vortex transceiver 112 can direct the photon 124 onto the optical vortex modulator 114 such that, when the photon 124 passes through the optical vortex modulator 114, the photon 124 is configured to have the topological charge 123, thereby creating the optical vortex 122 that encapsulates, encodes, or otherwise carries the IP packet 125 via the topological charge 123. The hybrid optical vortex transceiver 112 can direct the optical vortex 122 to the electron coupler 115 such that the optical vortex 122 is surrounded by a topological insulator material, which causes the optical vortex 122 to become coupled to a single electron (e.g., the electron 121), and in turn creates the hybrid optical vortex 120 that carries an instance of the IP packet 125.

From operation 307, the method 300 can proceed to operation 308, where the optical network node 108 can release the hybrid optical vortex 120 onto the nanofiber communication path 130. For example, the electron coupler 115 may be coupled to an instance of nanofiber optical thread 133 of the nanofiber communication path 130 such that a topologically protected surface state is provided between the hybrid optical vortex transceiver 112 and the nanofiber optical thread 133 of the nanofiber communication path 130. Once the hybrid optical vortex 120 is released onto the nanofiber communication path 130, it can be provided to the hybrid optical switch 150. In some embodiments, the hybrid optical vortex 120 can be provided along the nanofiber communication path 130 to the hybrid optical switch 150 without the nanofiber communication path 130 reflecting and/or refracting the data packet (e.g., the IP packet 125) being carried by the optical vortex 122 of the hybrid optical vortex 120.

From operation 308, the method 300 can proceed to operation 309, where the method 300 can end. In some embodiments, the method 300 may proceed from operation 308 to operation 332 shown in FIG. 3D, which will be discussed with respect to the method 330 below in further detail.

Figure 3B:
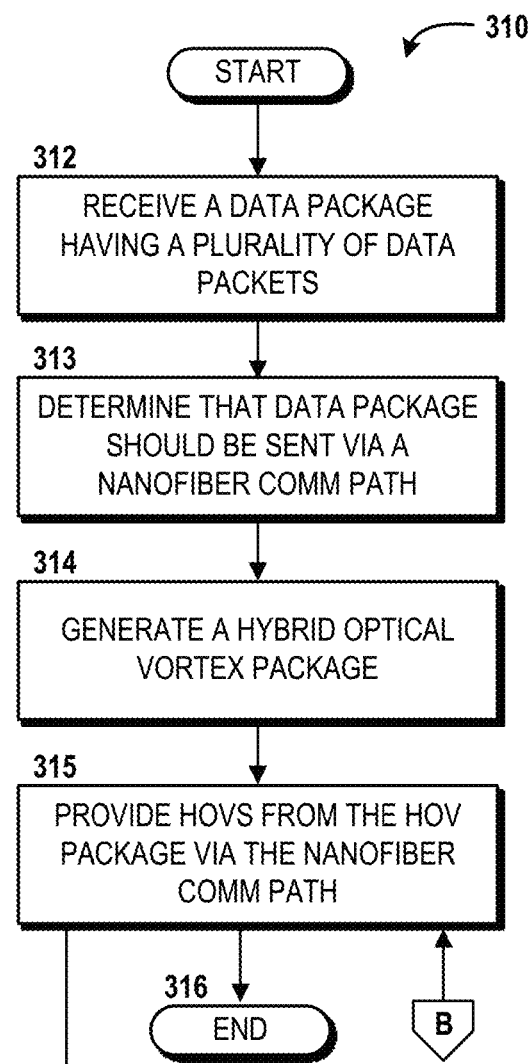
FIG. 3B is a flow diagram illustrating aspects of another method for optical networking with hybrid optical vortices, according to an illustrative embodiment.

Turning now to FIG. 3B, the method 310 for optical networking with hybrid optical vortices is disclosed, according to an illustrative embodiment. In some embodiments, the method 310 can begin at operation 312, where the optical network node 108 can receive a data package that has a plurality of data packets, such as the data package 107 from the UE 102. The data package 107 can have a plurality of instances of the IP packet 125. In some embodiments, at least one instance of the IP packet 125 can include the IP header 126 that has header information, which can include a network address (e.g., an IP address) corresponding to a destination of the data package 107, such as the UE 104.

From operation 312, the method 310 can proceed to operation 313, where the optical network node 108 can determine that the data package 107 (and thus one, more than one, or all instances of the IP packet 125 included therein) should be sent via a nanofiber communication path, such as the nanofiber communication path 130. In some embodiments, this determination can be based on performance of one or more of the operations 303 and 304 discussed herein. In an embodiment, once the optical network node 108 determines that the nanofiber communication path 130 should be used, the data package 107 can be routed to the hybrid optical vortex transceiver 112. It should be understood that the examples provided are for illustration purposes only, and therefore should not be construed as limiting in any way.

From operation 313, the method 310 can proceed to operation 314, where the optical network node 108 can generate a hybrid optical vortex package, which may be configured substantially similar to the embodiment of the hybrid optical vortex package 234 shown and discussed with respect to at least FIG. 2F. In some embodiments, instances of the IP packet 125 from the data package 107 are used by the hybrid optical vortex transceiver 112 to generate a hybrid optical vortex package, such as the hybrid optical vortex package 234. In some embodiments, two or more instances of the hybrid optical vortex 120 can be generated to provide the hybrid optical vortex package 234, where at least one of the two or more instances of the hybrid optical vortex 120 carry, encode, or otherwise encapsulate the one or more instance of the IP packet 125 that is included in the data package 107. In some embodiments, two or more instances of the hybrid optical vortex package 234 can include two or more instances of the hybrid optical vortex 120 such that each of the IP packets 125 from the data package 107 is carried, encoded, or otherwise encapsulated by one or more instances of the hybrid optical vortex 120 and may be used for the two or more instances of the hybrid optical vortex package 234. Further discussion of an embodiment of operations that can be performed by a network device (e.g., the optical network node 108) to generate a hybrid optical vortex package are provided in the method 317 that is shown with respect to FIG. 3C. It should be understood that the examples provided are for illustration purposes only, and therefore should not be construed as limiting in any way.

From operation 314, the method 310 can proceed to operation 315, where the optical network node 108 can provide one or more of the instances of the hybrid optical vortex 120, which can be used to create a hybrid optical vortex package (e.g., the hybrid optical vortex package 234), to the nanofiber communication path 130 for routing to the hybrid optical switch 150. In some embodiments, instances of the hybrid optical vortex 120 that can collectively provide the hybrid optical vortex package 234 (and are all associated with the data package 107) may be sent in the sequence and/or order in which they were generated. In some embodiments, two or more instances of the hybrid optical vortex 120 may be sent in parallel via the nanofiber communication path 130, such as by using two or more nanofiber optical threads 133 of the nanofiber communication path 130 and/or multiplexing together two instances of the hybrid optical vortex 120 using different wavelengths and sending over the same nanofiber optical thread 133 of the nanofiber communication path 130. It should be understood that the examples provided are for illustration purposes only, and therefore should not be construed as limiting in any way.

From operation 315, the method 310 can proceed to operation 316, where the method 310 can end. In some embodiments, the method 310 may proceed from operation 315 to operation 332 shown in FIG. 3D, which will be discussed with respect to the method 330 below in further detail.

Figure 3C:
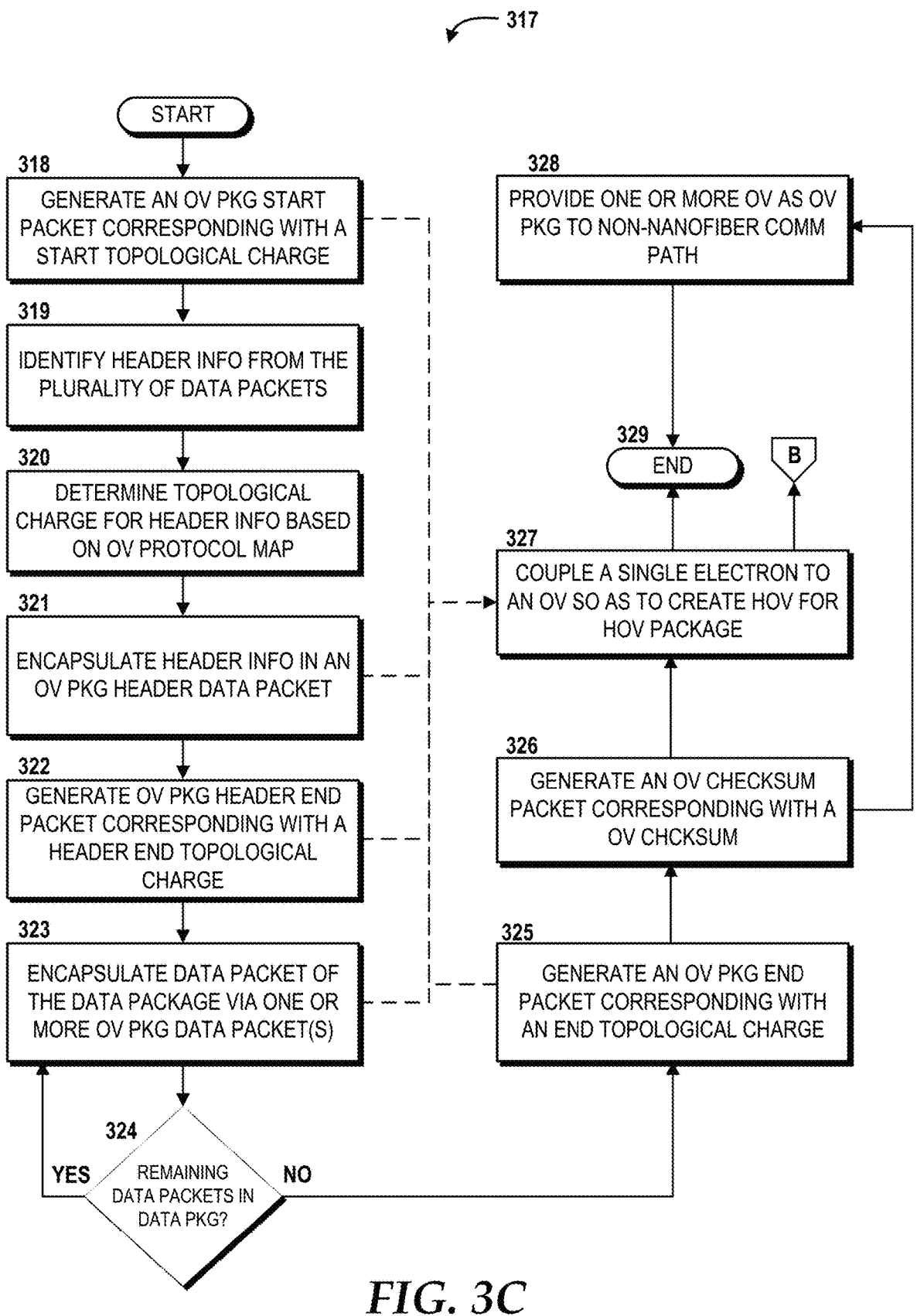
FIG. 3C is a flow diagram illustrating aspects of a method for generating an optical vortex package and/or a hybrid optical vortex package for optical networking, according to an illustrative embodiment.

Turning now to FIG. 3C, the method 317 for generating an optical vortex package and/or a hybrid optical vortex package for optical networking is disclosed, according to an illustrative embodiment. In some embodiments, the operation 314 discussed with respect to the method 310 shown in FIG. 3B can include one or more operations from the method 317. For example, in various embodiments, the optical network node 108 may have performed operations 312 and 314 and in order to perform the operation 314 to generate a hybrid optical package, the optical network node 108 may invoke the method 317 to execute one or more operations. It should be understood that the examples provided are for illustration purposes only, and therefore should not be construed as limiting in any way.

In some embodiments, the method 317 can begin at operation 318, where the optical network node 108 can generate an optical vortex package start packet corresponding with a start topological charge. For example, the hybrid optical vortex transceiver 112 can generate an optical vortex (e.g., an instance of the optical vortex 122) that is configured to represent the optical vortex package start packet 218. As such, the optical vortex package start packet 218 can include an instance of the optical vortex 122 that is configured with the start topological charge 218A. The start topological charge 218A can correspond with a topological charge value defined in the optical vortex protocol map 117 which indicates to the receiving network device (e.g., the hybrid optical switch 150) the start of a sequence of optical vortices for an optical vortex package and/or a hybrid optical vortex package. In some embodiments, the optical network node 108 can configure the instance of the optical vortex 122 (which represents the optical vortex package start packet 218 and that has the optical vortex package start packet 218) to have a specific wavelength that corresponds with an optical vortex color 250 (e.g., blue) that should be used for the optical vortex package start packet 218. In some embodiments, the wavelengths for the optical vortex color 250 being used by the optical vortex package control packets may correspond with a priority indicator which can indicate a quality of service. It should be understood that the examples provided are for illustration purposes only, and therefore should not be construed as limiting in any way. In an embodiment, the method 317 can proceed from operation 318 to operation 327, which will be discussed below following a discussion of operations 319-326.

From operation 318, the method 317 can proceed to operation 319, where the optical network node 108 can identify header information from among one or more of the data packets that are included in the data package. For example, the optical network node 108 can identify the IP header 126 that is included in at least one instance of the IP packet 125 from the data package 107.

From operation 319, the method 317 can proceed to operation 320, where the optical network node 108 can determine a topological charge for the header information based on the optical vortex protocol map 117. For example, the optical network node 108 can analyze the IP header 126 and convert and/or transform any information included therein (e.g., a network address) to a binary string, which can be used by the optical network node 108 to identify and map one instance of the binary string 240 to a topological charge value 242 indicated in the optical vortex protocol map 117. The topological charge value that is determine based on the IP header 126 can be used to provide the topological charge 220A for the optical vortex package header data packet 220.

From operation 320, the method 317 can proceed to operation 321, where the optical network node 108 can encapsulate header information in an optical vortex package header data packet. For example, the optical network node 108 can generate an instance of the optical vortex 122 by imparting the topological charge 220A to the optical vortex 122 so as to encapsulate the IP header 126 and provide the optical vortex package header data packet 220.

From operation 321, the method 317 can proceed to operation 322, where the optical network node 108 can generate an optical vortex package header end packet corresponding with a header end topological charge. For example, the optical network node 108 can generate an instance of the optical vortex 122 that is configured with the header end topological charge 222A so as to indicate the end of the header information for the data package 107. As such, the instance of the optical vortex 122 having the header end topological charge 222A can represent the optical vortex package header end packet 222. In some embodiments, the topological charge value for the header end topological charge 222A can be defined in the optical vortex protocol map 117, which may also define a wavelength and/or optical vortex color that should be used.

From operation 322, the method 317 can proceed to operation 323, where the optical network node 108 can encapsulate a data packet that is included in the data package via one or more optical vortex package data packet. For example, any remaining information from an instance of the IP packet 125 included in the data package 107 (which is not header information that was not already encapsulated) can be encapsulated in a topological charge 224A of an optical vortex that represents the optical vortex package data packet 224.

From operation 323, the method 317 can proceed to operation 324, where the optical network node 108 can determine whether any data packets included in the data package remain, and thus have not been encapsulated via an optical vortex. For example, in an embodiment, the data package 107 may include four instances of the IP packet 125, where one of the four instances of the IP packet 125 is used to carry the IP header 126. In this example, the instance of the IP packet 125 that included the IP header 126 may have been encapsulated via the optical vortex for the optical vortex package header end packet 222. The second of the four instance of the IP packet 125 may have been encapsulated via the optical vortex for the optical vortex package data packet 224. In this example, the optical network node 108 can determine that two instances of the IP packet 125 (out of the four total instances of the IP packet 125 included in the data package 107) are remaining and should be encapsulated as an optical vortex package data packet, such as the optical vortex package data packets 226 and 228 shown in FIG. 2E.

If the optical network node 108 determines that data packets are remaining, the method can proceed along the YES path to operation 323, where the optical network node 108 can encapsulate the remaining data packets (e.g., the remaining two instances of the IP packet 125 from the data package 107) to create the optical vortex package data packets 226, 228 that have topological charges 226A, 228A, respectively, based on the respective topological charge values determined from the binary strings of the remaining instances of data packets.

If the optical network node 108 determines that all data packets included in the data package have been encapsulated, and thus no data packets are remaining, then the method 317 can proceed to operation 325, where the optical network node 108 can generate the optical vortex package end packet 230 that corresponds with the end topological charge 230A. For example, the optical network node 108 can determine the topological charge value from the optical vortex protocol map 117 that corresponds with the end topological charge 230A and generate an instance of the optical vortex 122 that has a topological charge that represents the end topological charge 230A. The instance of the optical vortex 122 that represents the end topological charge 230A can be generated after the optical vortex package data packets 226, 228 are generated. In some embodiments, the optical vortex color for the optical vortex package end packet 230 can be the same as the optical vortex color used for the optical vortex package start packet 218 and the optical vortex package header end packet 222. It should be understood that the examples provided are for illustration purposes only, and therefore should not be construed as limiting in any way.

From operation 325, the method 317 can proceed to operation 326, where the optical network node 108 can generate the optical vortex checksum packet 232 corresponding with the optical vortex checksum 232A. For example, the optical network node 108 can determine the topological charge value from the optical vortex protocol map 117 that corresponds with the optical vortex checksum 232A and generate an instance of the optical vortex 122 that has a topological charge that has a value representing the optical vortex checksum 232A. The instance of the optical vortex 122 that provide the optical vortex checksum 232A can be generated and sent after the optical vortex package end packet 230. In some embodiments, the optical vortex color for the optical vortex checksum packet 232 can be unique to the optical vortex checksum 232A. The optical vortex checksum 232A can be used by the hybrid optical switch 150 to compare with the validation checksum 155, such as discussed herein. It should be understood that the examples provided are for illustration purposes only, and therefore should not be construed as limiting in any way.

In some embodiments, the method 317 can proceed from operation 326 to operation 327, where the optical network node 108 can couple a single electron to an optical vortex so as to create a hybrid optical vortex corresponding to the hybrid optical vortex package 234. For example, a separate single instance of an electron (e.g., the electrons 219, 221, 223, 225, 227, 229, 231, and 233) can be coupled to each of the instances of the optical vortex 122 that represent the optical vortex package start packet 218, the optical vortex package header data packet 220, the optical vortex package header end packet 222, the optical vortex package data packets 224, 226, 228, the optical vortex package end packet 230, and the optical vortex checksum packet 232, respectively. In some embodiments, the electron may be coupled to an instance of the optical vortex 122 for the hybrid optical vortex package 234 in response to the instance of the optical vortex 122 being generated. As such, in some embodiments, one of more of the operations discussed herein may be performed in parallel. In some embodiments, one or more (or each) instance of a hybrid optical vortex that is created by coupling an electron can be provided to a nanofiber communication, such as the nanofiber communication path 130. For example, in an embodiment, the method 317 can proceed from operation 327 to operation 315 shown in FIG. 3B discussed above with respect to the method 310. In some embodiments, the method 317 can proceed from operation 327 to operation 329, where the method 317 can end.

In some embodiments, the method 317 can proceed from operation 326 to operation 328, where the optical network node 108 does not provide the instances of the optical vortex 122 to a nanofiber communication path (e.g., the nanofiber communication path 130), and therefore does not create an instance of the hybrid optical vortex package 234 because an electron is not coupled to each instance of the optical vortex 122. Instead, the optical network node 108 can provide one or more instances of the optical vortex 122 as an instance of the optical vortex package 216 that is sent to a non-nanofiber communication path, such as the non-nanofiber communication path 129 that does not include a topological insulator. In some embodiments, one or more instances of the optical vortex 122 can be received by the hybrid optical switch 150, but without using hybrid optical vortices. In some embodiments, the non-nanofiber communication path may be used as a backup or redundant communication path in the event that optical networking using hybrid optical vortices cannot occur along a nanofiber communication path due to a fault or error that is detected. From operation 328, the method 317 can proceed to operation 329, where the method 317 can end.

Figure 3D:
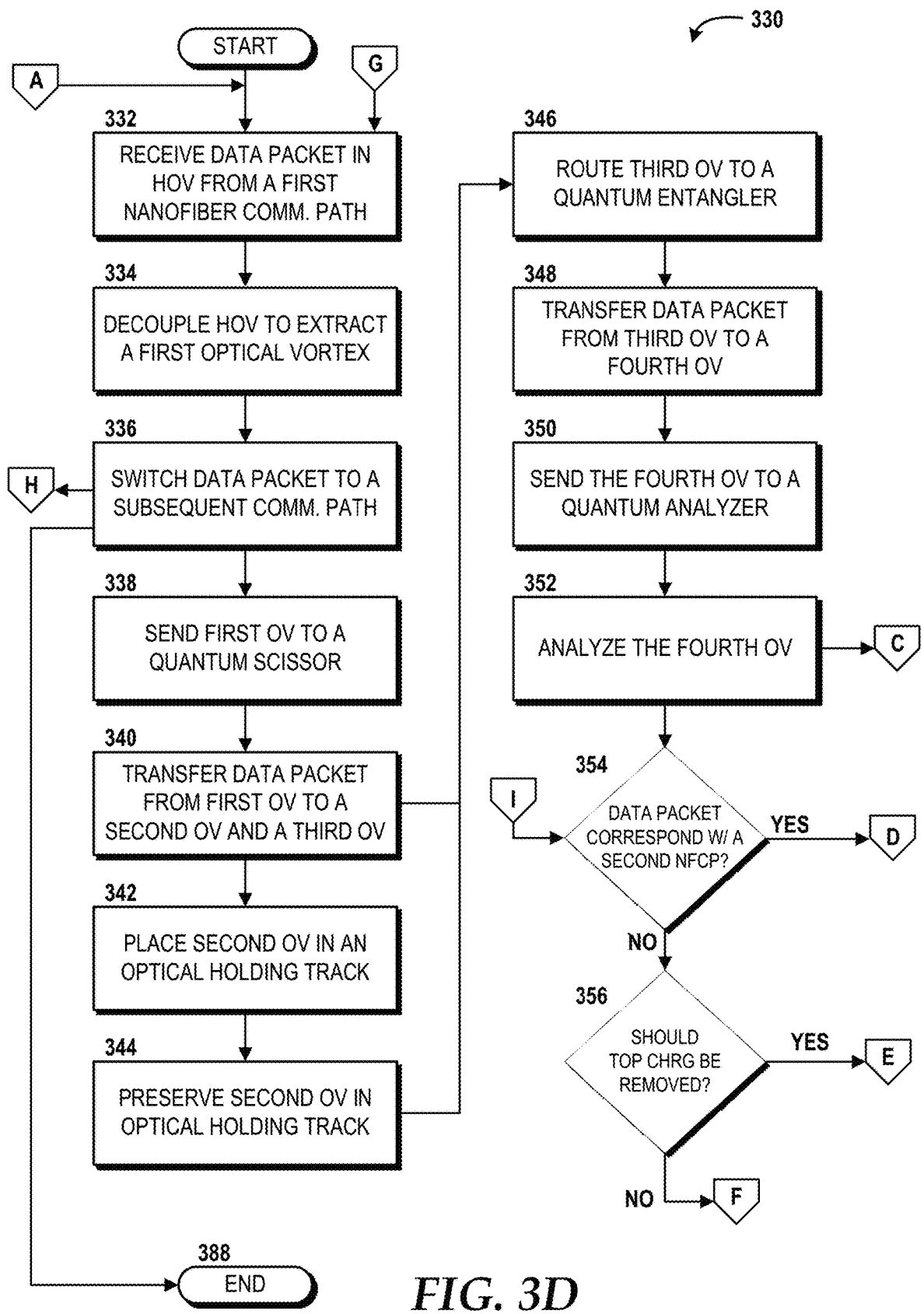
FIG. 3D is a flow diagram illustrating aspects of yet another method for optical networking with hybrid optical vortices, according to an illustrative embodiment.
Figure 3E:
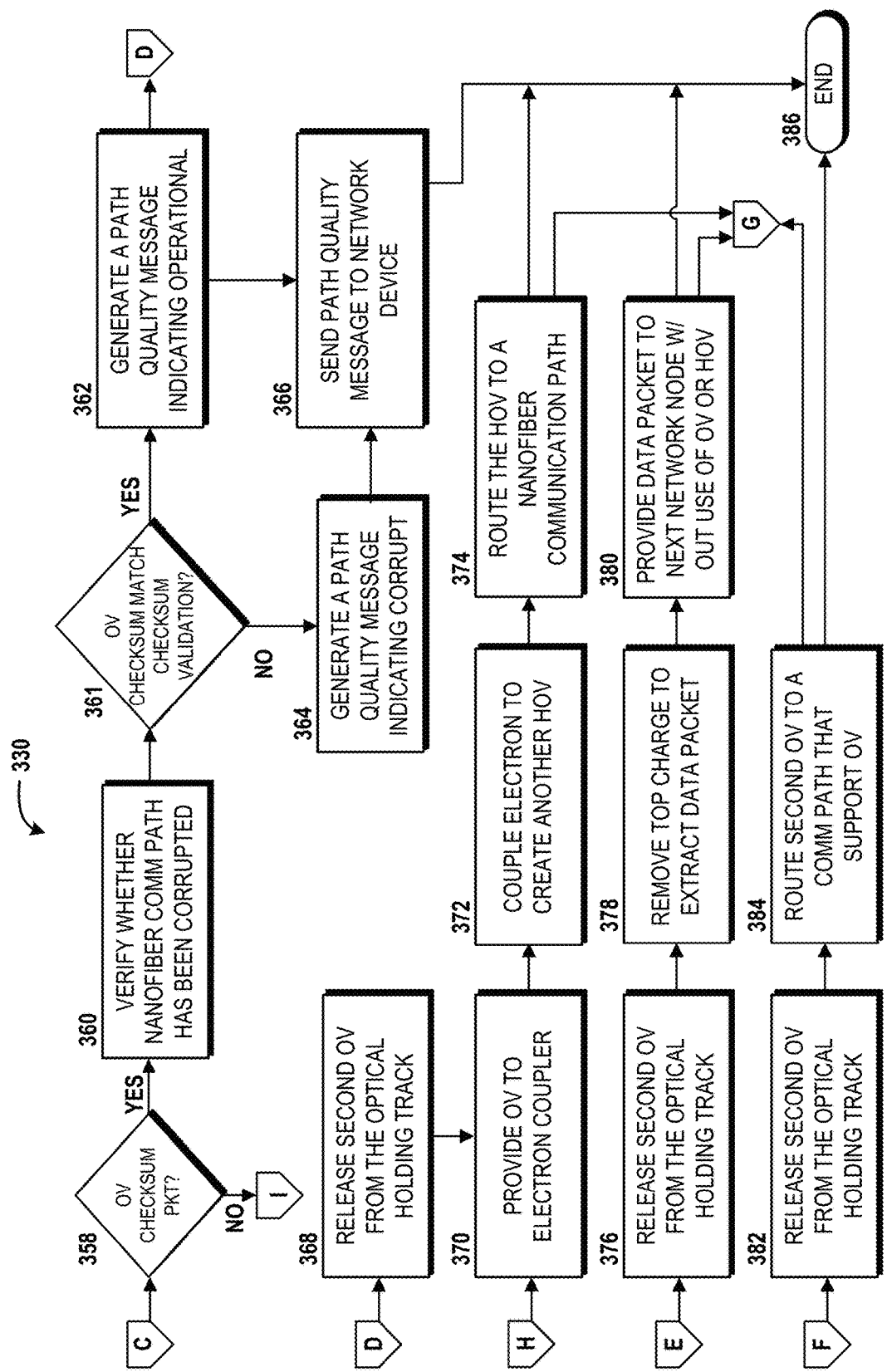
FIG. 3E is a flow diagram illustrating additional aspects of the method shown with respect to FIG. 3D, according to an illustrative embodiment.

Turning now to FIGS. 3D and 3E, the method 330 for optical networking with hybrid optical vortices is disclosed, according to an illustrative embodiment. In an embodiment, the operations discussed with respect to the method 330 may be performed by the hybrid optical switch 150 executing the processor 151 that can be configured by the control app 153. It is understood that, in various embodiments, components of the hybrid optical switch 150 that perform operations of the method 330 may be included in other network devices, such as a router, a network access point, an optical network node, a server, a premise edge device, computing system, or other particular machine. For clarity, the method 330 will be discussed according to an embodiment where one or more operations are performed by the hybrid optical switch 150. It is understood that the examples provided are for illustration purposes only, and therefore should not be construed as limiting in any way.

In some embodiments, the method 330 can begin at operation 332, where the hybrid optical switch 150 can receive a data packet that is carried in a hybrid optical vortex from a first nanofiber communication path. For example, the hybrid optical switch 150 can be optically or otherwise communicatively coupled to the nanofiber communication path 130 such that a topologically protected surface state is provided to receive an instance of the hybrid optical vortex 120 that carries an instance of the IP packet 125. In some embodiments, the instance of the hybrid optical vortex 120 may be a part of a hybrid optical package, such as the hybrid optical vortex package 234 discussed herein. In some embodiments, the nanofiber communication path 130 can include the plurality of nanofiber optical threads 132, where the hybrid optical vortex 120 can be received via an instance of the nanofiber optical thread 133 of the plurality of nanofiber optical threads 132 within the nanofiber communication path 130. In some embodiments, the plurality of nanofiber optical threads 132 may be bundled, arranged, disposed, positioned, or otherwise located adjacent to and/or around the charge core thread 138, which may take the form of a charging wire in an embodiment. The charge core thread 138 can extend along the communication path axis 139 of the nanofiber communication path and can provide an electric current that can assist in transmitting one or more instances of the hybrid optical vortex 120 along the nanofiber communication path 130. The hybrid optical vortex 120 can be received from the topologically protected surface 136 that is provided by the topological insulator material 135 of the nanofiber optical thread 133 in the nanofiber communication path 130. The hybrid optical vortex 120 can include the electron 121 that is coupled to the optical vortex 122 that encapsulates an instance of the IP packet 125 via the topological charge 123. The hybrid optical vortex 120 can trace and/or travel about the topologically protected surface 136 of the nanofiber optical thread 133 based on the electron 121 shielding the optical vortex 122 (and thus the IP packet 125) from being absorbed, reflected, and/or refracted while traversing the nanofiber communication path 130. In some embodiments, the hybrid optical vortex that is received from the first nanofiber communication path (e.g., an instance of the hybrid optical vortex 120) may be referred to as a "first" hybrid optical vortex. It should be understood that the examples provided are for illustration purposes only, and therefore should not be construed as limiting in any way.

From operation 332, the method 330 can proceed to operation 334, where the hybrid optical switch 150 can decouple the first hybrid optical vortex to extract an optical vortex that encapsulates the internet protocol packet. For example, the instance of the hybrid optical vortex 120 can be directed to the electron decoupler 158 that decouples or otherwise separates the electron 121 from optical vortex 122 so as to extract the optical vortex 122 from the hybrid optical vortex 120. An instance of the IP packet 125 can be encapsulated in the topological charge 123 of the optical vortex 122, and therefore the optical vortex 122 can continue to carry a data packet (e.g., the IP packet 125) after decoupling occurs. In some embodiments, the instance of the optical vortex 122 that is extracted from the hybrid optical vortex 120 may be referred to as the "first" optical vortex.

From operation 334, the method 330 can proceed to operation 336, where hybrid optical switch 150 can switch a data packet (e.g., an instance of the IP packet 125) to a subsequent communication path. The subsequent communication path may correspond with a communication path that is communicatively coupled to the hybrid optical switch 150, such as but not limited to, the nanofiber communication path 140 and/or one or more of the non-nanofiber communication paths 142, 144. In some embodiments, the data packet may be switched based on an optical vortex that encapsulates the data packet (e.g., an instance of the IP packet 125).

In an embodiment, at operation 336, the hybrid optical switch 150 may switch the data packet (e.g., the IP packet 125) by providing the first optical vortex to the subsequent communication path. In this embodiment, the hybrid optical switch 150 may determine that the IP packet 125 should be switched to a subsequent communication path that corresponds with a second nanofiber communication path (e.g., the nanofiber communication path 140) because, in this embodiment, the hybrid optical switch 150 received the hybrid optical vortex 120 that included the optical vortex 122 from the nanofiber communication path 130. In this embodiment, the method 330 may proceed from operation 336 to operation 370 shown in FIG. 3E, where the electron coupler 167 is provided the first optical vortex (here the instance of the optical vortex 122 extracted from the hybrid optical vortex 120) to create a second hybrid optical vortex that is provided and routed to the second nanofiber communication path, such as the nanofiber communication path 140. It should be understood that the examples provided are for illustration purposes only, and therefore should not be construed as limiting in any way.

In other embodiments, at operation 336, the hybrid optical switch 150 may switch the data packet (e.g., the IP packet 125) based on inspecting the data packet while preserving an instance of the data packet in an optical vortex. For example, the control app 153 may instruct hybrid optical switch 150 to initiate switching of the data packet to a subsequent communication path by using the quantum scissor 160 to create two or more instances of optical vortices, where each of the two or more instances of the optical vortex is configured to carry an instance of the data packet (e.g., the IP packet 125). As such, the control app 153 may instruct the electron decoupler 158 to send the first optical vortex (e.g., the instance of the optical vortex 122 included in the hybrid optical vortex 120) from the electron decoupler 158 to the quantum scissor 160, which is discussed in operation 338.

From operation 336, the method 330 may proceed to operation 338, where the hybrid optical switch 150 can send and/or direct the first optical vortex to a quantum scissor. For example, the hybrid optical switch 150 can direct the instance of the optical vortex 122 that was included in the hybrid optical vortex 120 from the electron decoupler 158 to the quantum scissor 160.

From operation 338, the method 330 can proceed to operation 340, where the hybrid optical switch 150 can transfer the data packet encapsulated by the first optical vortex to a second optical vortex and a third optical vortex, where each of the second optical vortex and the third optical vortex can carry and encapsulate the data packet via a topological charge. For example, the optical vortex 122 that encapsulates and carries an instance of the IP packet 125 via the topological charge 123 may be directed through one or more beam splitters of the quantum scissor 160, which uses two photons of the quantum pair 168 to create the second optical vortex (e.g., the optical vortex 171) and the third optical vortex (e.g., the optical vortex 175) that each have the same topological charge (e.g., the topological charge 172 of the optical vortex 175 has the same topological charge value as the topological charge 176 of the optical vortex 175). Because each of the second optical vortex and the third optical vortex have the same topological charge, they each carry and encapsulate an instance of the data packet (e.g., each of the optical vortex 171 and the optical vortex 175 carry and encapsulate an instance of the IP packet 125 via the topological charges 172, 176, respectively). In some embodiments, the polarity of the topological charge of the third optical vortex (e.g., a negative, left-handed direction of twist for the topological charge 176 of the optical vortex 175) may be opposite from the polarity of the topological charge of the first optical vortex and the second optical vortex (e.g., each of the optical vortex 122 and the optical vortex 171 have a positive, right-handed direction of twist for the topological charges 123, 172, respectively). In some embodiments, the method 330 may proceed from operation 340 to operation 346 before, during, or after performance of operation 342. It should be understood that the examples provided are for illustration purposes only, and therefore should not be construed as limiting in any way. For clarity, as discussion of operation 346 will be provided after the discussion of operation 342.

From operation 340, the method 330 can proceed to operation 342, where the hybrid optical switch 150 can place the second optical vortex in an optical holding track. For example, the hybrid optical switch 150 can direct the optical vortex 171 from the quantum scissor 160 to the optical holding track 165, where the optical vortex 171 can be received and held.

From operation 342, the method 330 can proceed to operation 344, where the second optical vortex can be preserved, maintained, or otherwise held in the optical holding track. For example, optical vortex 171 can be maintained in the optical holding track 165 by being held in a circular fiber optic path that enables the optical vortex 171 to carry the instance of the IP packet 125 via the topological charge 172 while analysis and inspection occurs to one or more instances of an optical vortex carrying a data packet (e.g., the optical vortex 175 and/or the optical vortex 180).

From operation 344, the method 330 can proceed to operation 346, where the hybrid optical switch 150 can route the third optical vortex to a quantum entangler so as to impart or otherwise transfer an instance of the data packet (e.g., IP packet 125) to a fourth optical vortex, while also inverting or otherwise reversing the polarity provided by the topological charge of the third optical vortex so as to the enable the fourth optical vortex to have a topological charge with the same polarity as the first optical vortex and the second optical vortex. For example, the optical vortex 175 may be routed from the quantum scissor 160 to the quantum entangler 161, which can be instructed to use a photon to transfer the topological charge 176 to the topological charge 181 so as to create the optical vortex 180, as discussed in operation 348.

From operation 346, the method 330 can proceed to operation 348, where the hybrid optical switch 150 can transfer the data packet that is carried and encapsulated in the third optical vortex to a fourth optical vortex. For example, the control app 153 can instruct the quantum entangler 161 to use a photon that collides with the optical vortex 175 so as to create the optical vortex 180 and transfer the value of the topological charge 176 to the topological charge 181, thereby imparting or transferring an instance of the IP packet 125 to the optical vortex 180. For example, as shown in FIG. 1, the topological charge 181 can carry the IP packet 182, which represents a replica or copy of an instance of the IP packet 125 that was included in the optical vortices 122, 171, and 180. In some embodiments, the data packet represented by the topological charge 181 may correspond with the optical vortex checksum 232A because the instance of the optical vortex 122 and 175 may have carried the optical vortex checksum 232A. It should be understood that the examples provided are for illustration purposes only, and therefore should not be construed as limiting in any way.

From operation 348, the method 330 can proceed to operation 350, where the hybrid optical switch 150 can send the fourth optical vortex to the quantum analyzer. For example, in an embodiment, the optical vortex 180 can be sent to the quantum analyzer 162 for analysis and inspection. In some embodiments, the second optical vortex (e.g., the optical vortex 171) can be held, maintained, or otherwise preserved in the optical holding track 165 while the fourth optical vortex (e.g., the optical vortex 180) is analyzed and inspected.

From operation 350, the method 330 can proceed to operation 352, where the hybrid optical switch 150 can analyze and inspect the fourth optical vortex. For example, in some embodiments, the control app 153 can instruct the quantum analyzer 162 to detect a wavelength and/or determine a topological charge value based on the topological charge 181 of the optical vortex 180. By this, the quantum analyzer 162 can inspect and analyze the optical vortex 180 so as to make determinations as to which subsequent communication path should be used to provide one or more instances of a data packet carried by the second optical vortex to the next network hop, such as the optical network node 192. In some embodiments, the quantum analyzer 162 may determine whether the data packet that is carried and encapsulated by the fourth optical vortex corresponds with an optical vortex package control packet, an optical vortex package data packet, or an optical vortex checksum packet.

In some embodiments, the method 330 can proceed from operation 352 to operation 358 shown in FIG. 3E. In some embodiments, the method 330 may proceed from operation 352 to operation 354. In some embodiments, the operations 358 and 354 may be performed in parallel or in sequence. For clarity, the operations 358, 360, 361, 362, 364, and 366 will be discussed first, followed by a discussion of operation 354 below.

As shown in FIG. 3E, at operation 358 the hybrid optical switch 150 can determine whether the fourth optical vortex corresponds or otherwise represents an optical vortex checksum packet. For example, the quantum analyzer 162 can detect a wavelength of the optical vortex 180 and use the optical vortex protocol map 117 to determine whether the detected wavelength corresponds with an optical vortex color that represents an optical vortex checksum packet, such as the optical vortex checksum packet 232. In some embodiments, the quantum analyzer 162 can determine whether the optical vortex 180 corresponds with an optical vortex checksum packet based on the topological charge 181 and using the optical vortex protocol map 117 to compare a topological charge value of the topological charge 181 with a binary string that corresponds with an optical vortex checksum (e.g., the optical vortex checksum 232A). In some embodiments, the wavelength and/or topological charge 181 of the optical vortex 180 may indicate that the optical vortex 180 carries a data packet and/or information that does not include an optical vortex checksum, but instead represents an optical vortex package control packet and/or an optical vortex package data packet. As such, if the optical vortex 180 does not include information corresponding to an optical vortex checksum, then the method 330 may proceed from operation 358 along the NO path to operation 354 shown in FIG. 3D, which is discussed below in further detail. If the optical vortex 180 is determined to correspond with an optical vortex checksum packet (such as based on the wavelength and/or topological charge 181 of the optical vortex 180), then the method 330 may proceed along the YES path to operation 360. For clarity, a discussion of the operations proceeding along the YES to operation 360 will be discussed first, followed by a discussion of the operation 354 shown in FIG. 3D.

At operation 360, the hybrid optical switch 150 can verify whether the first nanofiber communication path has been corrupted and/or exhibit an error. For example, in some embodiments, the quantum analyzer 162 can verify whether the nanofiber communication path 130 has been corrupted or otherwise exhibits an error or fault based on whether the optical vortex checksum 232A represented by the value of the topological charge 181 matches the value for the validation checksum 155 that can be stored in the memory 152 of the hybrid optical switch 150.

From operation 360, the method 330 can proceed to operation 361, where the hybrid optical switch 150 can determine whether the optical vortex checksum 232A represented by the value of the topological charge 181 matches the value for the validation checksum 155. If the value of the topological charge 181 matches the value for the validation checksum 155, then method 330 may proceed along the YES path to operation 362. If the value of the topological charge 181 does not match the value for the validation checksum 155, then the method 330 may proceed along the NO path to operation 364. For clarity, a discussion proceeding along the YES path to operation 362 will be provided first, followed by a discussion along the NO path to operation 364.

At operation 362, the hybrid optical switch 150 can generate a path quality message, such as the path quality message 196. Because the quantum analyzer 162 determined that the nanofiber communication path 130 is not corrupt and/or does not exhibit an error or fault based on the optical vortex checksum 262 matching the validation checksum 155, the control app 153 may generate the path quality message 196 so as to indicate that the nanofiber communication path 130 is operational and does not exhibit a fault or error. In some embodiments, determination that the value of the topological charge 181 matches the value for the validation checksum 155 and that the nanofiber communication path 130 is operational may serve as a trigger to release the second optical vortex from the optical holding track, such as the optical vortex 171 from the optical holding track 165. In some embodiments, the method 330 may proceed from operation 362 to operation 368, which may occur in addition to performance of operation 366. A discussion of operation 368 will be provided below. In some embodiments, the method 330 may proceed from operation 362 to operation 366, where the hybrid optical switch 150 can send the path quality message 196 that was generated in operation 362 to a network device, such as the network quality monitor computing system 194. In some embodiments, the method 330 can proceed from operation 366 to operation 386, where the method 330 can end. It should be understood that the examples provided are for illustration purposes only, and therefore should not be construed as limiting in any way.

Returning to operation 361, if the value of the topological charge 181 does not match the value for the validation checksum 155, then the method 330 may proceed along the NO path to operation 364, where the hybrid optical switch 150 can generate the path quality message 196 indication that the nanofiber communication path 130 may be corrupt and/or that an error or fault has occurred. From operation 364, the method 330 can proceed to operation 366, where the hybrid optical switch 150 can send the path quality message 196 that was generated in operation 364 to a network device. For example, in some embodiments, in response to the nanofiber communication path being corrupted and/or indicating an error or fault, the fault message (e.g., path quality message 196) may be provided to one or more of the network quality monitor computing system 194 or the optical network node 108 that sent the hybrid optical vortex 120 from which the error or fault was detected. The path quality message 196 can inform the network device of the error and/or instruct the network device to use another nanofiber optical thread of the nanofiber communication path 130 when sending data packets via a hybrid optical vortex. It should be understood that the examples provided are for illustration purposes only, and therefore should not be construed as limiting in any way. In some embodiments, from operation 366, the method 330 can proceed to operation 386, where the method 330 can end.

Returning to FIG. 3D, in some embodiments the method 330 may proceed from operation 352 to operation 354, where the hybrid optical switch 150 can determine whether the data packet (e.g., an instance of the IP packet 125) corresponds with a second nanofiber communication path. In some embodiments, the operation of determining whether the internet protocol packet corresponds with a second nanofiber communication path can occur in response to transferring the internet protocol packet of the optical vortex to one or more of a second optical vortex, a third optical vortex, and/or a fourth optical vortex. For example, in some embodiments, the quantum analyzer 162 can analyze and inspect the fourth optical vortex (e.g., the optical vortex 180) so as to determine a wavelength and/or the topological charge 181 of the optical vortex 180. The quantum analyzer 162 can use the optical vortex protocol map 117 to determine whether the wavelength and/or the topological charge value of the topological charge 181 correspond with an optical vortex color and/or a topological charge value that is designated as being associated with use of a nanofiber communication path, such as the nanofiber communication path 140. In some embodiments, quantum analyzer 162 may convey the topological charge value of the topological charge 181 to determine a binary string that can be translated into header information (e.g., the IP header 126) that can provide a network address corresponding to a destination, such as the next network hop (e.g., the optical network node 192 and/or the UE 104). In some embodiments, the header information that was determined from the topological charge 181 may be compared with the routing map 156, which in turn can indicate whether the next network hop supports optical networking via hybrid optical vortices, and if so, then the data packet corresponds with the second nanofiber communication path, such as the nanofiber communication path 140. Because the data packet that is encapsulated by the optical vortex 180 is the same as the data packet encapsulated by the optical vortex 122, 171, and 175, it is understood that the determination as to whether to route the second optical vortex (e.g., the optical vortex 171) to a nanofiber communication path (e.g., the nanofiber communication path 140) can be based on one or more of the first optical vortex (e.g., optical vortex 122), the third optical vortex (e.g., the optical vortex 175), or the fourth optical vortex (e.g., the optical vortex 180). In some embodiments, switching the data packet that is received via a hybrid optical vortex (e.g., the IP packet 125 carried by the hybrid optical vortex 120) can be in response to determining that the data packet should be sent to a subsequent communication path that corresponds with a nanofiber communication path. While the fourth optical vortex is being inspected to determine which subsequent communication path should be used to route the second optical vortex, the data packet of the second optical vortex can be maintained in the optical holding track 165.

In some embodiments, a second nanofiber communication path (e.g., the nanofiber communication path 140) may be referred to as a subsequent nanofiber communication, "another" nanofiber communication path, or the like. It should be understood that the examples provided are for illustration purposes only, and therefore should not be construed as limiting in any way. In some embodiments, if the optical vortex that carries the data packet (e.g., the IP packet 125) corresponds with a second nanofiber communication path, and/or the data packet itself corresponds with a second nanofiber communication path (e.g., the nanofiber communication path 140), then the method 330 may proceed along the YES path to operation 368 shown in FIG. 3E. If the optical vortex that carries the data packet (e.g., the IP packet 125) does not correspond with a second nanofiber communication path and/or the data packet itself does not correspond with a second nanofiber communication path (e.g., the nanofiber communication path 140), then the method 330 may proceed from operation 354 along the NO path to operation 356. For clarity, a discussion of the method 330 following the YES path to operation 368 will proceed first, followed by a discussion along the NO path to operation 356.

In an embodiment, from operation 354, the method 330 may proceed along the YES path to operation 368, where the hybrid optical switch 150 can provide an instruction to release the second optical vortex from the optical holding track. For example, the control app 153 can provide an instruction to release the optical vortex 171 from the optical holding track 165 based on analysis and inspection of the fourth optical vortex and/or any data packet encapsulated therein, such as based on analysis of the optical vortex 180 and the topological charge 181. In some embodiments, the optical vortex 171 may be released from the optical holding track 165 based on one or more (or all) additional optical vortices corresponding with a data package being received by the hybrid optical switch 150.

From operation 368, the method 330 can proceed to operation 370, where the hybrid optical switch 150 can provide an optical vortex to the electron coupler 167. For example, in an embodiment where the operation 370 proceeds directly from operation 336, the first optical vortex of the first hybrid optical vortex received from the first nanofiber communication path (e.g., the optical vortex 122 of the hybrid optical vortex 120 from the nanofiber communication path 130) may bypass the quantum scissor 160 and be provided to the electron coupler 167 (e.g., directly or via a demultiplexer) so as to create another hybrid optical vortex without analysis or inspection. In other embodiments, such as when the operation 370 is preceded by the operation 368, the second optical vortex (e.g., the optical vortex 171) can be provided to the electron coupler 167 based on the determination that the data packet (e.g., the IP packet 125 and/or the IP packet 182) and/or that the optical vortices (e.g., the optical vortices 122, 171, 175, 180) correspond with the second nanofiber communication path. In some embodiments, the second optical vortex (e.g., the optical vortex 171) may have been released from the optical holding track 165. In an alternate embodiment, the second optical vortex may be provided directly from the quantum scissor 160. In some embodiments, switching the data packet (e.g., IP packet 125) to the second nanofiber communication path (e.g., nanofiber communication path 140) includes providing the second optical vortex that carries the data packet to the electron coupler 167.

From operation 370, the method 330 can proceed to operation 372, where the electron coupler 167 of the hybrid optical switch 150 can couple an electron to an optical vortex to create another hybrid optical vortex. For example, the electron coupler 167 can couple the electron 174 to the optical vortex 171 so as to create the hybrid optical vortex 170 (which may be considered the second hybrid optical vortex). In an alternate embodiment, if the first optical vortex bypasses the quantum scissor 160 and is routed to the electron coupler 167, then the first optical vortex may be used to create the second hybrid optical vortex. It should be understood that the examples provided are for illustration purposes only, and therefore should not be construed as limiting in any way.

From operation 372, the method 330 can proceed to operation 374, where the hybrid optical switch 150 can route, transmit, or otherwise provide the second hybrid optical vortex (e.g., the hybrid optical vortex 170) to the second nanofiber communication path (e.g., the nanofiber communication path 140). In some embodiments, the method 330 may proceed from operation 374 to operation 332, where the hybrid optical switch 150 may receive another instance of a data packet in a hybrid optical vortex that may be a part of a hybrid optical vortex package and therefore one or more operations discussed herein may be repeated. In some embodiments, the method 330 can proceed from operation 374 to operation 386, where the method 330 can end.

Returning to operation 354 shown in FIG. 3D, in some embodiments, if the optical vortex that carries the data packet (e.g., the optical vortices 122, 171, 175, 180 that can carry instances/copies of the IP packet 125 via a topological charge) does not correspond with a second nanofiber communication path (e.g., the nanofiber communication path 140), then the method 330 may proceed along the NO path to operation 356. At operation 356, the hybrid optical switch 150 can determine whether the topological charge of the second optical vortex (e.g., the topological charge 172 of the optical vortex 171) should be removed such that the data packet (e.g., the IP packet 125) is no longer carried in an optical vortex form (e.g., by the optical vortex 171). For example, the quantum analyzer 162 may use the fourth optical vortex (e.g., the optical vortex 180) to determine that an optical vortex representing an optical vortex package control packet has a wavelength and optical vortex color that corresponds with a low priority as defined by the optical vortex protocol map 117. The optical vortex protocol map 117 may indicate that one or more wavelengths of the optical vortex representing the optical vortex package control packet having low priority corresponds with an optical vortex color of yellow, for example. In some embodiments, the control app 153 may determine that the topological charge should be removed because the optical vortex color for low priority does not correspond with a nanofiber communication path, but instead corresponds with a communication path type that is a non-nanofiber communication path (e.g., the non-nanofiber communication path 142 in an embodiment) and/or a non-optical vortex communication path (e.g., the non-nanofiber communication path 144 in an embodiment). If the optical vortex color determined based on the optical vortex xxx corresponds with a xxx communication path, then the topological charge xx of the optical vortex xxx should be removed. If the topological charge xx should be removed, then the method 330 may proceed from operation 356 along the YES path to operation 376 shown in FIG. 3E. For clarity, a discussion proceeding along the YES path to operation 376 will be provided first, followed by a discussion from operation 356 along the NO path from operation 356.

In an embodiment, from operation 356, the method 330 may proceed along the YES path to operation 376, where the control app 153 may release the second optical vortex (e.g., the optical vortex 171) from the optical holding track 165. In this embodiment, the optical vortex 171 may be routed to the demultiplexer 166, which in turn may provide the optical vortex 171 to an optical vortex modulator, such as an instance of the optical vortex modulator 114 that—in an embodiment—can be included in an instance of the optical vortex transceiver 111 included within the hybrid optical switch 150. From operation 376, the method 330 may proceed to operation 378, where the hybrid optical switch 150 can remove the topological charge 172 from the optical vortex 171 so as to extract a data packet carried therein, such as an instance of the IP packet 125 that was transferred from the first optical vortex (e.g., the optical vortex 122) to the second optical vortex (e.g., the optical vortex 171). In some embodiments, the hybrid optical switch 150 can remove the topological charge 172 by configuring an instance of the optical vortex modulator, which untwists the photon of the optical vortex 171 so as to crease a zero value for the internal OAM and thus a zero topological charge value such that the topological charge 172 is removed. From operation 378, the method 330 can proceed to operation 380, where the data packet (e.g., the IP packet 125) may be provided to a next network node (e.g., the optical network node 190, 192) without the use of an optical vortex and/or a hybrid optical vortex. For example, the data packet (e.g., the IP packet 125) may be provided to the next network node in a non-nanofiber communication path without the use of an optical vortex and/or a hybrid optical vortex, such as via an electrical signal or a fiber optical cable that does not support optical vortices and/or hybrid optical vortices. Stated differently, the data packet may be provided to the next network node without being carried, via encapsulation as a topological charge, in an instance of an optical vortex and/or in an instance of a hybrid optical vortex. In some embodiments, the method 330 may proceed from operation 380 to operation 332, where the hybrid optical switch 150 may receive another instance of a data packet in a hybrid optical vortex and one or more operations discussed herein may be repeated. In some embodiments, the method 330 can proceed from operation 380 to operation 386, where the method 330 can end.

Returning to operation 356 shown in FIG. 3D, if the optical vortex color corresponding with the second optical vortex (e.g., the optical vortex 171) corresponds with a communication path that supports optical vortices but not hybrid optical vortices (e.g., the non-nanofiber communication path 142), then the data packet should continue to be encapsulated and carried by the second optical vortex (e.g., the optical vortex 171), and thus topological charge 172 of the optical vortex 171 should not be removed. If the topological charge 172 should not be removed, then the method 330 may proceed along the NO path to operation 382 shown in FIG. 3E. At operation 382, the hybrid optical switch 150 can release the second optical vortex (e.g., the optical vortex 171) from the optical holding track 165. From operation 382, the method 330 can proceed to operation 384, where the hybrid optical switch 150 can route the second optical vortex (e.g., the optical vortex 171) to a communication path that supports optical vortices but does not support hybrid optical vortices (e.g., a non-nanofiber communication path 142 that can be a single mode or multimode fiber optical cable without a topological insulator material). In some embodiments, the method 330 may proceed from operation 384 to operation 332, where the hybrid optical switch 150 may receive another instance of a data packet in a hybrid optical vortex that may be a part of a hybrid optical vortex package and therefore one or more operations discussed herein may be repeated. In some embodiments, the method 330 can proceed from operation 384 to operation 386, where the method 330 can end.

Figure 4:
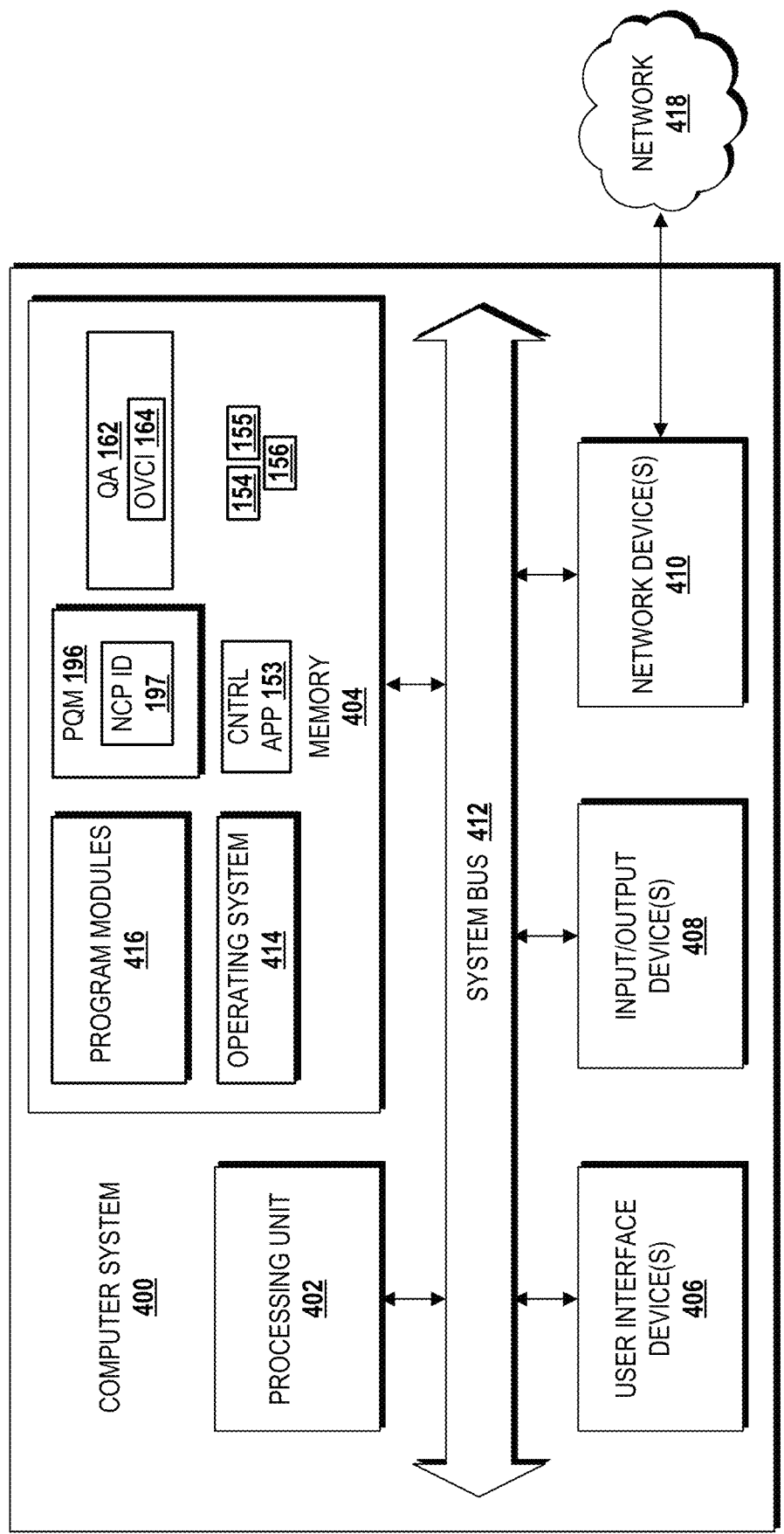
FIG. 4 is a block diagram illustrating an example computer system capable of implementing aspects of the embodiments presented and described herein.

Turning now to FIG. 4, a block diagram is provided illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, at least a portion of one or more of the optical network nodes 108, 190, 192, the hybrid optical switch 150, and/or the network quality monitor computer system 194 can be configured like the computer system 400. In various embodiments, elements from the computer system 400 can be incorporated into any device discussed herein. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can include one or more central processing units ("CPUs") configured with one or more processing cores, and/or one or more graphics processing unit ("GPU") configured to accelerate operations performed by one or more CPUs. The processing unit 402 can include one or more system-on-chip ("SoC") components along with one or more other components, including, for example, one or more of the memory resources, and/or one or more of the other resources. Processing units ("processors") are generally known, and therefore are not described in further detail herein. It is understood that the processor 151 and the processor 109A can be implemented as one or more instance of the processing unit 402.

The memory 404 communicates with the processing unit 402 via the system bus 412. In various embodiments, the memory 152 and the memory 109B can be implemented as one or more instances of the memory 404. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the instructions from the controller 109, the control app 153, the quantum analyzer 162, the optical vortex checksum interpreter 164, and/or other program modules. According to some embodiments, the program modules 416 may be embodied in hardware, software, firmware, or any combination thereof. These and/or other programs can be embodied in computer-readable medium including instructions that, when executed by the processing unit 402, in some embodiments, may perform and/or facilitate performance of one or more of the operations discussed with respect to FIGS. 1, 2A-2G, and 3A-3E, described in detail above. In some embodiments, the memory 404 also can be configured to store information, such as but not limited to the path quality message 196, the nanofiber communication path identifier 197, the communication path type identifier 154, the validation checksum 155, the routing map 156, and/or other data discussed herein, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 106 and/or the network 600. Examples of the network devices 410 include, but are not limited to, a modem, a radio frequency ("RF") or infrared ("IR") transceiver, a telephonic interface, a bridge, a router, or a network card. The network devices 410 may support communication and functionality with the network 418, such as via physical network functions, virtual network functions, virtual and/or physical edge devices, or the like. The network device(s) 410 can, in some embodiments, include one or more transceivers and/or network interfaces that can be included in a network device shown in FIG. 1, such as but not limited to the optical network nodes 108, 190, 192, the hybrid optical switch 150, and/or the network quality monitor computer system 194 with respect to FIG. 1. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 418 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, or any other mobile network and/or wireline network.

Figure 5:
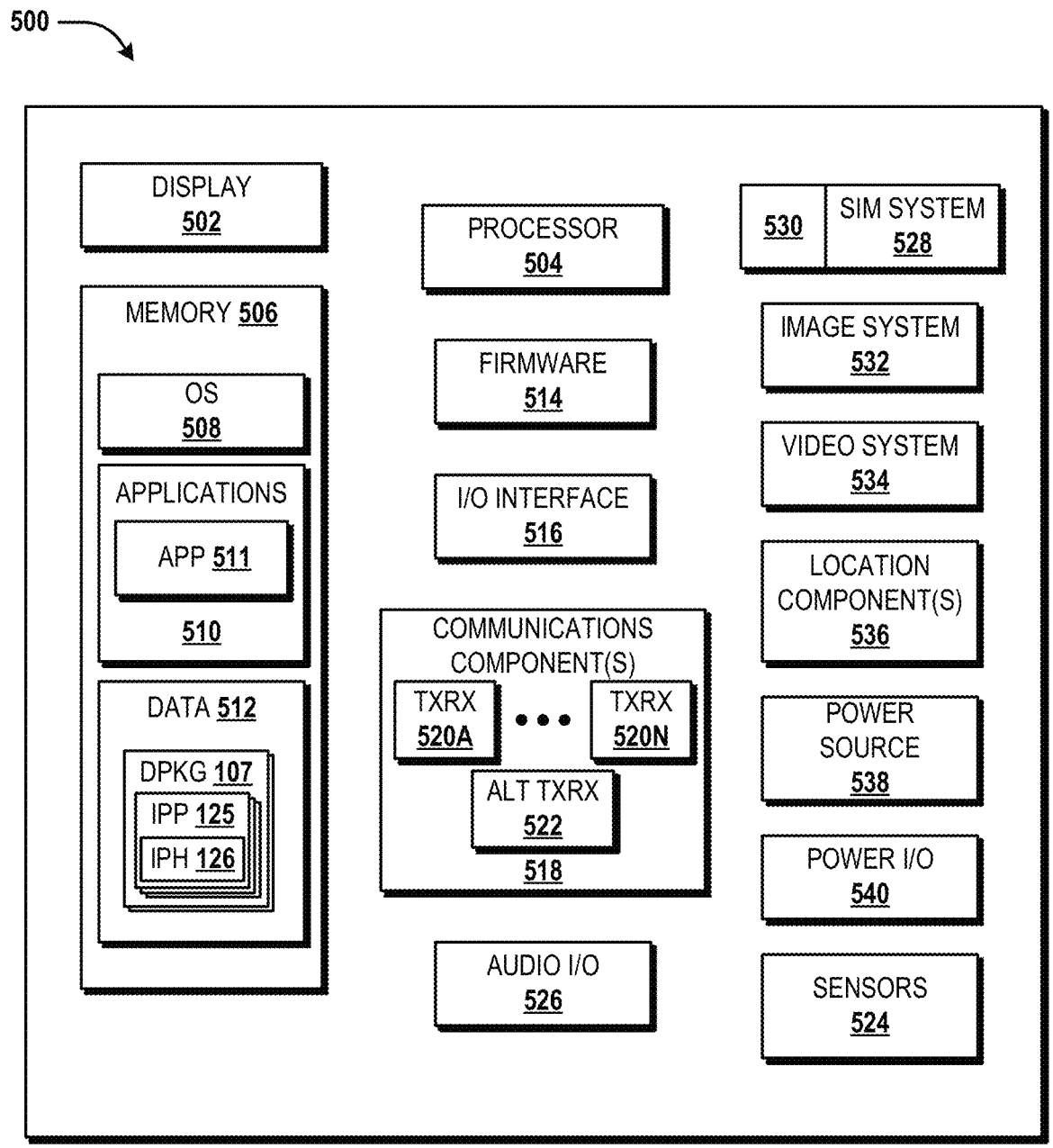
FIG. 5 is a diagram illustrating an example mobile device capable of implementing aspects of the concepts and technologies described herein according to embodiments of the present disclosure.

Turning now to FIG. 5, an illustrative mobile device 500 and components thereof will be described. In some embodiments, one or more of the UEs 102 and 104 (shown in FIG. 1) can be configured like the mobile device 500. It should be understood that the examples provided are for illustration purposes only, and therefore should not be construed as limiting in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like.

The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5). In some embodiments, the application 510 can include a browser or other application that can interact with user input so as to send and receive data to and from the network 106, such as the data package 107. In some embodiments, a third party application (not shown) can be and/or stored in the memory 506 for execution by the mobile device 500.

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing content provided across the network 106, entering/deleting data, entering and setting local credentials (e.g., user IDs and passwords) for device access, configuring settings, manipulating address book content and/or settings, multimode interaction, interacting with other applications 510 and otherwise facilitating user interaction with the operating system 508, the applications 510, and/or other types or instances of data 512 that can be stored at the mobile device 500. The data 512 can include, for example, one or more identifiers and/or data packages, and/or other applications or program modules. In some embodiments, the data 512 can include one or more of the data package 107, at least one data packet such as the IP packet 125 that can include the IP header 126, and/or other data sent among and/or between the UEs 102, 104 and the network 106. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE") in licensed spectrum and unlicensed spectrum, and various other 2G, 2.5G, 3G, 4G, 5G and greater generation technology standards (e.g., a new radio standard). Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 620A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
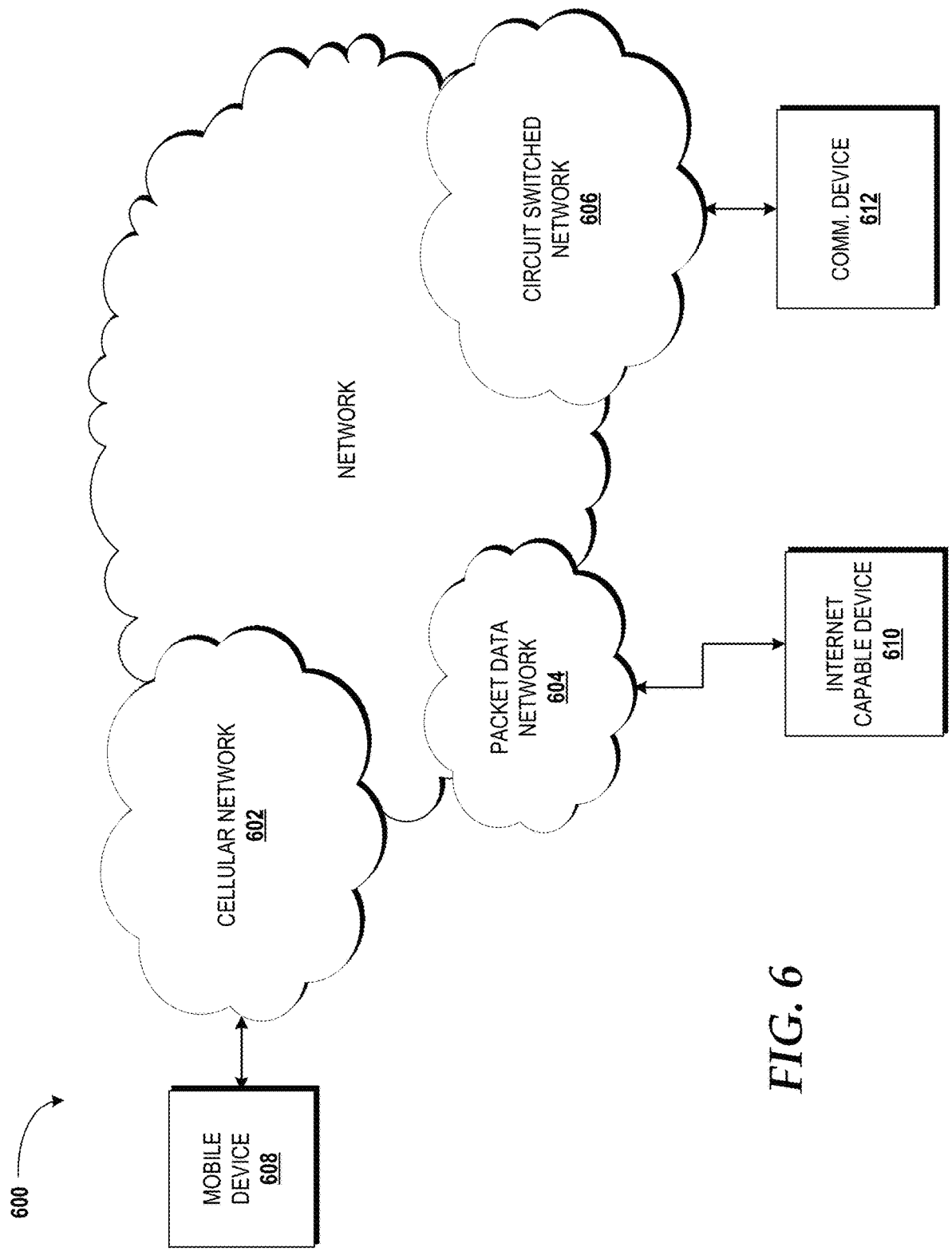
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 106 and/or the network 418 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 106 of FIG. 1 can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, the UEs 102 and 104 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G and 5G mobile communications standards such as LTE, or the like, as well as evolved and future mobile standards, including but not limited to LTE-Advanced, LTE-Advanced Pro and 5G.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "hyperlinks" in the retrieved files, as is generally known. In some embodiments, the packet data network 604 includes or is in communication with the Internet. In some embodiments, the at least some of the network 106 can be configured as a packet data network, such as the packet data network 604. The packet data network 604 can include optical communication, such as provided by the nanofiber communication paths 130, 140, the optical network nodes 108, 190, 192, and the hybrid optical switch 150. The circuit switched network 606 includes various hardware and software for providing circuit switched communications. The circuit switched network 606 may include, or may be, what is often referred to as a POTS. In some embodiments, the at least some of the network 106 also can be configured as a circuit switched network, such as the circuit switched network 606. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include one or more of the UEs 102 and 104. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 106 and/or the hybrid optical switch 150 can be performed by the cellular network 602, the packet data network 604, and/or the circuit switched network 606, alone or in combination with other networks, network elements, and the like, according at least to aspects of the features and operations discussed herein.

Based on the foregoing, it should be appreciated that concepts and technologies directed to optical networking with hybrid optical vortices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, in response to execution by the processor, cause the system to perform operations comprising:
receiving, from a first nanofiber communication path, a hybrid optical vortex that carries an internet protocol packet,
decoupling the hybrid optical vortex to extract a first optical vortex that encapsulates the internet protocol packet,
directing the first optical vortex through a beam splitter of a quantum scissor to create a second optical vortex and a third optical vortex, wherein each of the second optical vortex and the third optical vortex encapsulates an instance of the internet protocol packet,
placing the second optical vortex in an optical holding track to preserve the second optical vortex,
creating, using the third optical vortex, a fourth optical vortex,
analyzing the fourth optical vortex to determine a subsequent communication path to provide the instance of the internet protocol packet encapsulated by the second optical vortex,
releasing the second optical vortex from the optical holding track, and
switching the instance of the internet protocol packet from the second optical vortex to a subsequent communication path based on analysis of the fourth optical vortex.

2. The system of claim 1, wherein the hybrid optical vortex comprises an electron that is coupled to the first optical vortex.

3. The system of claim 2, wherein decoupling the hybrid optical vortex comprises separating the electron from the first optical vortex so as the extract the first optical vortex from the hybrid optical vortex.

4. The system of claim 1, wherein the beam splitter of the quantum scissor uses two photons of a quantum pair to create the second optical vortex and the third optical vortex.

5. The system of claim 1, wherein the second optical vortex is maintained in the optical holding track by being held in a circular fiber optic path that enables the second optical vortex to carry the instance of the internet protocol packet while the fourth optical vortex is analyzed.

6. The system of claim 1, wherein creating the fourth optical vortex using the third optical vortex comprises colliding a photon with the third optical vortex to create the fourth optical vortex.

7. The system of claim 1, wherein analyzing the fourth optical vortex comprises determining whether the instance of the internet protocol packet encapsulated by the fourth optical vortex corresponds with an optical vortex package control packet, an optical vortex package data packet, or an optical vortex checksum packet.

8. A method comprising:
receiving, by a system comprising a processor, from a first nanofiber communication path, a hybrid optical vortex that carries an internet protocol packet;
decoupling, by the system, the hybrid optical vortex to extract a first optical vortex that encapsulates the internet protocol packet;
directing, by the system, the first optical vortex through a beam splitter of a quantum scissor to create a second optical vortex and a third optical vortex, wherein each of the second optical vortex and the third optical vortex encapsulates an instance of the internet protocol packet;
placing, by the system, the second optical vortex in an optical holding track to preserve the second optical vortex;
creating, by the system, using the third optical vortex, a fourth optical vortex;
analyzing, by the system, the fourth optical vortex to determine a subsequent communication path to provide the instance of the internet protocol packet encapsulated by the second optical vortex;
releasing, by the system, the second optical vortex from the optical holding track; and
switching, by the system, the instance of the internet protocol packet from the second optical vortex to a subsequent communication path based on analysis of the fourth optical vortex.

9. The method of claim 8, wherein the hybrid optical vortex comprises an electron that is coupled to the first optical vortex.

10. The method of claim 9, wherein decoupling the hybrid optical vortex comprises separating the electron from the first optical vortex so as the extract the first optical vortex from the hybrid optical vortex.

11. The method of claim 8, wherein the beam splitter of the quantum scissor uses two photons of a quantum pair to create the second optical vortex and the third optical vortex.

12. The method of claim 8, wherein the second optical vortex is maintained in the optical holding track by being held in a circular fiber optic path that enables the second optical vortex to carry the instance of the internet protocol packet while the fourth optical vortex is analyzed.

13. The method of claim 8, wherein creating the fourth optical vortex using the third optical vortex comprises colliding a photon with the third optical vortex to create the fourth optical vortex.

14. The method of claim 8, wherein analyzing the fourth optical vortex comprises determining whether the instance of the internet protocol packet encapsulated by the fourth optical vortex corresponds with an optical vortex package control packet, an optical vortex package data packet, or an optical vortex checksum packet.

15. A computer storage medium having computer-executable instructions stored thereon that, when executed by a processor of a system, cause the processor to perform operations comprising:
- receiving, from a first nanofiber communication path, a hybrid optical vortex that carries an internet protocol packet;
- decoupling the hybrid optical vortex to extract a first optical vortex that encapsulates the internet protocol packet;
- directing the first optical vortex through a beam splitter of a quantum scissor to create a second optical vortex and a third optical vortex, wherein each of the second optical vortex and the third optical vortex encapsulates an instance of the internet protocol packet;
- placing the second optical vortex in an optical holding track to preserve the second optical vortex;
- creating, using the third optical vortex, a fourth optical vortex;
- analyzing the fourth optical vortex to determine a subsequent communication path to provide the instance of the internet protocol packet encapsulated by the second optical vortex;
- releasing the second optical vortex from the optical holding track; and
- switching the instance of the internet protocol packet from the second optical vortex to a subsequent communication path based on analysis of the fourth optical vortex.

16. The computer storage medium of claim 15, wherein the hybrid optical vortex comprises an electron that is coupled to the first optical vortex.

17. The computer storage medium of claim 16, wherein decoupling the hybrid optical vortex comprises separating the electron from the first optical vortex so as the extract the first optical vortex from the hybrid optical vortex.

18. The computer storage medium of claim 15, wherein the beam splitter of the quantum scissor uses two photons of a quantum pair to create the second optical vortex and the third optical vortex.

19. The computer storage medium of claim 15, wherein the second optical vortex is maintained in the optical holding track by being held in a circular fiber optic path that enables the second optical vortex to carry the instance of the internet protocol packet while the fourth optical vortex is analyzed.

20. The computer storage medium of claim 15, wherein creating the fourth optical vortex using the third optical vortex comprises colliding a photon with the third optical vortex to create the fourth optical vortex, and wherein analyzing the fourth optical vortex comprises determining whether the instance of the internet protocol packet encapsulated by the fourth optical vortex corresponds with an optical vortex package control packet, an optical vortex package data packet, or an optical vortex checksum packet.

\* \* \* \* \*